United States Patent
Kagaya et al.

(10) Patent No.: US 11,812,132 B2
(45) Date of Patent: Nov. 7, 2023

(54) IMAGING DEVICE, CONTROL METHOD THEREFOR, AND RECORDING MEDIUM

(71) Applicant: CANON KABUSHIKI KAISHA, Tokyo (JP)

(72) Inventors: Sosuke Kagaya, Tokyo (JP); Shigeo Ogawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/504,216

(22) Filed: Oct. 18, 2021

(65) Prior Publication Data
US 2022/0132023 A1    Apr. 28, 2022

(30) Foreign Application Priority Data
Oct. 27, 2020    (JP) ................... 2020-179882

(51) Int. Cl.
*G06V 10/25*    (2022.01)
*H04N 23/611*    (2023.01)
(Continued)

(52) U.S. Cl.
CPC ........... *H04N 23/611* (2023.01); *G06V 10/25* (2022.01); *G06V 40/166* (2022.01); *G06V 40/50* (2022.01); *H04N 23/651* (2023.01); *H04N 23/69* (2023.01)

(58) Field of Classification Search
CPC ......... H04N 5/23219; H04N 5/232411; H04N 5/23296; H04N 5/23206; H04N 5/23222;
(Continued)

(56) References Cited

U.S. PATENT DOCUMENTS 9,197,818 B2    11/2015 Mukai et al.
9,800,782 B2    10/2017 Kallstrom et al.
(Continued)

FOREIGN PATENT DOCUMENTS

JP    2001-051338 A    2/2001
JP    2007-325285 A    12/2007
(Continued)

*Primary Examiner* — Tat C Chio
(74) *Attorney, Agent, or Firm* — Cowan, Liebowitz & Latman, P.C.

(57) ABSTRACT

An imaging device is capable of performing automatic imaging and automatic authentication registration of a subject. The imaging device includes a drive unit that rotationally moves a lens barrel in a panning direction and a tilting direction, and can change an imaging direction under the control of the drive unit. The imaging device can perform automatic authentication registration of searching for a subject detected in captured image data and authenticating and storing the subject. A first control unit of the imaging device performs determination of whether or not a condition for performing the automatic authentication registration is satisfied and determination of whether or not a condition for performing the automatic imaging is satisfied. The first control unit executes an automatic authentication registration determination process and an automatic imaging determination process while performing search used for the automatic imaging, and determines a timing of performing the automatic authentication registration on the basis of a determination result.

31 Claims, 39 Drawing Sheets

(51) Int. Cl.
     *G06V 40/50*        (2022.01)
     *G06V 40/16*        (2022.01)
     *H04N 23/69*        (2023.01)
     *H04N 23/65*        (2023.01)

(58) Field of Classification Search
     CPC .......... H04N 5/23299; H04N 5/23245; G06V 10/25; G06V 40/166; G06V 40/50
     See application file for complete search history.

(56) References Cited

U.S. PATENT DOCUMENTS

| | | | | |
|---|---|---|---|---|
| 2016/0191812 A1* | 6/2016 | Tsubusaki | .......... | H04N 5/23222 |
| | | | | 348/240.1 |
| 2018/0082144 A1* | 3/2018 | Wakamatsu | ....... | H04N 5/23264 |
| 2019/0014301 A1* | 1/2019 | Ota | ........................ | H04N 5/247 |
| 2019/0199917 A1* | 6/2019 | Kadoi | ................ | H04N 5/23219 |

FOREIGN PATENT DOCUMENTS

| | | |
|---|---|---|
| JP | 4634527 B2 | 2/2011 |
| JP | 2016-536868 A | 11/2016 |

* cited by examiner

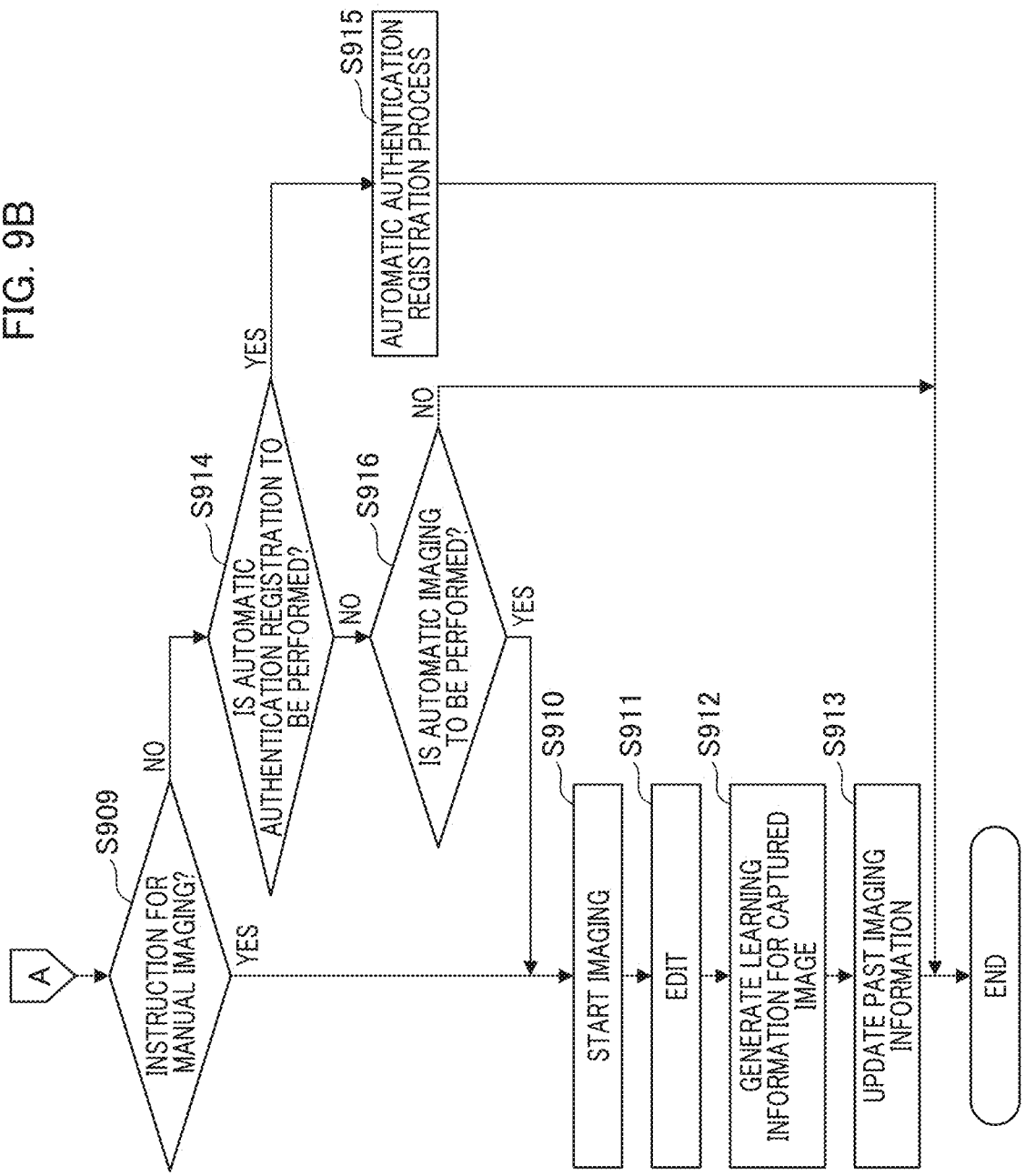

FIG. 11

|  |  | Automatic authentication registration determination ||
|---|---|---|---|
|  |  | Registration possible | Registration impossible |
| Automatic imaging determination | Imaging possible | Perform authentication registration | Perform imaging |
| | Imaging impossible | Perform authentication registration | – |

FIG. 18

| Number of registered persons | | 7 |
|---|---|---|
| Person 1 | Person ID | 1 |
| | Face image | |
| | Feature information | |
| | Registration state | Temporary registration |
| | Priority setting | Absence |
| | Name | − |
| Person 2 | Person ID | 2 |
| | Face image | |
| | Feature information | |
| | Registration state | Main registration |
| | Priority setting | Absence |
| | Name | − |
| ⋮ | | |
| Person 7 | Person ID | 7 |
| | Face image | |
| | Feature information | |
| | Registration state | Main registration |
| | Priority setting | Presence |
| | Name | Suzuki |

FIG. 20A

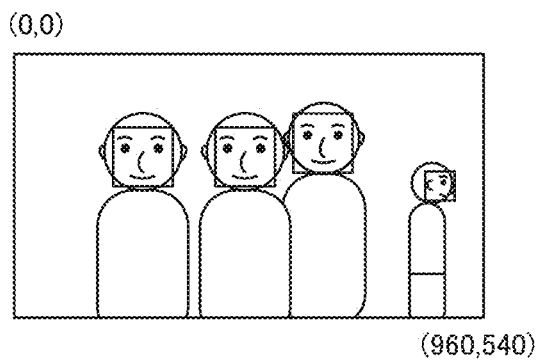

FIG. 20B

| Number of subjects | | 4 |
|---|---|---|
| Subject 1 | Subject ID | 1 |
| | Face size (w,h) | (120,120) |
| | Face position (x,y) | (480,210) |
| | Face orientation | Front |
| | Face reliability | 100 |
| | Person ID | 2 |
| | Registration state | Main registration |
| | Priority setting | Presence |
| Subject 2 | Subject ID | 2 |
| | Face size (w,h) | (110,110) |
| | Face position (x,y) | (630,180) |
| | Face orientation | Front |
| | Face reliability | 90 |
| | Person ID | 4 |
| | Registration state | Temporary registration |
| | Priority setting | Absence |
| Subject 3 | Subject ID | 3 |
| | Face size (w,h) | (120,120) |
| | Face position (x,y) | (270,210) |
| | Face orientation | Front |
| | Face reliability | 80 |
| | Person ID | 0 |
| | Registration state | – |
| | Priority setting | – |
| Subject 4 | Subject ID | 4 |
| | Face size (w,h) | (60,60) |
| | Face position (x,y) | (450,270) |
| | Face orientation | Left 90 degrees |
| | Face reliability | 50 |
| | Person ID | 0 |
| | Registration state | – |
| | Priority setting | – |

FIG. 23A

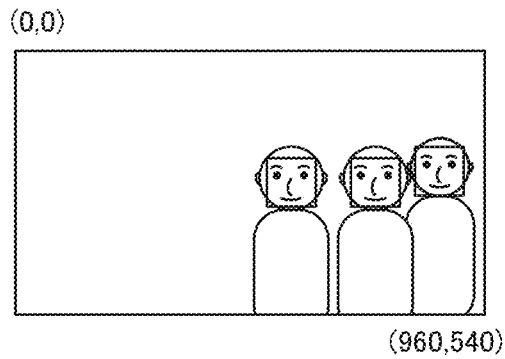

FIG. 23B

| Number of subjects | | 3 |
|---|---|---|
| Subject 1 | Subject ID | 1 |
| | Face size (w,h) | (120,120) |
| | Face position (x,y) | (690,270) |
| | Face orientation | Front |
| | Face reliability | 100 |
| | Person ID | 2 |
| | Registration state | Main registration |
| | Priority setting | Presence |
| Subject 2 | Subject ID | 2 |
| | Face size (w,h) | (110,110) |
| | Face position (x,y) | (840,240) |
| | Face orientation | Front |
| | Face reliability | 90 |
| | Person ID | 4 |
| | Registration state | Temporary registration |
| | Priority setting | Absence |
| Subject 3 | Subject ID | 3 |
| | Face size (w,h) | (120,120) |
| | Face position (x,y) | (480,270) |
| | Face orientation | Front |
| | Face reliability | 80 |
| | Person ID | 0 |
| | Registration state | – |
| | Priority setting | – |

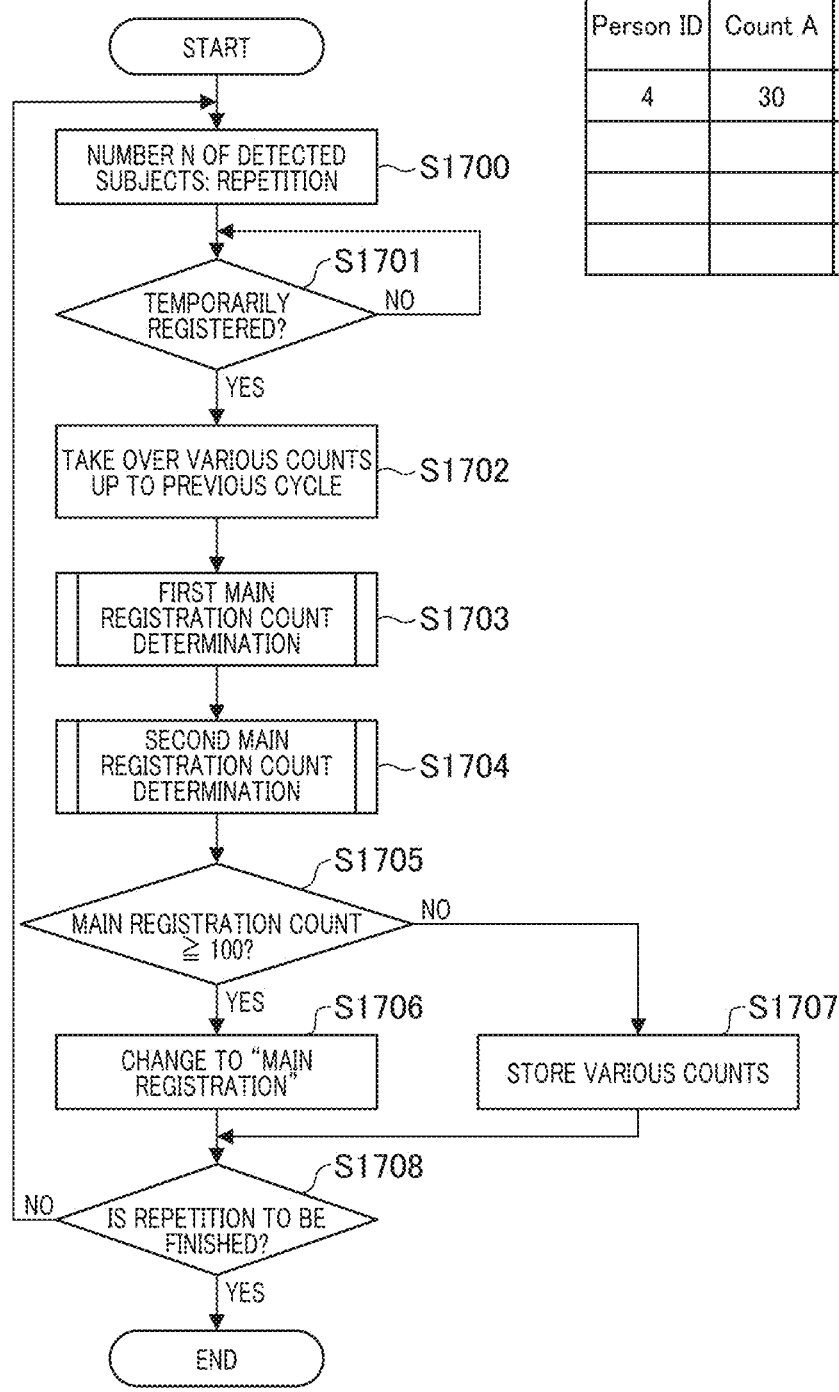

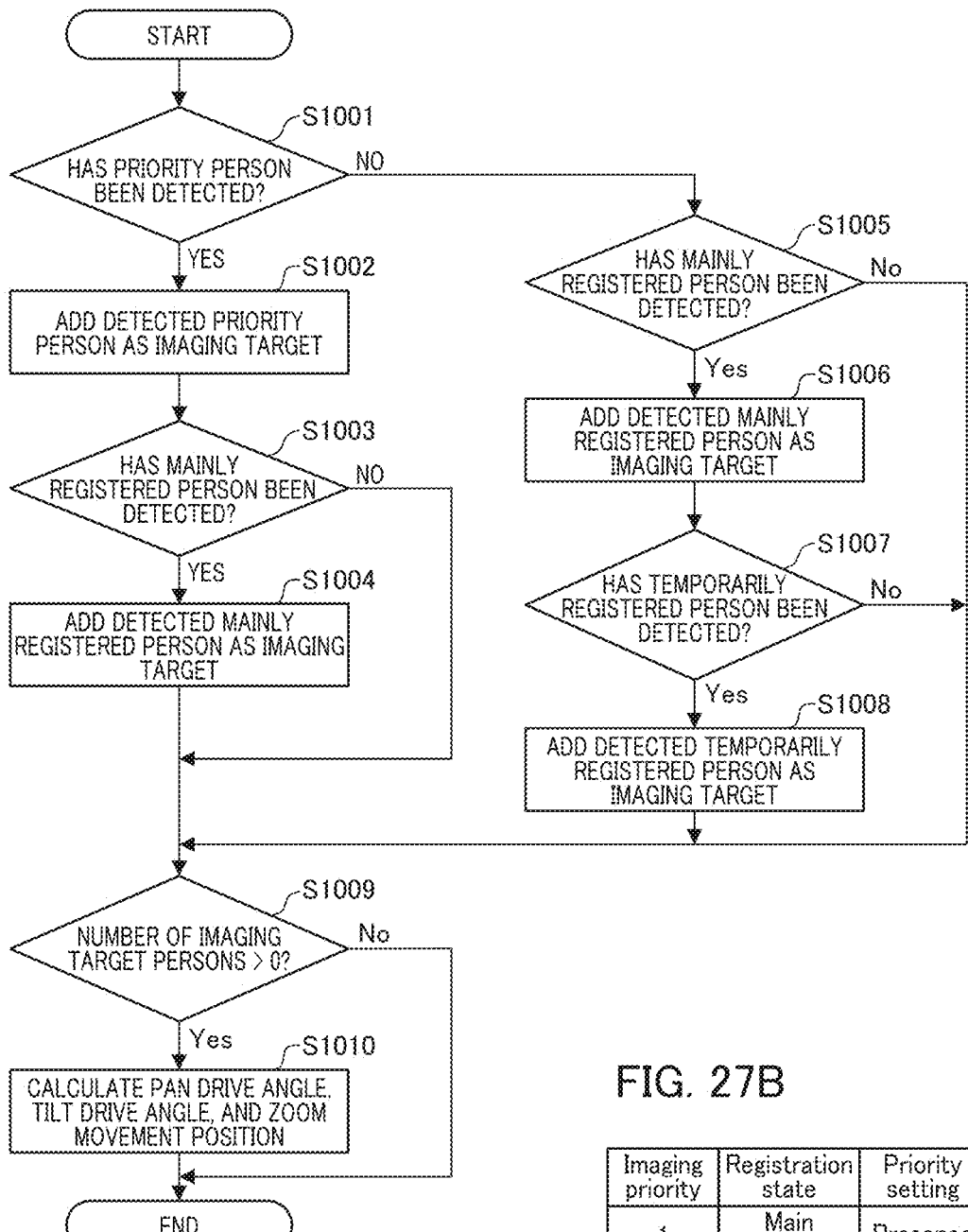

FIG. 28B

| Number of subjects | | 6 | | | |
|---|---|---|---|---|---|
| Subject 1 | Subject ID | 1 | Subject 4 | Subject ID | 4 |
| | Face size (w,h) | (130,130) | | Face size (w,h) | (50,50) |
| | Face position (x,y) | (500,240) | | Face position (x,y) | (350,45) |
| | Face orientation | Right 45 degrees | | Face orientation | Left 90 degrees |
| | Face reliability | 95 | | Face reliability | 60 |
| | Person ID | 8 | | Person ID | 0 |
| | Registration state | Main registration | | Registration state | – |
| | Priority setting | Absence | | Priority setting | – |
| Subject 2 | Subject ID | 2 | Subject 5 | Subject ID | 5 |
| | Face size (w,h) | (140,140) | | Face size (w,h) | (45,45) |
| | Face position (x,y) | (180,220) | | Face position (x,y) | (850,70) |
| | Face orientation | Left 45 degrees | | Face orientation | Left 90 degrees |
| | Face reliability | 90 | | Face reliability | 50 |
| | Person ID | 3 | | Person ID | 0 |
| | Registration state | Main registration | | Registration state | – |
| | Priority setting | Presence | | Priority setting | – |
| Subject 3 | Subject ID | 3 | Subject 6 | Subject ID | 6 |
| | Face size (w,h) | (90,90) | | Face size (w,h) | (45,45) |
| | Face position (x,y) | (700,90) | | Face position (x,y) | (40,45) |
| | Face orientation | Front | | Face orientation | Right 90 degrees |
| | Face reliability | 80 | | Face reliability | 40 |
| | Person ID | 9 | | Person ID | 0 |
| | Registration state | Temporary registration | | Registration state | – |
| | Priority setting | – | | Priority setting | – |

FIG. 30

| Number of registered persons | | 7 |
|---|---|---|
| Person 1 | Person ID | 1 |
| | Face image | |
| | Feature information | |
| | Registration state | Temporary registration |
| | Importance | - |
| | Priority setting | Absence |
| | Name | - |
| Person 2 | Person ID | 2 |
| | Face image | |
| | Feature information | |
| | Registration state | Main registration |
| | Importance | 7 |
| | Priority setting | Absence |
| | Name | - |

⋮

| | Person ID | 7 |
|---|---|---|
| | Face image | |
| | Feature information | |
| Person 7 | Registration state | Main registration |
| | Importance | 5 |
| | Priority setting | Presence |
| | Name | Suzuki |

FIG. 31B

| Number of subjects | | 6 | | | |
|---|---|---|---|---|---|
| Subject 1 | Subject ID | 1 | Subject 4 | Subject ID | 4 |
| | Face size (w,h) | (130,130) | | Face size (w,h) | (50,50) |
| | Face position (x,y) | (500,240) | | Face position (x,y) | (350,45) |
| | Face orientation | Right 45 degrees | | Face orientation | Left 90 degrees |
| | Face reliability | 95 | | Face reliability | 60 |
| | Person ID | 8 | | Person ID | 0 |
| | Registration state | Main registration | | Registration state | - |
| | Importance | 7 | | Importance | - |
| | Priority setting | Absence | | Priority setting | - |
| Subject 2 | Subject ID | 2 | Subject 5 | Subject ID | 5 |
| | Face size (w,h) | (140,140) | | Face size (w,h) | (45,45) |
| | Face position (x,y) | (180,220) | | Face position (x,y) | (850,70) |
| | Face orientation | Left 45 degrees | | Face orientation | Left 90 degrees |
| | Face reliability | 90 | | Face reliability | 50 |
| | Person ID | 3 | | Person ID | 0 |
| | Registration state | Main registration | | Registration state | - |
| | Importance | 5 | | Importance | - |
| | Priority setting | Presence | | Priority setting | - |
| Subject 3 | Subject ID | 3 | Subject 6 | Subject ID | 6 |
| | Face size (w,h) | (90,90) | | Face size (w,h) | (45,45) |
| | Face position (x,y) | (700,90) | | Face position (x,y) | (40,45) |
| | Face orientation | Front | | Face orientation | Right 90 degrees |
| | Face reliability | 80 | | Face reliability | 40 |
| | Person ID | 9 | | Person ID | 0 |
| | Registration state | Temporary registration | | Registration state | - |
| | Importance | 0 | | Importance | - |
| | Priority setting | - | | Priority setting | - |

| Person ID | Last detection date and time | Last update date and time |
|---|---|---|
| 1 | 2000/8/15 10:25 | 2000/8/15 10:25 |
| 1 | | |
| 1 | | |
| 1 | | |
| ⋮ | | |
| M | | |

FIG. 34B

| Imaging priority | Registration state | Importance | Priority setting |
|---|---|---|---|
| 1 | Main registration | – | Presence |
| 2 | Main registration | 10 | Absence |
| 3 | Main registration | 9 | Absence |
| 4 | Main registration | 8 | Absence |
| 5 | Main registration | 7 | Absence |
| 6 | Main registration | 6 | Absence |
| 7 | Main registration | 5 | Absence |
| 8 | Main registration | 4 | Absence |
| 9 | Main registration | 3 | Absence |
| 10 | Main registration | 2 | Absence |
| 11 | Main registration | 1 | Absence |
| 12 | Temporary registration | 0 | – |
| 13 | – | – | – |

FIG. 35A

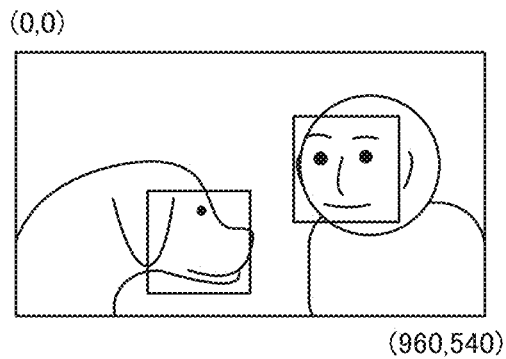

FIG. 35B

| Number of subjects | | 2 |
|---|---|---|
| Subject 1 | Subject ID | 1 |
| | Subject type | person |
| | Face size (w,h) | (200,200) |
| | Face position (x,y) | (700,240) |
| | Face orientation | Right 45 degrees |
| | Face reliability | 100 |
| | Person ID | 2 |
| | Registration state | Main registration |
| | Priority setting | Absence |
| Subject 2 | Subject ID | 2 |
| | Subject type | dog |
| | Face size (w,h) | (200,200) |
| | Face position (x,y) | (370,390) |
| | Face orientation | Left 90 degrees |
| | Face reliability | 90 |
| | Person ID | 4 |
| | Registration state | Main registration |
| | Priority setting | Presence |

IMAGING DEVICE, CONTROL METHOD THEREFOR, AND RECORDING MEDIUM

BACKGROUND OF THE INVENTION

Field of the Invention

The present invention relates to an automatic imaging technique in an imaging device.

Description of the Related Art

When capturing a still image or a moving image with an imaging device, generally, a photographer determines an imaging target through a finder or the like, checks an imaging status for himself/herself, and adjusts the framing of the imaging target. In a technique of the related art, there is a mechanism for detecting an operation error of a user or an external environment, and notifying the user that a camera is not appropriate for imaging, or controlling the camera such that the camera is brought into a state appropriate for imaging.

For an imaging device that performs imaging through a user's operation, PCT Japanese Patent Laid-Open Translation No. 2016-536868 discloses a life log camera that periodically and continuously performs imaging without the user giving an imaging instruction. The life log camera is used while being worn on the user's body with a strap or the like, and records scenes that the user sees in daily life as a video at regular time intervals. In the imaging using the life log camera, the imaging is performed at regular time intervals instead of imaging at a timing intended by the user such as when pressing the shutter button. Therefore, it is possible to record a video of an unexpected moment that the user would not normally image. There is an imaging device that automatically images an object. Japanese Patent Laid-Open No. 2001-51338 discloses a device that automatically performs imaging if predetermined conditions are satisfied.

On the other hand, Japanese Patent No. 4634527 discloses an imaging device having a personal authentication function that is used for determining an imaging target by storing information regarding a subject. This imaging device preferentially focuses on a subject based on stored information. Personal authentication is a process of identifying an individual by quantifying an amount of features of the face, or the like, but the amount of features of the face changes according to growth of a person, an angle of the face, and a way the light hits the face. Since it is difficult to identify an individual with only a single piece of feature amount data, a method of improving authentication accuracy by using a plurality of pieces of feature amount data for the same person is used. Japanese Patent Laid-Open No. 2007-325285 discloses a method of separating a camera for storing information regarding a subject and a camera for imaging the subject. It is possible to independently control an imaging timing of personal authentication and an imaging timing of the subject.

In the techniques of the related art, if a requirement for automatic imaging and a requirement for automatic authentication registration are different, it is difficult to achieve both of the two requirements in imaging performed once.

SUMMARY OF THE INVENTION

The present invention is to control a timing of performing automatic authentication registration for a subject in an imaging device that can perform automatic imaging.

According to an embodiment of the present invention, there is provided an imaging device capable of performing automatic imaging and automatic authentication registration including an imaging unit configured to image a subject, a search unit configured to search for a subject detected in image data acquired by the imaging unit, an authentication registration unit configured to authenticate and store the detected subject, and a control unit configured to perform authentication registration determination of whether or not a first condition under which the authentication registration unit performs the automatic authentication registration is satisfied and imaging determination of whether or not a second condition for performing the automatic imaging is satisfied, and to control timings of the automatic imaging and the automatic authentication registration, in which the control unit determines the timing of the automatic authentication registration by executing the authentication registration determination and the imaging determination related to the detected subject while controlling searching in the search unit.

Further features of the present invention will become apparent from the following description of exemplary embodiments with reference to the attached drawings.

BRIEF DESCRIPTION OF THE DRAWINGS

FIGS. 9A and 9B are flowcharts illustrating an imaging mode process.

FIG. 11 is a table illustrating execution determination based on automatic authentication registration determination and automatic imaging determination.

FIG. 18 is a table illustrating an example of person information.

FIGS. 20A and 20B are diagrams illustrating image data and subject information.

FIGS. 23A and 23B are a diagram and a table illustrating image data after an angle of view is adjusted due to temporary registration determination.

FIGS. 24A and 24B are a flowchart and a table illustrating a main registration determination process.

FIGS. 27A and 27B are a flowchart and a table illustrating an imaging target determination process.

FIGS. 28A and 28B are diagrams illustrating examples of image data and subject information.

FIG. 30 is a diagram illustrating an example of registered person information.

FIGS. 31A and 31B are diagrams illustrating examples of image data and subject information.

FIGS. 34A and 34B are a flowchart and a table illustrating an imaging target determination process.

FIGS. 35A and 35B are diagrams illustrating examples of image data and subject information related to a modification example.

DESCRIPTION OF THE EMBODIMENTS

Figure 1A:
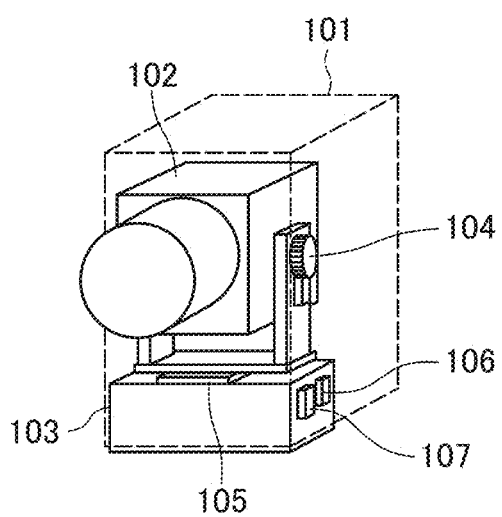
FIGS. 1A and 1B are diagrams schematically illustrating an appearance of a camera and drive directions of an embodiment.

Hereinafter, an embodiment of the present invention will be described in detail with reference to the accompanying drawings. First, the technical background regarding the present invention will be described. For example, in imaging for the purpose of a life log, imaging is performed periodically and continuously, and thus image information that is not interesting to a user may be recorded. Therefore, there is a method of automatically performing a panning operation or a tilting operation of an imaging device to search for a surrounding subject and performing imaging at an angle of view including the detected subject. Consequently, it is possible to increase a probability of recording image information that is preferable to the user.

In an imaging device capable of automatically controlling an imaging direction, it is required to search for an imaging target subject and also not to miss an imaging timing. It is necessary to adjust an imaging composition with panning and tilting mechanisms, and a zoom mechanism in consideration of the number of subjects, a movement direction, and the background, and also to promptly perform an imaging operation at an imaging timing.

An imaging target subject with priority in search can be detected by using personal authentication information, and the personal authentication information can be used to determine a subject to be included in an angle of view in imaging. Therefore, it is possible to increase a probability of recording a more preferable image for a user.

However, in an imaging device capable of performing automatic imaging, if registration of personal authentication is not automatically executed, convenience may be significantly reduced. An individual identification process in personal authentication is performed by quantifying feature amounts obtained from a face image. However, when numerical values change due to a change in growth of a person, a slight change in an angle of the face, slight adjustment of the light shining on the face, and the like, there is a probability that the person will not be regarded as the same person when the person should be the same person. In this case, when the person is erroneously recognized as another person due to erroneous authentication in subject tracking control, the imaging device tracks the other person, and, as a result, there is a problem that an imaging opportunity of the person who was originally desired to be imaged is missed. Therefore, in the imaging device capable of performing automatic imaging, reliability of personal authentication is directly linked to reliability of automatic imaging. Regarding registration information for personal authentication for the same person, it is important to maintain and improve authentication accuracy by using a plurality of pieces of registration information by adding the registration information at any time, and the registration information is required to be automatically updated. In order to realize higher performance and more convenient automatic imaging, automatic registration of personal authentication is very important.

Highly accurate face image data is required to register more accurate personal authentication. In other words, it is assumed that a composition is disposed at the optical center, which is the least affected by an aberration of an optical lens. An image that captures a large area of the face is necessary, and it is necessary to use a still image capturing function of an imaging device in order to obtain a high resolution image that focuses on a subject. However, in automatic imaging, composition adjustment is performed by taking into consideration a plurality of subjects and the background so as not to miss an imaging opportunity. Therefore, it may not be possible to simultaneously satisfy conditions required for automatic imaging and conditions for composition adjustment required for personal authentication registration. Therefore, in the present embodiment, an example of an imaging device capable of controlling a timing so as to automatically register personal authentication without hindering an imaging opportunity for automatic imaging will be described.

FIG. 1A is a diagram schematically illustrating an appearance of an imaging device of the present embodiment. A camera 101 is provided with operation members for operating the camera in addition to a power switch. A lens barrel 102 integrally includes an imaging lens group and imaging elements as an imaging optical system for imaging a subject, and is movably attached to a fixed portion 103 of the camera 101. Specifically, the lens barrel 102 is attached to the fixed portion 103 via a first rotation unit 104 and a second rotation unit 105 that are mechanisms that can be rotationally driven with respect to the fixed portion 103, and can thus change an imaging direction thereof. The first rotation unit 104 is a unit (hereinafter, referred to as a tilt rotation unit) that drives the lens barrel 102 in a tilting direction. The second rotation unit 105 is a unit (hereinafter, referred to as a pan rotation unit) that drives the lens barrel 102 in a panning direction. An angular velocity meter 106 and an accelerometer 107 are disposed at the fixed portion 103 of the camera 101. For example, the angular velocity meter 106 has a gyro sensor, and the accelerometer 107 has an acceleration sensor.

Figure 1B:
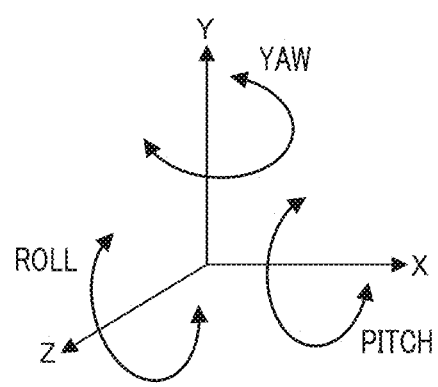

FIG. 1B is a schematic diagram illustrating a relationship between a three-dimensional orthogonal coordinate system (an X axis, a Y axis, and a Z axis) and three directions (a pitch, a yaw, and a roll). Each of the X axis (horizontal axis), the Y axis (vertical axis), and the Z axis (an axis in a depth direction) is defined with respect to a position of the fixed portion 103. A direction about the X axis is defined as a pitch direction, a direction about the Y axis is defined as a yaw direction, and a direction about the Z axis is defined as a roll direction.

The tilt rotation unit 104 includes a motor drive mechanism that rotationally drives the lens barrel 102 in the pitch direction illustrated in FIG. 1B. The pan rotation unit 105 includes a motor drive mechanism that rotationally drives the lens barrel 102 in the yaw direction illustrated in FIG. 1B. That is, the camera 101 includes the mechanisms that rotationally drives the lens barrel 102 in the two axial directions.

The angular velocity meter 106 and the accelerometer 107 respectively output an angular velocity detection signal and an acceleration detection signal. Vibration of the camera 101 is detected and the tilt rotation unit 104 and the pan rotation unit 105 are rotationally driven on the basis of the output signal from the angular velocity meter 106 or the accelerometer 107. Consequently, shaking or an inclination of the lens barrel 102 is corrected. Movement of the camera 101 is detected by using measurement results in a certain period on the basis of the output signals of the angular velocity meter 106 and the accelerometer 107.

Figure 2:
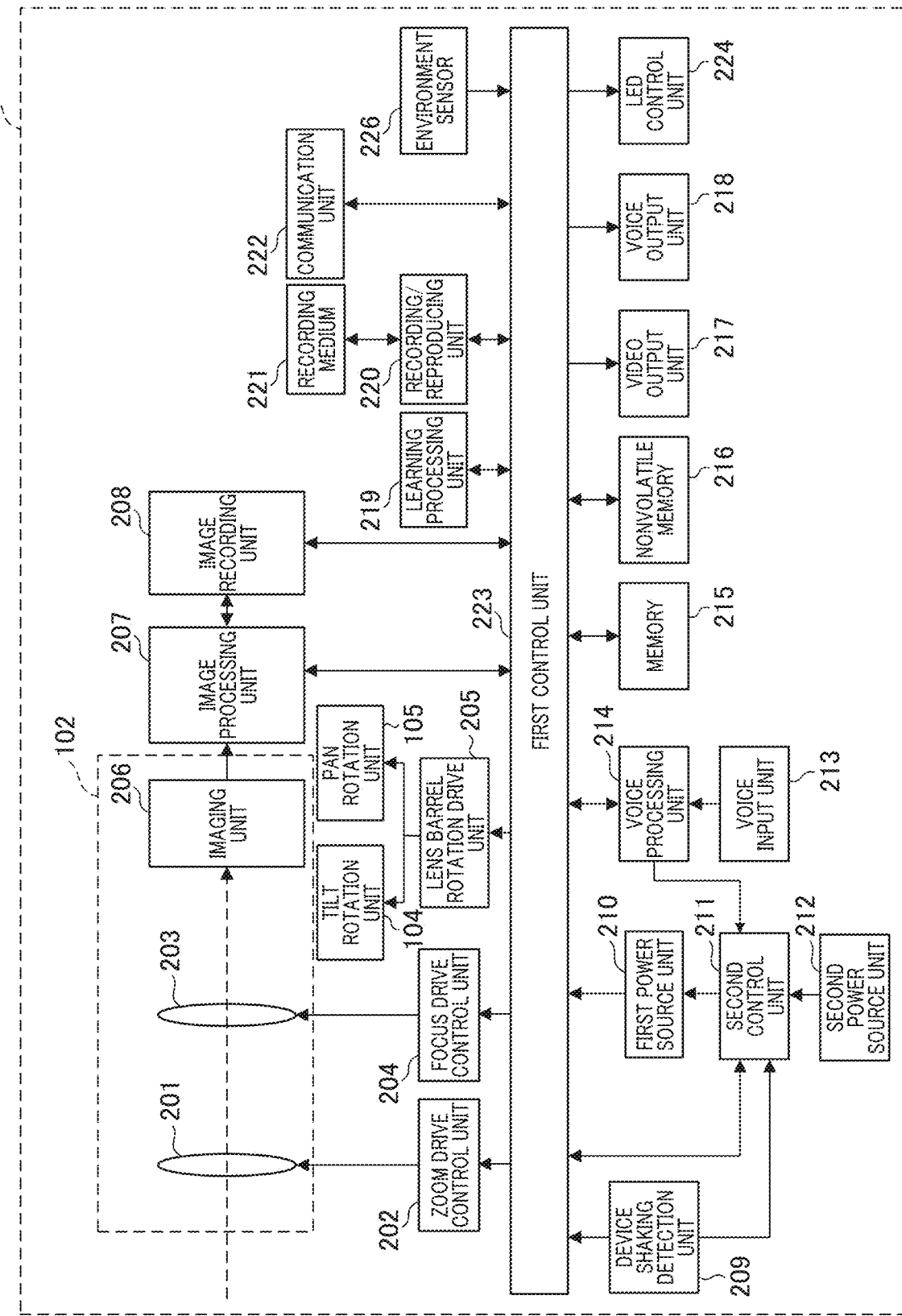
FIG. 2 is a block diagram illustrating the overall configuration of the camera of the embodiment.

FIG. 2 is a block diagram illustrating the overall configuration of the camera 101. A first control unit 223 includes a calculation processing unit. The calculation processing unit is a central processing unit (CPU), a micro-processing unit (MPU), or the like. A memory 215 includes a dynamic random access memory (DRAM), a static random access memory (SRAM), and the like. The first control unit 223 executes various processes according to a program stored in a nonvolatile memory (EEPROM) 216, and thus controls each block of the camera 101 or controls data transmission between respective blocks. The nonvolatile memory 216 is an electrically erasable and programmable memory, and stores constants for operating the first control unit 223, programs, and the like.

A zoom unit 201 includes a zoom lens that performs scaling (enlargement/reduction of a formed subject image). A zoom drive control unit 202 drives and controls the zoom unit 201 and detects a focal length during drive control. A focus unit 203 includes a focus lens that adjusts the focus. A focus drive control unit 204 drives and controls the focus unit 203. An imaging unit 206 includes an imaging element, receives light incident through each lens group, and outputs charge information corresponding to an amount of light to an image processing unit 207 as an analog image signal. The zoom unit 201, the focus unit 203, and the imaging unit 206 are disposed in the lens barrel 102.

The image processing unit 207 performs image processing on digital image data obtained by applying A/D conversion to the analog image signal. The image processing includes distortion correction, white balance adjustment, a color interpolation process, and the like, and the image processing unit 207 outputs the digital image data after the image processing. An image recording unit 208 acquires the digital image data output from the image processing unit 207. The digital image data is converted into a recording format such as a Joint Photographic Experts Group (JPEG) format. The converted data is stored in the memory 215 and transmitted to the video output unit 217, which will be described later.

A lens barrel rotation drive unit 205 drives the tilt rotation unit 104 and the pan rotation unit 105 to rotationally move the lens barrel 102 in the tilting direction and the panning direction. A device shaking detection unit 209 includes the angular velocity meter 106 that detects angular velocities of the camera 101 in the three axial direction, and the accelerometer 107 that detects accelerations of the camera 101 in the three axial direction. The first control unit 223 calculates a rotation angle of the device, a shift amount of the device, and the like on the basis of a detection signal from the device shaking detection unit 209.

A voice input unit 213 acquires a voice signal from around the camera 101 with a microphone provided in the camera 101, converts the voice signal into a digital voice signal, and transmits the digital voice signal to a voice processing unit 214. The voice processing unit 214 performs voice-related processing such as an optimization process on the input digital voice signal. The voice signal processed by the voice processing unit 214 is transmitted to the memory 215 by the first control unit 223. The memory 215 temporarily stores the image signal and the voice signal obtained by the image processing unit 207 and the voice processing unit 214.

The image processing unit 207 and the voice processing unit 214 read the image signal and the voice signal temporarily stored in the memory 215, and encode the image signal, encode the audio signal, and the like, to generate a compressed image signal and a compressed voice signal. The first control unit 223 transmits the generated compressed image signal and compressed voice signal to a recording/reproducing unit 220.

The recording/reproducing unit 220 records the compressed image signal and the compressed voice signal generated by the image processing unit 207 and the voice processing unit 214, control data related to imaging, and the like on a recording medium 221. If the voice signal is not compressed and encoded, the first control unit 223 transmits the voice signal generated by the voice processing unit 214 and the compressed image signal generated by the image processing unit 207 to the recording/reproduction unit 220 to be recorded on the recording medium 221.

The recording medium 221 is a recording medium built into the camera 101 or a recording medium detachable therefrom. The recording medium 221 may record various data such as the compressed image signal, the compressed voice signal, and the voice signal generated by the camera 101. Generally, a medium having a larger capacity than that of the nonvolatile memory 216 is used as the recording medium 221. For example, as the recording medium 221, any type of recording medium such as a hard disk, an optical disc, a magnetooptical disk, a CD-R, a DVD-R, a magnetic tape, a nonvolatile semiconductor memory, and a flash memory may be used.

The recording/reproducing unit 220 reads and reproduces the compressed image signal, the compressed voice signal, the voice signal, various data, and a program recorded on the recording medium 221. The first control unit 223 transmits the read compressed image signal and compressed voice signal to the image processing unit 207 and the voice processing unit 214, respectively. The image processing unit 207 and the voice processing unit 214 temporarily store the compressed image signal and the compressed voice signal in the memory 215, decode the signals according to a predetermined procedure, and transmit the decoded signals to a video output unit 217.

A plurality of microphones are disposed in the voice input unit 213 of the camera 101. The voice processing unit 214 can detect a direction of sound with respect to a plane in which the plurality of microphones are provided, and detection information is used for searching for a subject or automatic imaging that will be described later. The voice processing unit 214 detects a specific voice command. The voice command may be, for example, certain commands registered in advance, or a command based on a registered voice in an embodiment in which a user can register a specific voice in the camera. The voice processing unit 214 also recognizes a sound scene. In sound scene recognition, a sound scene determination process is executed by a network on which machine learning has been performed in advance on the basis of a large amount of voice data. For example, a network for detecting a specific scene such as "cheering", "applause", or "speaking" is set in the voice processing unit 214, and a specific sound scene or a specific voice command is detected. When the specific sound scene or the specific voice command is detected, the voice processing unit 214 outputs a detection trigger signal to the first control unit 223 or a second control unit 211.

The second control unit 211 is provided separately from the first control unit 223 that controls the entire camera system, and controls power supplied to the first control unit 223. A first power source unit 210 and a second power source unit 212 respectively supply power for operating the first control unit 223 and the second control unit 211. Power is first supplied to both of the first control unit 223 and the second control unit 211 by pressing a power switch provided on the camera 101. As will be described later, the first control unit 223 also performs control of stopping the supply of power thereto from the first power source unit 210. Even if the first control unit 223 does not operate, the second control unit 211 operates, and thus information from the device shaking detection unit 209 and the voice processing unit 214 is input to the second control unit 211. The second control unit 211 determines whether or not to start the first control unit 223 on the basis of various input information. If it is determined that the first control unit 223 will be started, the second control unit 211 instructs the first power source unit 210 to supply power to the first control unit 223.

A voice output unit 218 has a speaker built into the camera 101, and outputs a voice with a preset pattern from the speaker, for example, during imaging. An LED control unit 224 controls light emitting diodes (LEDs) provided on the camera 101. The LEDs are controlled on the basis of a preset lighting pattern or flashing pattern during imaging or the like.

The video output unit 217 has, for example, video output terminals, and outputs an image signal in order to display a video on an external display connected thereto. The voice output unit 218 and the video output unit 217 may be one combined terminal, for example, a High-Definition Multimedia Interface (HDMI) terminal.

A communication unit 222 is a processing unit that performs communication between the camera 101 and an external device. For example, the communication unit 222 transmits and receives data such as the voice signal, the image signal, the compressed voice signal, and the compressed image signal. The communication unit 222 receives a command for starting or finishing imaging, and control signals related to imaging such as pan, tilt, and zoom drive and outputs the command and the control signals to the first control unit 223. Consequently, the camera 101 can be driven on the basis of an instruction from the external device. The communication unit 222 transmits and receives information such as various parameters related to learning processed by a learning processing unit 219 that will be described later between the camera 101 and the external device. The communication unit 222 includes a wireless communication module such as an infrared communication module, a Bluetooth communication module, a wireless LAN communication module, a wireless USB, or a GPS receiver.

An environment sensor 226 detects a state of a surrounding environment of the camera 101 in a predetermined cycle. The environment sensor 226 is configured by using, for example, the following sensors.

A temperature sensor that detects a temperature around the camera 101

An atmospheric pressure sensor that detects an atmospheric pressure around the camera 101

An illuminance sensor that detects a brightness around the camera 101

A humidity sensor that detects a humidity around the camera 101

A UV sensor that detects an amount of ultraviolet rays around the camera 101

In addition to various detection information (temperature information, atmospheric pressure information, illuminance information, humidity information, and UV information), a rate of change at a predetermined time interval can be calculated from the various information. In other words, an amount of change in temperature, an amount of change in atmospheric pressure, an amount of change in illuminance, an amount of change in humidity, and an amount of change in ultraviolet rays may be used to determine automatic imaging or the like.

Figure 3:
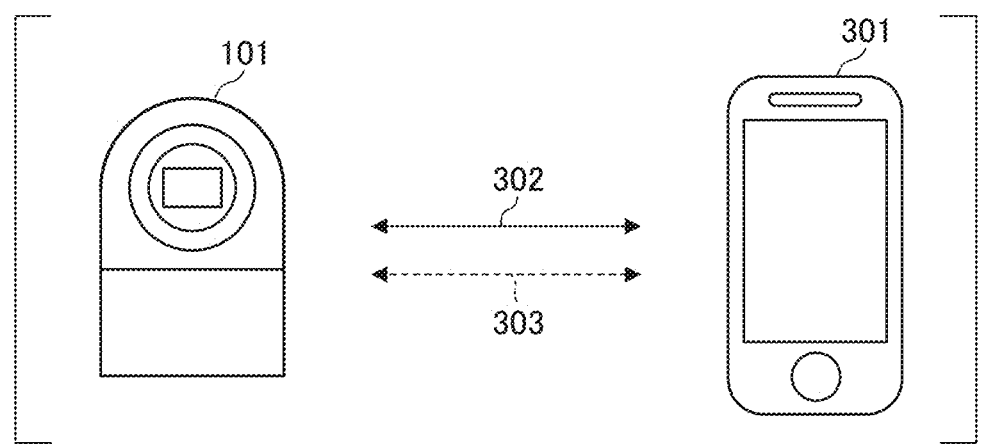
FIG. 3 is a diagram illustrating a configuration example of a wireless communication system between the camera and an external device.

With reference to FIG. 3, communication between the camera 101 and an external device 301 will be described. FIG. 3 is a diagram illustrating a configuration example of a wireless communication system between the camera 101 and the external device 301. The camera 101 is a digital camera having an imaging function, and the external device 301 is a smart device including a Bluetooth communication module and a wireless LAN communication module.

In FIG. 3, communication between the camera 101 and the external device 301 is indicated by first communication 302 (refer to a solid arrow) and second communication 303 (refer to a dotted arrow). For example, the first communication 302 is wireless local area network (LAN) communication conforming to the IEEE802.11 standard series. The second communication 303 is communication having a master-slave relationship between a control station and a subordinate station or the like, such as Bluetooth Low Energy (hereinafter referred to as "BLE"). The wireless LAN and the BLE are examples of communication methods. Each communication device has two or more communication functions, for example, it being possible to control another communication function with one communication function for performing communication in a relationship between a control station and a subordinate station, but other communication methods may be used. However, the first communication 302 using the wireless LAN or the like can perform higher-speed communication than the second communication 303 using the BLE or the like. It is assumed that the second communication 303 consumes less power than the first communication 302 and/or has a shorter communicable distance.

Figure 4:
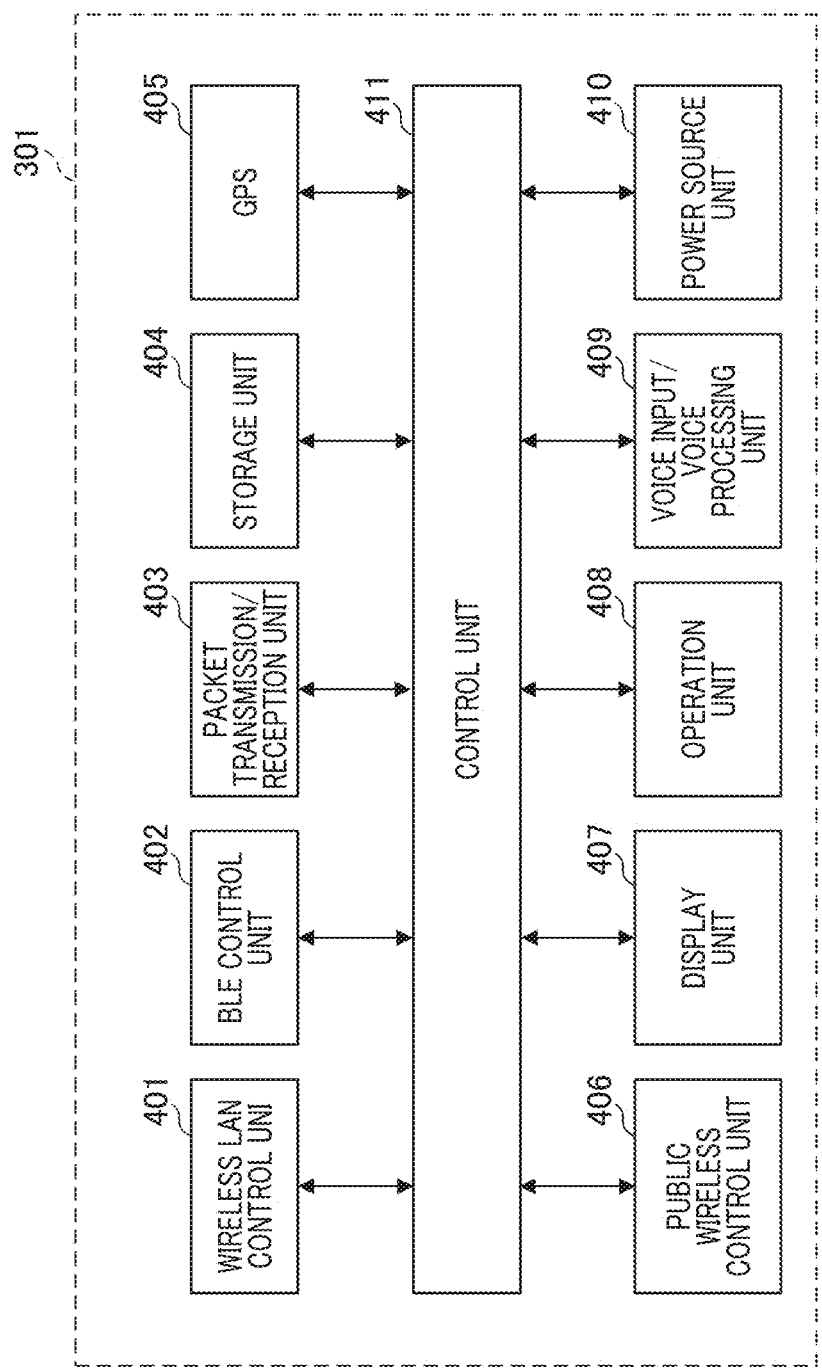
FIG. 4 is a block diagram illustrating a configuration of the external device in FIG. 3.

Next, with reference to FIG. 4, a configuration of the external device 301 will be described. The external device 301 includes, for example, a wireless LAN control unit 401 for the wireless LAN, a BLE control unit 402 for the BLE, and a public wireless control unit 406 for public wireless communication.

The wireless LAN control unit 401 performs RF control of the wireless LAN, communication processing, driver processing for performing various types of control of communication using the wireless LAN conforming to the IEEE802.11 standard series, and protocol processing related to communication using the wireless LAN. The BLE control unit 402 performs RF control of the BLE, communication processing, driver processing for performing various types of control of communication using the BLE, and protocol processing related to communication using the BLE. The public wireless control unit 406 performs RF control of public wireless communication, communication processing, driver processing for performing various types of control of the public wireless communication, and protocol processing related to the public wireless communication. The public wireless communication is communication conforming to, for example, the International Multimedia Telecommunications (IMT) standard or the Long Term Evolution (LTE) standard.

The external device 301 further includes a packet transmission/reception unit 403. The packet transmission/reception unit 403 performs a process for executing communication using the wireless LAN and the BLE and at least one of transmission and reception of packets related to the public wireless communication. The external device 301 of the present embodiment will be described as performing at least one of transmission and reception of packets in communication, but other communication forms such as line exchange may be used in addition to packet exchange.

A control unit 411 of the external device 301 includes a CPU or the like, and controls the entire external device 301 by executing a control program stored in a storage unit 404. The storage unit 404 stores, for example, the control program executed by the control unit 411 and various information such as parameters required for communication. Various operations that will be described later are performed by the control unit 411 executing the control program stored in the storage unit 404.

A global positioning system (GPS) reception unit 405 receives a GPS signal of which a notification is sent from an artificial satellite, analyzes the GPS signal, and estimates the current position (longitude and latitude information) of the external device 301. Alternatively, there is an embodiment in which the current position of the external device 301 is estimated on the basis of information regarding a wireless network present in the surroundings by using a Wi-Fi positioning system (WPS) or the like. For example, a case is assumed in which the current GPS position information acquired by the GPS reception unit 405 is located within a preset position range (within a predetermined radius with a detection position as the center), or a predetermined position change or more occurs in the GPS position information. In this case, the camera 101 is notified of movement information via the BLE control unit 402, and the movement information is used as a parameter for automatic imaging and automatic editing that will be described later.

A display unit 407 has a function of being capable of outputting visually recognizable information, such as a liquid crystal display (LCD) or an LED, or a function of being capable of outputting sound, such as a speaker, and presents various information. An operation unit 408 includes, for example, buttons for receiving an operation on the external device 301 from a user. The display unit 407 and the operation unit 408 may be configured with, for example, a touch panel.

A voice input/voice processing unit 409 acquires information regarding a voice emitted by the user by using, for example, a general-purpose microphone built into the external device 301. An operation command of the user may be identified through voice recognition process. There is a method of acquiring a voice command through the user's speech by using a dedicated application of the external device 301. In this case, a specific voice command for being recognized by the voice processing unit 214 of the camera 101 may be registered via the first communication 302 using the wireless LAN. A power source unit 410 supplies necessary power to each unit of the external device 301.

The camera 101 and the external device 301 perform transmission and reception of data through communication using the wireless LAN control unit 401 and the BLE control unit 402. For example, data such as the voice signal, the image signal, the compressed voice signal, and the compressed image signal is transmitted and received. Transmission of an imaging instruction from the external device 301 to the camera 101, transmission of voice command registration data, transmission of a predetermined position detection notification based on GPS position information, transmission of a place movement notification, and the like are performed. Learning data is transmitted and received by using a dedicated application of the external device 301.

Figure 5:
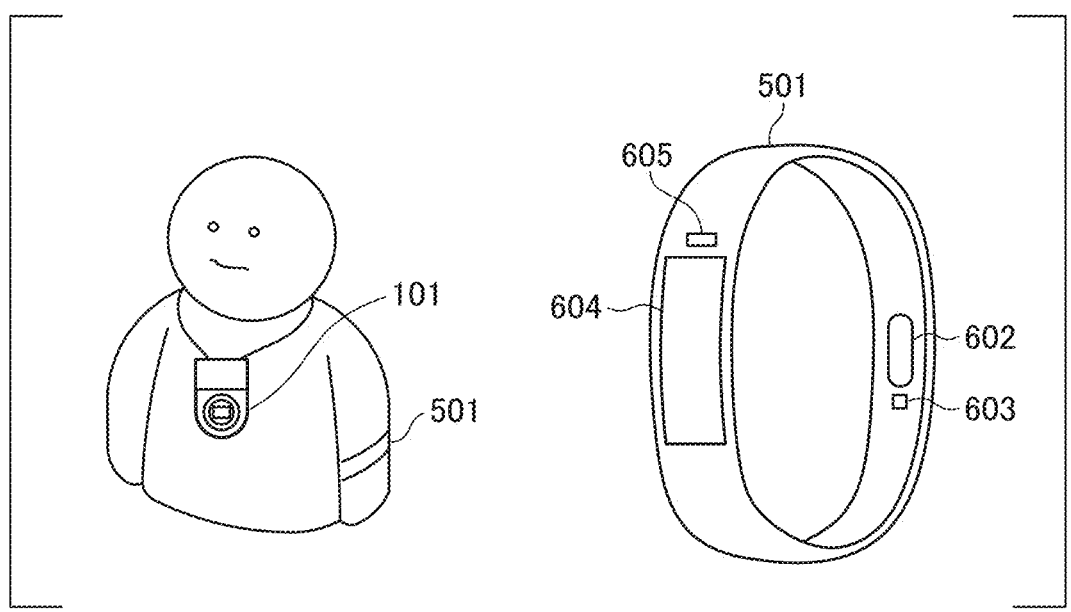
FIG. 5 is a diagram illustrating configurations of the camera and the external device.

FIG. 5 is a diagram schematically illustrating a configuration example of an external device 501 capable of performing communication with the camera 101. For example, the camera 101 is a digital camera having an imaging function. The external device 501 is a wearable device including various sensing units capable of performing communication with the camera 101 by using a Bluetooth communication module or the like.

The external device 501 has a configuration in which the external device 501 can be worn on the user's arm or the like. The external device 501 is provided with a sensor that detects biological information such as the user's pulse, heart rate, and blood flow in a predetermined cycle, an acceleration sensor that can detect the user's kinetic state, and the like.

A biological information detection unit 602 of the external device 501 includes, for example, a pulse sensor, a heart rate sensor, and a blood flow sensor that respectively detect the user's pulse, heart rate, and blood flow, and a sensor that detects a potential change through contact with the skin using a conductive polymer. In the present embodiment, the heart rate sensor included in the biological information detection unit 602 will be used for description. The heart rate sensor detects the user's heart rate by irradiating the skin with infrared light by using, for example, an LED, detecting the infrared light transmitted through the body tissue with a light receiving sensor, and performing signal processing on the detected infrared light. The biological information detection unit 602 outputs the detected biological information signal to a control unit 607 (refer to FIG. 6).

A shaking detection unit 603 of the external device 501 detects a kinetic state of the user. The shaking detection unit 603 includes, for example, an acceleration sensor or a gyro sensor, and acquires movement information and motion detection information. The movement information is information indicating whether or not the user is moving based on acceleration information, a movement velocity, and the like. The motion detection information is information obtained by detecting a motion such as whether the user is swinging his or her arm and performing an action.

The external device 501 includes a display unit 604 and an operation unit 605. The display unit 604 outputs visually recognizable information, such as an LCD or an LED. The operation unit 605 receives an operation instruction for the external device 501 from the user.

Figure 6:
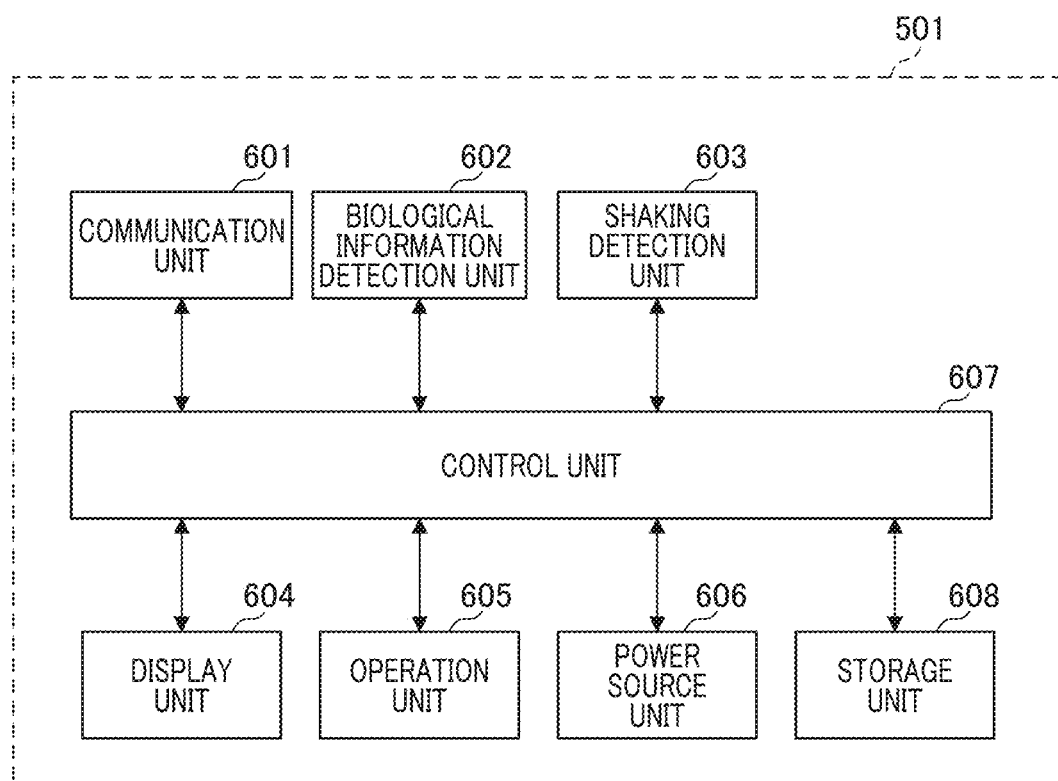
FIG. 6 is a block diagram illustrating a configuration of the external device in FIG. 5.

FIG. 6 is a block diagram illustrating a configuration of the external device 501. The external device 501 includes the control unit 607, a communication unit 601, the biological information detection unit 602, the shaking detection unit 603, the display unit 604, the operation unit 605, a power source unit 606, and a storage unit 608.

The control unit 607 includes a CPU or the like, and controls the entire external device 501 by executing a control program stored in a storage unit 608. The storage unit 608 stores, for example, the control program executed by the control unit 607 and various information such as parameters required for communication. Various operations that will be described later are performed by the control unit 607 executing the control program stored in the storage unit 608. The power source unit 606 supplies power to each unit of the external device 501.

The operation unit 605 receives an operation instruction for the external device 501 from the user, and notifies the control unit 607 thereof. The operation unit 605 acquires information regarding a voice emitted by the user by using, for example, a general-purpose microphone built into the external device 501, identifies the user's operation command through voice recognition process, and notifies the control unit 607 thereof. The display unit 604 outputs visually recognizable information or outputs sound from a speaker or the like, and presents various information to the user.

The control unit 607 acquires detection information from the biological information detection unit 602 and the shaking detection unit 603, and processes the detection information. Various detection information processed by the control unit 607 is transmitted to the camera 101 by the communication unit 601. For example, the external device 501 may transmit the detection information to the camera 101 at a timing at which a change in the user's heart rate is detected, and also transmit the detection information at a timing at which a movement state such as walking movement, running movement, and stopping changes. The external device 501 may transmit the detection information to the camera 101 at a timing at which a preset arm swing motion is detected, and also transmit the detection information at a timing at which movement over a preset distance is detected.

Figure 7:
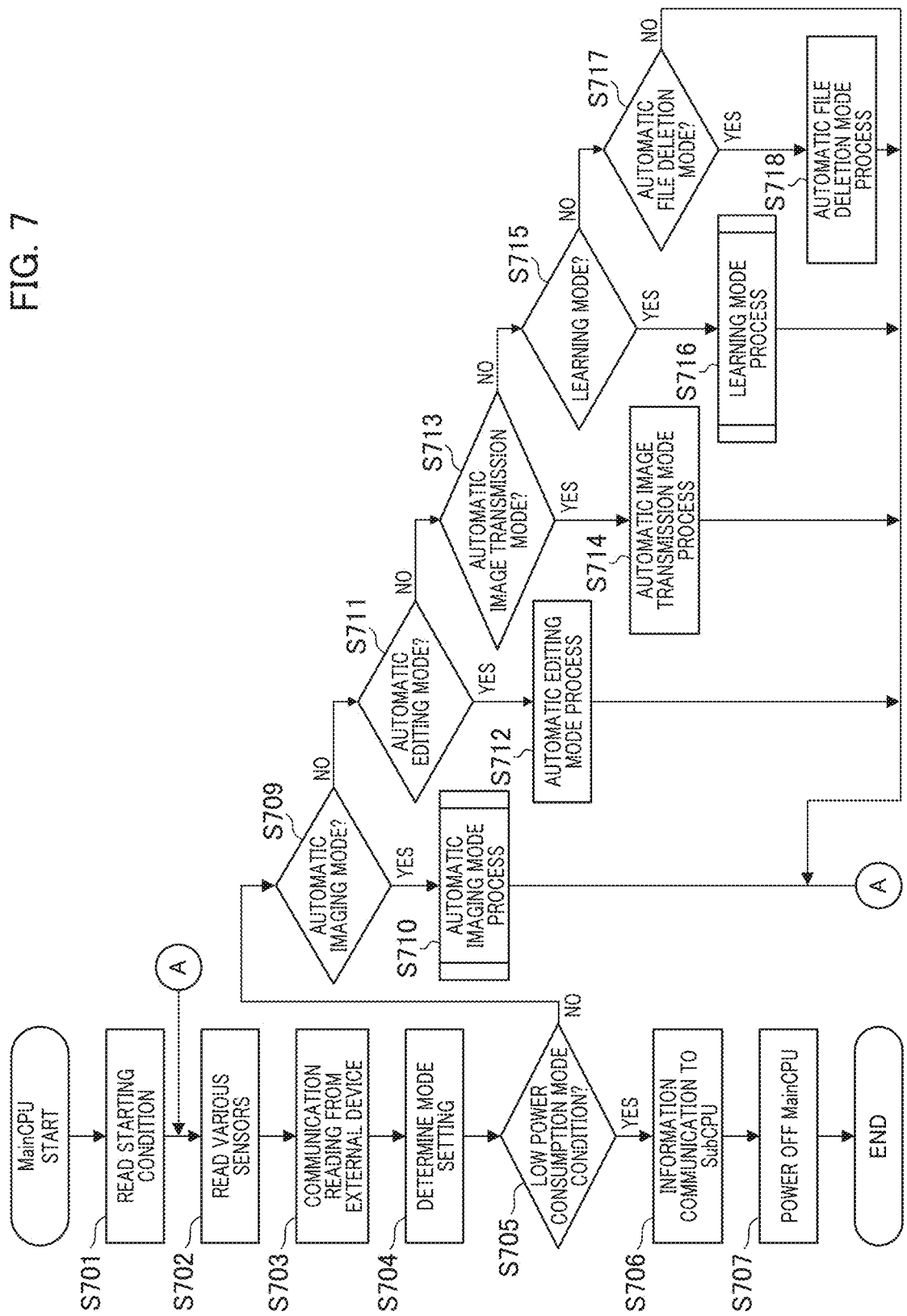
FIG. 7 is a flowchart illustrating an operation of a first control unit.

With reference to FIG. 7, an operation sequence of the camera 101 will be described. FIG. 7 is a flowchart illustrating a process example performed by the first control unit 223 (MainCPU) of the camera 101. When a user operates the power button provided on the camera 101, power is supplied from the first power source unit 210 to the first control unit 223 and each constituent unit of the camera 101. Power is supplied to the second control unit 211 from the second power source unit 212. Details of an operation of the second control unit 211 will be described later with reference to a flowchart of FIG. 8.

After power is supplied to the device, the process in FIG. 7 is started, and, in S701, starting conditions are read. In the present embodiment, there are the following three cases regarding conditions for starting the power source.

(1) A case where the power button is manually pressed and thus the power source is started
(2) A case where a starting instruction is sent from an external device (for example, the external device 301) through external communication (for example, BLE communication) and thus the power source is started
(3) A case where the power source is started in response to an instruction from the second control unit 211

Here, in the case of (3), that is, if the power source is started in response to an instruction from the second control unit 211, starting conditions calculated in the second control unit 211 are read. Details thereof will be described later with reference to FIG. 8. The starting conditions read here are used as one parameter element during subject search or automatic imaging, and will also be described later. When reading of the starting conditions is finished in S701, the flow proceeds to the process in S702.

In S702, detection signals in various sensors are read. The sensor signals read here are as follows.

A signal from a sensor detecting vibration, such as the gyro sensor or the acceleration sensor of the device shaking detection unit 209

A signal regarding each rotation position of the tilt rotation unit 104 and the pan rotation unit 105

A voice signal detected by the voice processing unit 214, a detection trigger signal obtained through specific voice recognition, and a sound direction detection signal A detection signal for environment information from the environment sensor 226

The detection signals in the various sensors are read in S702, and the flow proceeds to the process in S703.

In S703, the first control unit 223 detects whether or not a communication instruction has been transmitted from the external device, and controls communication with the external device if there has been the communication instruction. For example, a process of reading various information from the external device 301 is executed. The various information includes information regarding a remote operation using the wireless LAN or the BLE, transmission and reception of a voice signal, an image signal, a compressed voice signal, a compressed image signal, and the like, an operation instruction for imaging from the external device 301, and transmission of voice command registration data. The various information includes information regarding a predetermined position detection notification based on GPS position information, a place movement notification, transmission and reception of learning data, and the like. If it is necessary to update the user's kinetic information and arm action information, and biological information such as a heart rate from the external device 501, an information reading process using the BLE is executed. An example in which the environment sensor 226 is mounted on the camera 101 has been described, but the environment sensor 226 may be mounted on the external device 301 or the external device 501. In this case, in S703, an environment information reading process using the BLE is executed. Communication reading is performed in S703, the flow proceeds to the process in S704.

In S704, a mode setting is determined. Examples of an "automatic imaging mode" (S710), an "automatic editing mode" (S712), an "automatic image transmission mode" (S714), a "learning mode" (S716), and an "automatic file deletion mode" (S718) will be described. In the next S705, a process of determining whether or not an operation mode in S704 is set to a low power consumption mode is performed. The low power consumption mode is a mode that is set if the operation mode is not any of the "automatic imaging mode", the "automatic editing mode", the "automatic image transmission mode", the "learning mode", and the "automatic file deletion mode". If it is determined that the operation mode is set to the low power consumption mode in S705, the flow proceeds to the process in S706, and if it is determined that the operation mode is not set to the low power consumption mode in S705, the flow proceeds to the process in S709.

In S706, a process of notifying the second control unit 211 (SubCPU) of various parameters related to a starting factor determined in the second control unit 211 is performed. The various parameters include a shaking detection determination parameter, a sound detection parameter, and a time passage detection parameter, and parameter values are changed by learning the parameters in a learning process that will be described later. When the process in S706 is finished, the flow proceeds to the process in S707, and the supply of power to the first control unit 223 (MainCPU) is turned off such that a series of processes is finished.

In S709, a process of determining whether or not the mode setting in S704 is the automatic imaging mode. Subsequently, in S711, S713, S715, and S717, a process of determining each corresponding mode is performed. Here, the mode setting determination process in S704 will be described. In the mode setting determination, a mode is selected from the modes shown in the following (1) to (5).

(1) Automatic Imaging Mode
<Mode Determination Condition>
It is a condition that it is determined that automatic imaging is required to be performed on the basis of each piece of detection information set for learning, the elapsed time since transition to the automatic imaging mode, the past imaging information, the number of captured images, and the like. Each piece of detection information is information such as an image, sound, time, vibration, a place, a physical change, and an environmental change.
<Process in Mode>
If it is determined that the mode setting is the automatic imaging mode in S709, the flow proceeds to an automatic imaging mode process (S710). Pan/tilt or zoom drive is performed on the basis of the above detection information set for learning, and automatic search for a subject is executed. When it is determined that a timing for imaging in accordance with a photographer's preference has arrived, imaging is automatically performed.

(2) Automatic Editing Mode
<Mode Determination Condition>
It is a condition that automatic editing is required to be performed on the basis of an elapsed time from the time of performing the previous automatic editing and the past captured image information.
<Process in Mode>
If it is determined that the mode setting is the automatic editing mode in S711, the flow proceeds to an automatic editing mode process (S712). A still image or moving image selection process based on learning is performed, and, on the basis of the learning, an automatic editing process is performed to create a highlight video that is combined into one video according to an image effect or the time of an edited video.

(3) Automatic Image Transmission Mode
<Mode Determination Condition>
It is a condition that, if the automatic image transmission mode is set in response to an instruction using a dedicated application of the external device 301, automatic transmission is required to be performed on the basis of an elapsed time from the time of the previous image transmission and the past captured image information.
<Process in Mode>
If it is determined that the mode setting is the automatic image transmission mode in S713, the flow proceeds to an automatic image transmission mode process (S714). The camera 101 automatically extracts an image in accordance with the user's preference, and automatically transmits the image that seems to suit the user's preference to the external device 301. The extraction of an image in accordance with the user's preference is performed on the basis of a score for determining the user's preference added to each image that will be described later.

(4) Learning Mode
<Mode Determination Condition>
It is a condition that automatic learning is required to be performed on the basis of an elapsed time from the time of performing the previous learning process, the number of pieces of information or learning data integrated with images that can be used for learning, and the like. Alternatively, a learning mode is also set if there is an instruction from the external device 301 through communication such that the learning mode is set.
<Process in Mode>
If it is determined that the mode setting is the learning mode in S715, the flow proceeds to a learning mode process (S716). Learning is performed according to the user's preference by using a neural network on the basis of each piece of operation information in the external device 301, a notification of learning information from the external device 301, and the like. Each piece of operation information includes image acquisition information from the camera, information manually edited by using a dedicated application, determination value information input by the user for an image in the camera, and the like. Learning of detection such as registration of personal authentication, voice registration, sound scene registration, and recognition registration of general objects, or learning of conditions for the low power consumption mode described above is also performed at the same time.

(5) Automatic File Deletion Mode
<Mode Determination Condition>
It is a condition that automatic file deletion is required to be performed on the basis of an elapsed time from the time of performing the previous automatic file deletion and a residual capacity of the nonvolatile memory 216 in which image data is recorded.
<Process in Mode>
If it is determined that the mode setting is the automatic file deletion mode in S717, the flow proceeds to an automatic file deletion mode process (S718). A process of designating a file to be automatically deleted and deleting the file among images in the nonvolatile memory 216 on the basis of tag information of each image and the imaging date and time is performed.

When the processes in S710, S712, S714, S716, and S718 in FIG. 7 are completed, the flow returns to S702 and the process is continued. Details of the processes (S710 and S716) in each mode will be described later. If it is determined that the mode setting is not the automatic imaging mode in S709 in FIG. 7, the flow proceeds to the process in S711. If it is determined that the mode setting is not the automatic editing mode in S711, the flow proceeds to the process in S713. If it is determined that the mode setting is not the automatic image transmission mode in S713, the flow proceeds to the process in S715. If it is determined that the mode setting is not the learning mode in S715, the flow proceeds to the process in S717. If it is determined that the mode setting is not the automatic file deletion mode in S717, the flow returns to S702 and the process is repeatedly performed. The automatic editing mode, the automatic image transmission mode, and the automatic file deletion mode are not directly related to the spirit of the present invention and thus detailed description thereof will be omitted.

Figure 8:
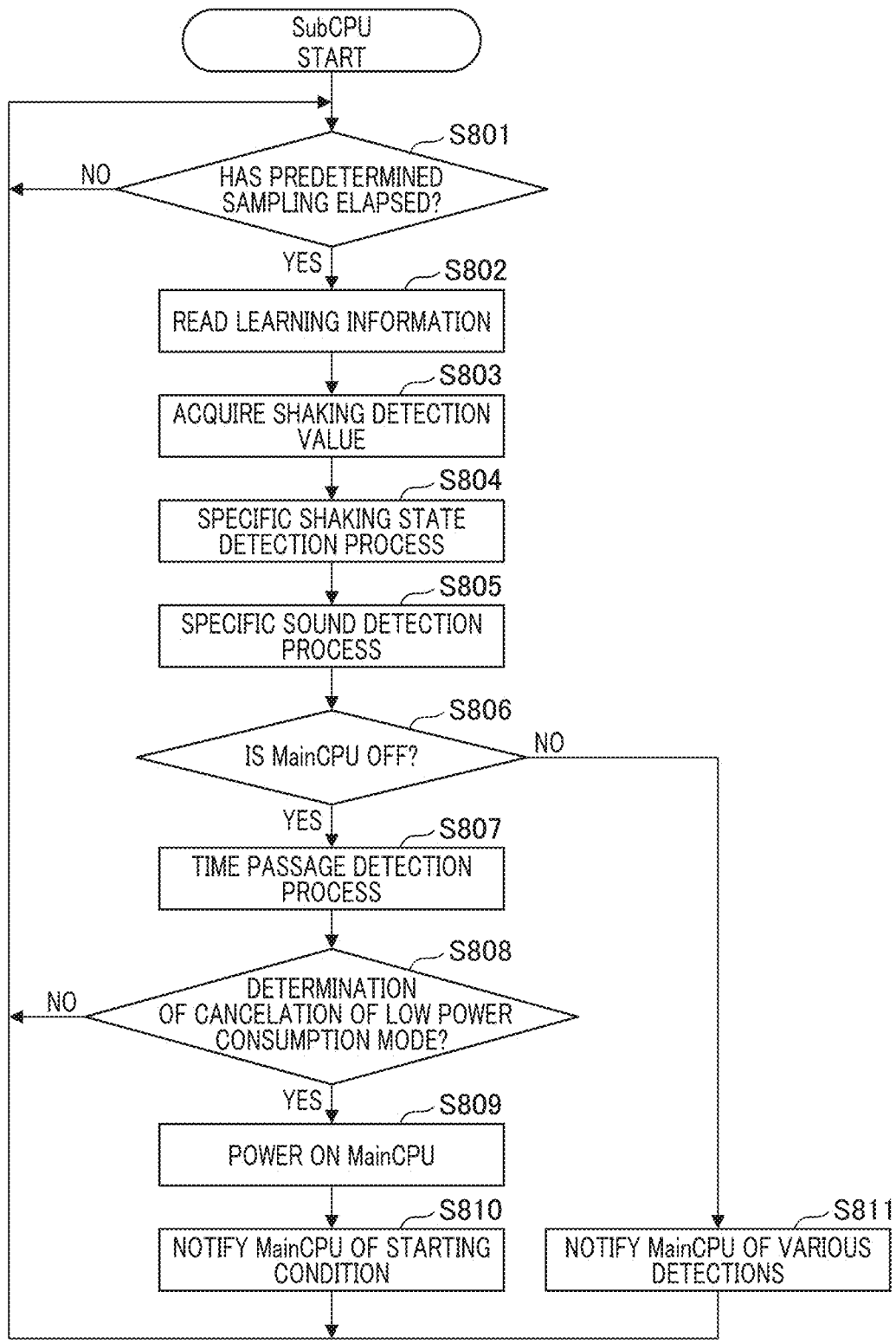
FIG. 8 is a flowchart illustrating an operation of a second control unit.

FIG. 8 is a flowchart illustrating a process example performed by the second control unit 211 of the camera 101. When a user operates the power button provided on the camera 101, power is supplied from the first power source unit 210 to the first control unit 223 and each constituent unit of the camera 101. Power is supplied to the second control unit 211 from the second power source unit 212.

After power is supplied, the second control unit (Sub-CPU) 211 is started, and the process in FIG. 8 is started. In S801, a process of determining whether or not a predetermined sampling cycle has elapsed is performed. The predetermined sampling cycle is set to, for example, 10 milliseconds (msec), and the flow proceeds to the process in S802 according to a determination result of the cycle of 10 msec (when the predetermined sampling cycle has elapsed). If it is determined that the predetermined sampling cycle has not elapsed, the second control unit 211 waits until the determination process in S801 is executed again.

In S802, learning information is read. The learning information is information transmitted when information is sent to the second control unit 211 through communication in S706 in FIG. 7, and includes, for example, information used for the following determination.

(1) Information for determining specific shaking state detection (S804 which will be described later)
(2) Information for determining specific sound detection (S805 that will be described later)
(3) Information for determining time passage detection (S807 that will be described later)

After the process in S802, the flow proceeds to S803, and a shaking detection value is acquired. The shaking detection value is an output value from the gyro sensor, the acceleration sensor, and the like of the device shaking detection unit 209. Next, the flow proceeds to S804, and a process of detecting a preset specific shaking state is performed. Here, several examples of changing a determination process on the basis of the learning information read in S802 will be described.

<Tap Detection>

A tapped state is, for example, a state in which the user taps the camera 101 with the fingertip or the like, and can be detected on the basis of an output value from the acceleration sensor attached to the camera 101. The output from the three axial acceleration sensor is processed by causing the output to pass through a bandpass filter (BPF) set in a specific frequency region in a predetermined sampling cycle, and a component of a signal region for an acceleration change due to tapping is extracted. The number of times in which an acceleration signal after passing through the BPF exceeds a predetermined threshold value (indicated by ThreshA) during a predetermined time (indicated by TimeA) is measured. The tap determination is performed depending on whether or not the measured number of times is a predetermined number of times (indicated by CountA). For example, in a case of a double tap, a value of CountA is set to 2, and in a case of a triple tap, a value of CountA is set to 3. Each value of TimeA and ThreshA can also be changed according to the learning information.

<Detection of Shaking State>

A shaking state of the camera 101 can be detected on the basis of an output value from the gyro sensor or the acceleration sensor attached to the camera 101. The output from the gyro sensor or the acceleration sensor is subjected to absolute value conversion after its high-frequency component is cut by a high-pass filter (HPF) and its low-frequency component is cut by a low-pass filter (LPF). The number of times in which a calculated absolute value exceeds a predetermined threshold value (indicated by ThreshB) during a predetermined time (indicated by TimeB) is measured. Vibration is detected depending on whether or not the measured number of times is equal to or larger than a predetermined number of times (indicated by CountB). For example, it can be determined whether a state of the camera 101 is a state in which the camera 101 is placed on a desk or the like, that is, a state in which shaking is small, or a state of the camera 101 is a state in which the camera 101 is worn on the body as a wearable camera and the user is walking, that is, a state in which shaking is large. A plurality of conditions are set in relation to conditions for a determination threshold value or the number of determination counts, it is possible to detect a detailed shaking state according to a shaking level. Each value of TimeB, ThreshB, and CountB can be changed according to the learning information.

In the above example, a method of detecting a specific shaking state by determining a detection value from the shaking detection sensor has been described. In addition, there is a method in which data from the shaking detection sensor, sampled within a predetermined time, is input to a shaking state determination device using a neural network (also referred to as an NN), and thus a specific shaking state registered in advance is detected by the trained NN. In this case, in S802 (reading of learning information), a weight parameter of the NN is read.

After the detection process in S804 is performed, the flow proceeds to the process in S805, and a process of detecting preset specific sound is performed. Here, several examples of changing a detection determination process on the basis of the learning information read in S802 will be described.

<Specific Voice Command Detection>

In a process of detecting a specific voice command, the specific voice command includes several commands registered in advance and a command based on a specific voice registered in the camera by the user.

<Specific Sound Recognition>

A sound scene is detected by a network on which machine learning has been performed in advance on the basis of a large amount of voice data. For example, specific scene such as "cheering", "applause", or "speaking" can be detected. A detection target scene is changed through learning.

<Sound Level Determination>

A sound level is detected by determining whether or not a magnitude of a voice level exceeds a predetermined magnitude (threshold value) over a predetermined time (threshold time). The threshold time, the threshold value, or the like is changed through learning.

<Sound Direction Determination>

A direction of sound is detected for sound with a predetermined loudness by a plurality of microphones disposed on a plane.

The above determination process is performed in the voice processing unit 214, and it is determined in S805 whether or not specific sound is detected on the basis of each setting learned in advance.

After the detection process in S805 is performed, the flow proceeds to the process in S806, and the second control unit 211 determines whether or not the supply of power to the first control unit 223 is turned off. If it is determined that the first control unit 223 (MainCPU) is in an OFF state, the flow proceeds to the process in S807, and if it is determined that the first control unit 223 (MainCPU) is in an ON state, the flow proceeds to the process in S811. In S807, a process of detecting whether a preset time has elapsed is performed. Here, a detection determination process is changed according to the learning information read in S802. The learning information transmitted when information is sent to the second control unit 211 through communication in S706 in FIG. 7. An elapsed time from transition from the ON state to the OFF state of the first control unit 223 is measured. If the measured elapsed time is equal to or longer than a predetermined time (indicated by TimeC), it is determined that the predetermined time has elapsed. If the measured elapsed time is shorter than TimeC, it is determined that the predetermined time has not elapsed. TimeC is a parameter changed according to learning information.

After the detection process in S807 is performed, the flow proceeds to the process in S808, and a process of determining whether or not conditions for canceling the low power consumption mode are established is performed. Cancelation of the low power consumption mode is determined on the basis of the following conditions.

(1) Specific shaking having been detected
(2) Specific sound having been detected
(3) Predetermined time having elapsed For (1), it is determined whether or not specific shaking has been detected is determined in S804 (specific shaking state detection process). For (2), it is determined whether or not specific sound has been detected in S805 (specific sound detection process). For (3), it is determined whether or not a predetermined time has elapsed in S807 (time passage detection process). If at least one of the conditions of (1) to (3) is satisfied, it is determined that the low power consumption mode is canceled. If it is determined that the low power consumption mode is canceled in S808, the flow proceeds to the process in S809, and, if the conditions for canceling the low power consumption mode are not satisfied, the flow returns to S801 and the process is continued.

The second control unit 211 turns on the supply of power to the first control unit 223 in S809, and notifies the first control unit 223 of a condition (any of shaking, sound, and time) under which the low power consumption mode is determined as being canceled in S810. The flow returns to S801 and the process is continued.

On the other hand, if transition occurs from S806 to S811 (if it is determined that the first control unit 223 is in an ON state), the flow proceeds to the process in S811. In S811, a process of notifying the first control unit 223 of the information acquired in S803 to S805 is performed, and then the flow returns to S801 such that the process is continued.

In the present embodiment, there is a configuration in which, even if the first control unit 223 is in an ON state, the second control unit 211 performs shaking detection or specific sound detection and notifies the first control unit 223 of the detection result. The present embodiment is not limited to this example, and may provide a configuration in which the processes in S803 to S805 are not performed if the first control unit 223 is in an ON state, and shaking detection or specific sound detection may be performed through the process (S702 in FIG. 7) in the first control unit 223.

As described above, the processes in S704 to S707 in FIG. 7 and the processes in FIG. 8 are performed, and thus a condition for transition to the low power consumption mode or a condition for canceling the low power consumption mode is learned on the basis of a user's operation. That is, it is possible to operate the camera according to a usability of the user who owns the camera 101. A learning method will be described later.

In the above example, the method of canceling the low power consumption mode on the basis of shaking detection, sound detection, and the passage of time has been described in detail, but the low power consumption mode may be canceled on the basis of environment information. Cancelation may be determined on the basis of whether an absolute amount of or an amount of change in temperature, atmospheric pressure, illuminance, humidity, or ultraviolet rays exceeds a predetermined threshold value as environment information, and a threshold value may be changed through learning that will be described later. The shaking detection, the sound detection, and detection information of the passage of time, or an absolute value or an amount of change in each piece of environment information may be determined on the basis of a neural network, and determination to cancel the low power consumption mode may be performed. In this determination process, determination conditions may be changed through learning that will be described later.

Figure 9A:
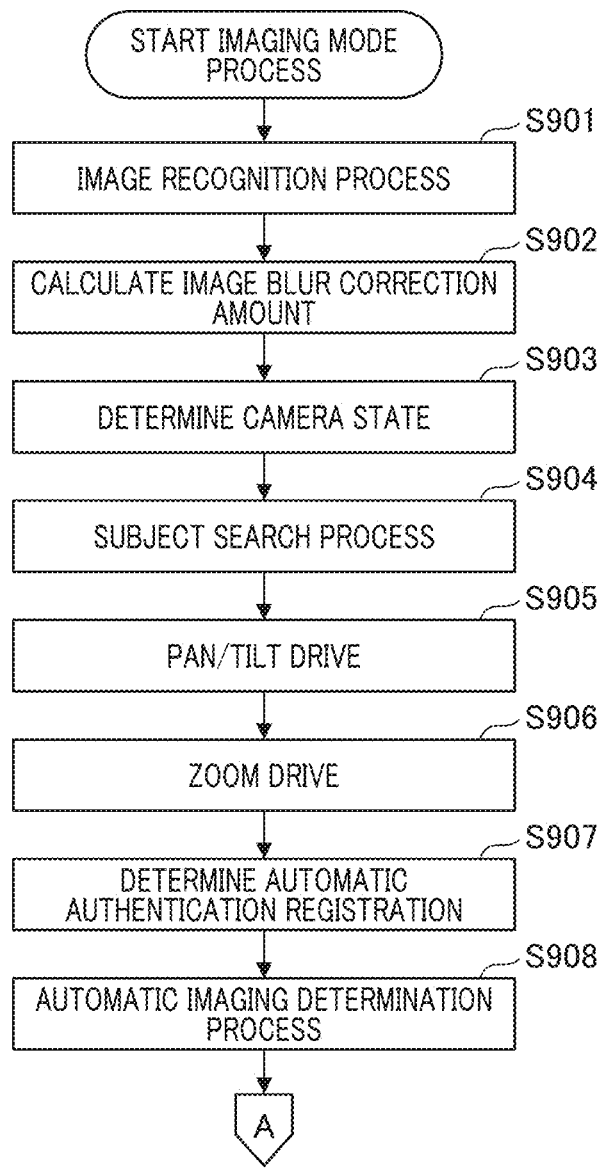

With reference to FIGS. 9A and 9B, S710 in FIG. 7 will be described. First, in S901 (image recognition process), the image processing unit 207 performs image processing on a signal fetched by the imaging unit 206 to generate an image for subject detection. A subject detection process of detecting a person, an object, or the like is performed on the generated image.

If a person as a subject is detected, the face or the human body of the subject is detected. In a face detection process, a pattern for determining the face of a person is set in advance, and a portion matching the pattern in a captured image may be detected as a face region of the person. The reliability indicating the certainty of the subject's face is also calculated. The reliability is calculated from, for example, a size of the face region in the captured image and the coincidence indicating the degree of matching with the face pattern. The same applies to object recognition, and an object that matches a pattern registered in advance may be recognized.

There is a method of extracting a feature subject by using a histogram of hue, saturation, or the like in a captured image. With respect to an image of a subject captured within an imaging angle of view, a process of dividing a distribution derived from the histogram of hue, saturation, or the like into a plurality of sections and classifying the captured image for each section is executed. For example, a histogram of a plurality of color components is created for the captured image, and the image is divided by a mountain-shaped distribution range. Images captured in regions belonging to the same combination of sections are classified, and an image region of the subject is recognized. An evaluation value for each recognized image region of the subject is calculated, and thus an image area of the subject having the highest evaluation value may be determined as a main subject region. According to the above method, each piece of subject information can be obtained from imaging information.

In S902, an image blur correction amount calculation process is performed. Specifically, first, an absolute angle of shaking of the camera is calculated on the basis of information regarding an angular velocity and an acceleration acquired by the device shaking detection unit 209. An image blur correction amount is acquired by driving the tilt rotation unit 104 and the pan rotation unit 105 in an angle direction that cancels out the absolute angle and obtaining an angle for correcting the image blur. A calculation method in the image blur correction amount calculation process here may be changed through a learning process that will be described later.

In S903, a state of the camera is determined. The current vibration/movement state of the camera is determined by using the camera angle and the amount of camera movement detected on the basis of the angular velocity information, the acceleration information, the GPS position information, and the like. For example, it is assumed that the camera 101 is attached to a vehicle and performs imaging. In this case, subject information such as a surrounding landscape changes greatly depending on a movement distance of the vehicle. Therefore, it is determined whether or not a state is a "vehicle moving state" in which the camera 101 is attached and is moving at a high speed, and the determination result is used for automatic subject search that will be described later. It is determined whether or not a change in an angle of the camera 101 is large. It is determined whether or not the camera 101 is in a "stationary imaging state" where there is almost no shaking, and if the camera 101 is in the "stationary imaging state", it can be determined that there is no change in a position of the camera 101 itself. In this case, it is possible to search for a subject for stationary imaging. If the change in the angle of the camera 101 is relatively large, it is determined that the camera 101 is in a "handheld state". In this case, it is possible to search for a subject for handheld imaging.

In S904, the subject search process is performed. Subject search includes the following processes.

(1) Area division
(2) Calculation of importance level for each area
(3) Determination of search target area Hereinafter, each process will be described in order.

(1) Area Division

Figure 10A:
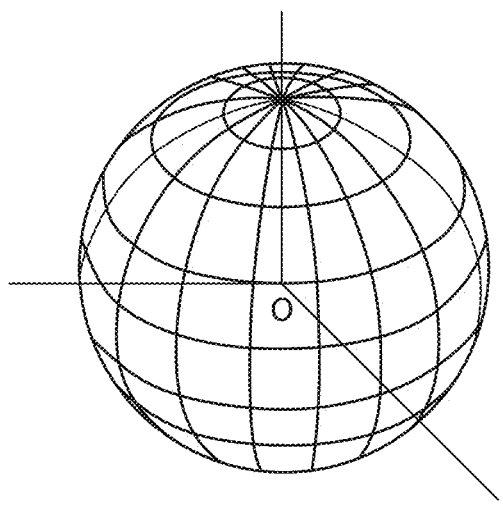
FIGS. 10A to 10D are diagrams illustrating area division in a captured image.
Figure 10B:
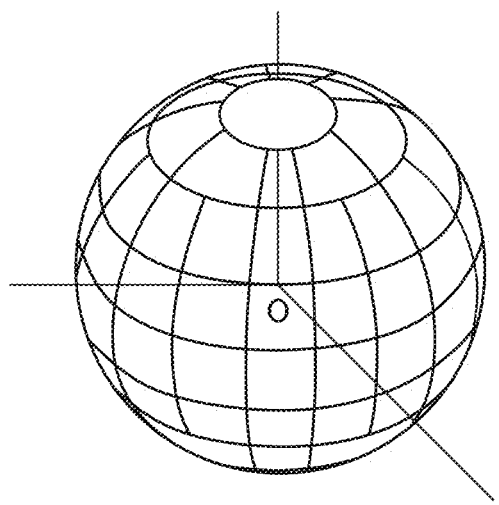
Figure 10C:
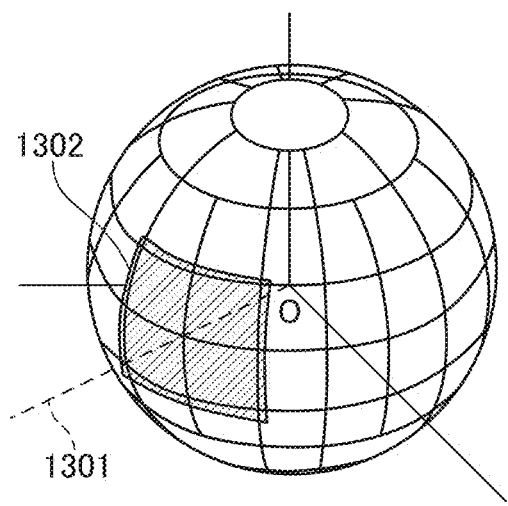
Figure 10D:
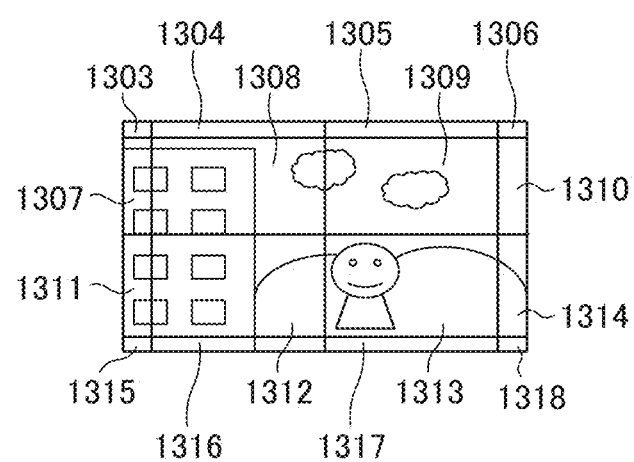

With reference to FIGS. 10A to 10D, the area division will be described. The origin O of a three-dimensional orthogonal coordinate system is set as a camera position. FIG. 10A is a schematic diagram illustrating an example in which an area is divided around the entire circumference centering on the camera position (origin O). In the example in FIG. 10A, the area is divided into areas every 22.5 degrees in each of the tilting direction and the panning direction. In the case of such division, as a tilting angle deviates from 0 degrees, the circumference in the horizontal direction becomes smaller and an area region becomes smaller. On the other hand, FIG. 10B is a schematic diagram illustrating an example in which a horizontal area range is set to be larger than 22.5 degrees if a tilting angle is 45 degrees or more. FIGS. 10C and 10D are schematic diagrams illustrating an example of an area-divided region within an imaging angle of view. An axis 1301 illustrated in FIG. 10C represents a direction of the camera 101 at the time of initialization, and the area is divided with the direction of the axis 1301 as a reference direction. An angle of view area 1302 of a captured image is illustrated, and an image example corresponding to the area is illustrated in FIG. 10D. In the image with the imaging angle of view, the image is divided as illustrated in in FIG. 10D on the basis of the area division. Examples of a plurality of divided regions 1303 to 1318 are illustrated.

(2) Calculation of Importance Level for Each Area

For each divided area, an importance level indicating a priority order of search is calculated according to a situation of a subject present in the area or a situation of a scene. The importance level based on the situation of the subject is calculated on the basis of, for example, the number of persons present in the area, a size of the person's face, an orientation of the face, the certainty of face detection, a facial expression of the person, and a personal authentication result for the person. The importance level according to the situation of the scene is calculated on the basis of, for example, a general object recognition result, a scene discrimination result (blue sky, backlight, evening scene, or the like), a sound level or a voice recognition result detected from a direction of the area, and motion detection information within the area.

If vibration of the camera is detected in the camera state determination (S903) in FIG. 9A, the importance level may be changed according to a vibration state. For example, it is assumed that the camera is determined as being in the "stationary imaging state". In this case, it is determined that the subject search is performed centering on a subject having a high priority (for example, an owner of the camera) among subjects registered by using face recognition. In automatic imaging that will be described later, for example, the face of the owner of the camera is preferentially imaged. Consequently, even if a time for which the owner of the camera performs imaging while wearing the camera is long, many images of the owner can be recorded by removing the camera and placing the camera on a desk or the like. In this case, since the face can be searched for through panning or tilting, the user can record images in which the owner is captured or a group photograph in which many faces are captured by simply installing the camera as appropriate without considering a camera placement angle, or the like.

Under the above conditions alone, the areas with the highest importance level may be the same unless there is a change in each area. As a result, the area to be searched for will not change forever. Therefore, a process of changing the importance level according to the past imaging information is performed. Specifically, a process of lowering the importance level for an area continuously designated as a search area over a predetermined time or a process of lowering the importance level for an area where imaging is performed in S910 that will be described later for a predetermined time is performed.

(3) Determination of Search Target Area

A process of determining an area having a high importance level as a search target area on the basis of on the importance level of each area calculated as described above is executed. Search target angles for panning and tilting required to capture the search target area at an angle of view are calculated.

In S905 in FIG. 9A, panning and tilting drive are performed. Specifically, a panning drive amount and a tilting drive amount are calculated by adding the image blur correction amount at a control sampling frequency to a drive angle based on the search target angles for panning and tilting. The tilt rotation unit 104 and the pan rotation unit 105 are driven and controlled by the lens barrel rotation drive unit 205.

In S906, zoom drive is performed by controlling the zoom unit 201. Specifically, the zoom drive is performed according to a state of the search target subject determined in S904. For example, a case where the search target subject is the face of a person is assumed. In this case, if a face size on the image is too small, the face may not be detected because the face is smaller than the minimum detectable size, and the subject may be lost. In such a case, control for increasing the face size on the image by performing zoom control to the telephoto side is performed. On the other hand, if a face size on the image is too large, the subject may easily deviate from an angle of view due to movement of the subject or the camera itself. In such a case, control for reducing the face size on the image by performing zoom control to the wide-angle side is performed. The zoom control is performed as described above, and thus it is possible to maintain a state appropriate for tracking the subject. The zoom control includes optical zoom control performed by driving a lens and an electronic zoom control for changing an angle of view through image processing. There is a form in which one of the types of control is performed and a form in which both types of control are combined.

S907 is a determination process for automatic authentication registration. It is determined whether or not automatic registration of personal authentication is possible on the basis of a subject detection status. If the face detection reliability is high and a state in which the face detection reliability is high is maintained, more detailed determination is performed. That is, if the face is facing the front of the camera instead of a profile, and if a face size is equal to or larger than a predetermined value, the state is determined as being appropriate for automatic registration of personal authentication.

Subsequent S908 is an automatic imaging determination process. In automatic imaging determination, determination of whether or not to perform automatic imaging and determination of an imaging method (determination of which of still image capturing, moving image capturing, continuous imaging, panoramic imaging, and the like is to be performed) are performed. The determination of whether or not to perform automatic imaging will be described later.

In S909, it is determined whether or not there is a manual imaging instruction. The manual imaging instruction includes an instruction given by pressing the shutter button, an instruction given by tapping the camera housing with the finger or the like (tap), an instruction given by inputting a voice command, an instruction from an external device, and the like. For example, an imaging instruction triggered by a tap operation is determined by detecting continuous high-frequency acceleration in a short period of time with the device shaking detection unit 209 when the user taps the camera housing. The voice command input method is an imaging instruction method in which the voice processing unit 214 recognizes the voice and imaging is triggered if the user speaks a password (for example, "take a picture") for giving an instruction for predetermined imaging. The instruction method from the external device is an imaging instruction method triggered by a shutter instruction signal transmitted by using a dedicated application from, for example, a smartphone connected to the camera through Bluetooth.

If it is determined in S909 that there is a manual imaging instruction, the flow proceeds to the process in S910. If it is determined in S909 that there is no manual imaging instruction, the flow proceeds to the process in S914. In S914, execution of automatic authentication registration is determined. It is determined whether or not to execute the automatic authentication registration by using a determination result of the possibility of the automatic authentication registration in S907 and a determination result of the possibility of the automatic imaging in S908. If it is determined in S914 that the automatic authentication registration is to be executed, the flow proceeds to the process in S915, and if it is determined that the automatic authentication registration is not to be executed, the flow proceeds to the process in S916. A specific example will be described with reference to FIG. 11.

FIG. 11 is a table illustrating determination of execution of the automatic authentication registration and the automatic imaging. An automatic authentication registration determination result is either "registration possible" or "registration not possible", and an automatic imaging determination result is either "imaging possible" or "imaging not possible". If it is determined that personal authentication is appropriate for registration, the personal authentication will be registered regardless of an automatic imaging determination result. If it is determined that the personal authentication is not appropriate for registration and conditions for automatic imaging are satisfied ("imaging possible"), automatic imaging will be performed.

The reason why the possibility of automatic authentication registration is prioritized is that stable front face information is required for automatic authentication registration. In automatic imaging, it may be determined that imaging is to be performed depending on factors such as a profile of a subject, a temporary smile, and an elapsed time from the previous imaging. However, it is infrequent that conditions appropriate for automatic authentication registration are established. Therefore, in the present embodiment, an algorithm that gives priority to a case where conditions appropriate for automatic authentication registration are obtained is provided.

There may be a viewpoint that giving priority to automatic authentication registration will hinder the opportunity for automatic photography. However, the reason why the viewpoint is wrong is that the accuracy of personal authentication is improved by performing automatic authentication registration, and the accuracy of searching and tracking a priority subject is improved, which is thus very useful for discovering imaging opportunities in automatic imaging. In the present embodiment, if it is determined that personal authentication is appropriate for registration, it is always treated with priority over a result of whether or not automatic imaging is possible. The present embodiment is not limited to this, and the priority may be changed according to the number of times of imaging or an imaging interval within a predetermined time in automatic imaging. For example, if the frequency of imaging in automatic imaging is low, control may be performed such that automatic imaging is temporarily prioritized.

S915 in FIG. 9B is a personal authentication registration process. A series of processes is executed in which an imaging process is performed by controlling a state to an imaging state appropriate for personal authentication and facial features are quantified and stored. Details thereof will be described with reference to FIGS. 12A and 12B.

Figure 12B:
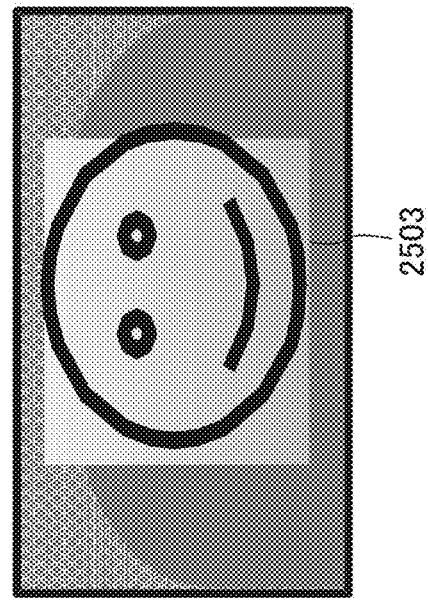
FIGS. 12A and 12B are diagrams illustrating subject disposition in a composition adjustment.
Figure 12A:
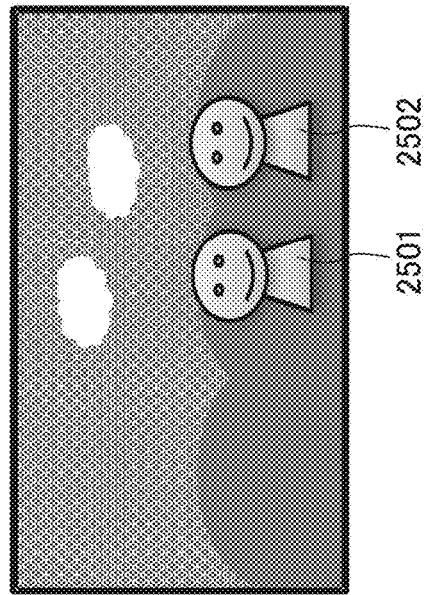

FIGS. 12A and 12B are schematic diagrams illustrating subject disposition in composition adjustment. FIG. 12A illustrates a composition at the time of automatically capturing a still image, and FIG. 12B illustrates a composition at the time of imaging for personal authentication. A composition is adjusted, and thus a state appropriate for personal authentication as shown in FIG. 12B is brought. In order to obtain facial features more accurately, it is important to place a subject at the center of an image, which is not easily affected by optical aberrations, and adjust a composition such that the face can be captured in a large size. On the other hand, if a still image is automatically captured in S910 that will be described later, it is better to adjust a composition such that a main subject and the background fit as illustrated in FIG. 12A, and thus a more satisfying photograph can be obtained.

If a manual imaging instruction from the user is generated in the personal authentication registration process, it may be possible to finish the imaging mode process by suspending the process of S915, and execute the imaging mode processing again. Control for composition adjustment is an operation of repeating panning, tilting, zoom lens drive, and checking of a face position based on face detection. The manual imaging instruction is checked at any time in this repeated operation, and the user's intention can be promptly reflected by stopping the personal authentication registration process if interruption is checked.

The automatic imaging is imaging in which image data output by the imaging unit is automatically recorded. In S916 of FIG. 9B, it is determined as follows whether or not to perform the automatic imaging. Specifically, it is determined that automatic imaging is to be executed in the following two cases. The first case is a case where an importance level exceeds a predetermined value on the basis of the importance level for each area obtained in S904. The second case is a case where a determination result based on the neural network is used, which will be described later. Recording in the automatic imaging is recording of image data in the memory 215 or recording of the image data in the nonvolatile memory 216. It is also assumed that the image data is automatically transmitted to the external device 301 and the image data is recorded in the external device 301.

In the present embodiment, control is performed such that imaging is to be automatically performed due to the automatic imaging determination process based on the neural network. Depending on a situation of an imaging location and a situation of the camera, it may be better to change determination parameters for automatic imaging. Unlike imaging at regular time intervals, automatic imaging control based on situational determination tends to prefer a form that meets the following demands.

(1) A large number of images including people and objects are desired to be captured.
(2) A memorable scene is not desired to be missed.
(3) Images are desired to be captured with low power consumption in consideration of a residual quantity of a battery and a remaining capacity of recording media.

The automatic imaging is performed if an evaluation value is calculated from a state of a subject, the evaluation value is compared with a threshold value, and the evaluation value exceeds the threshold value. The evaluation value in the automatic imaging is determined according to determination using a neural network.

Figure 13:
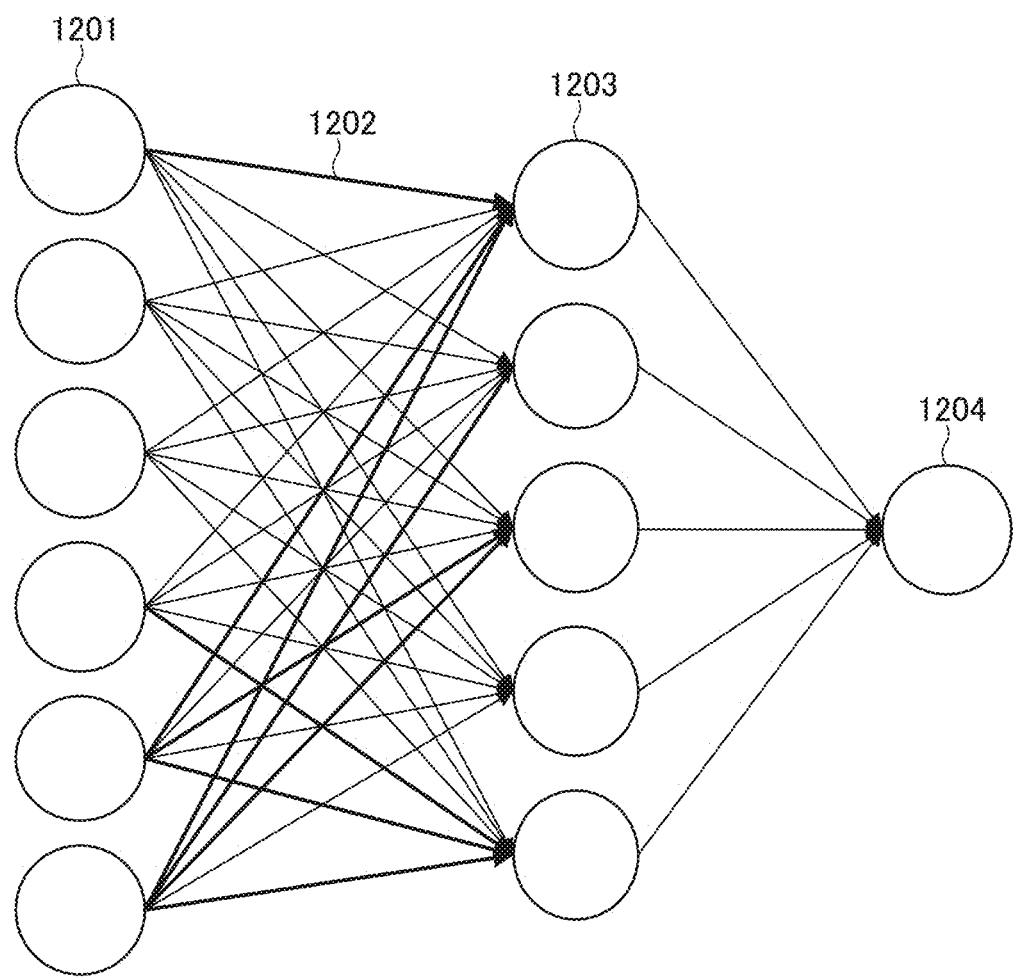
FIG. 13 is a diagram illustrating a neural network.

Next, the determination based on the neural network (NN) will be described. As an example of the NN, an example of a network using a multilayer perceptron is illustrated in FIG. 13. The NN is used to predict an output value from an input value. An input value and an output value that serves as a model for the input are learned in advance, and thus it is possible to estimate an output value that follows a learned model for a new input value. A learning method will be described later.

A node 1201 in FIG. 13 and a plurality of nodes indicated by circles arranged vertically thereof indicate neurons in an input layer. A node 1203 and a plurality of nodes indicated by circles arranged vertically thereof indicate neurons in a middle layer. A node 1204 indicates a neuron in an output layer. An arrow 1202 indicates a connection that connects the respective neurons to each other. In the determination based on the NN, the neuron in the input layer is given a feature amount based on a subject captured in the current angle of view, a scene, or a state of the camera as input. A value output from the output layer is acquired through calculation based on the forward propagation law of the multilayer perceptron. If the output value is equal to or greater than a threshold value, it is determined that automatic imaging is to be performed.

For example, the following information is used as a feature of a subject.

Information regarding a recognition result of a general object at the current zoom magnification and the current angle of view A face detection result, the number of faces captured in the current angle of view, a face smile degree, an eye closure degree, a face angle, a face authentication ID number, and a line-of-sight angle of a subject person A scene discrimination result, an elapsed time from the previous imaging, the current time, GPS position information, and an amount of change from the previous imaging position The current voice level, a speaking person, an applause, and information regarding whether or not cheers are raised Vibration information (acceleration information and a camera state), environment information (temperature, atmospheric pressure, illuminance, humidity, and an amount of ultraviolet rays), and the like If there is information notification from the external device 501, the notification information (user's kinetic information, arm action information, biological information such as a heart rate, and the like) is also used as feature information. The feature information is converted into a numerical value in a predetermined range and given to each neuron in the input layer as a feature amount. Thus, the number of necessary respective neurons in the input layer is the same as the number of feature amounts to be used.

In the determination based on the neural network, an output value can be changed by changing a connection weight between the respective neurons in the learning process that will be described later, and thus a determination result can be adapted to a learning result.

The determination of automatic imaging also changes depending on the starting conditions for the first control unit 223 read in S702 in FIG. 7. For example, in a case of starting due to tap detection or starting due to a specific voice command, it is very likely that the operation is an operation for giving an instruction for the current imaging according to the user's intention. Therefore, an imaging frequency is set to be high.

In the determination of an imaging method, execution of imaging determined on the basis of the state of the camera and the state of the surrounding subject detected in S901 to S904 is determined. Which of still image capturing, moving image capturing, continuous imaging, panoramic imaging, and the like is to be executed is determined. For example, if a person who is a subject is stationary, the still image capturing is selected and executed. If the subject is moving, the moving image capturing or the continuous imaging is executed. If a plurality of subjects are present to surround the camera, or it is determined that a place is a scenic spot on the basis of GPS information, the panoramic imaging process is executed. The panoramic imaging process is a process of generating a panoramic image by compositing sequentially captured images while performing panning and tilting drive of the camera. In the same manner as in the method of determining whether or not to perform automatic imaging, an imaging method may be determined by determining various information detected before imaging on the basis of the neural network. In this determination process, the determination conditions may be changed through the learning process that will be described later.

In S916 in FIG. 9B, if it is determined in the automatic imaging determination process in S908 that automatic imaging is to be performed, the flow proceeds to the process in S910. If it is determined in S916 that automatic imaging is not to be performed, the imaging mode process is finished. After S915 (automatic authentication registration process), the imaging mode process is finished.

In S910, the automatic imaging is started. That is, imaging according to the imaging method determined in S908 is started. In this case, the focus drive control unit 204 performs autofocus control. Further, exposure control is performed by using a diaphragm control unit, a sensor gain control unit, and a shutter control unit (not illustrated), and thus a subject is adjusted to have an appropriate brightness. After the imaging, the image processing unit 207 performs various well-known types of image processing such as automatic white balance processing, a noise reduction process, and a gamma correction process to generate image data.

If predetermined conditions are satisfied during the automatic imaging in S910, the camera may notify an imaging target person of imaging, and then the imaging may be performed. The predetermined conditions are set on the basis of, for example, the following information.

- The number of faces within an angle of view, a face smile degree, an eye closure degree, a line-of-sight angle of a subject person or a face angle, and a face authentication ID number
- The number of persons registered for personal authentication and a recognition result of a general object at the time of imaging
- Information regarding whether or not the current position based on a scene discrimination result, an elapsed time from the previous imaging, an imaging time, and GPS information is a scenic spot
- Information regarding a voice level at the time of imaging, the presence or absence of a speaking person, an applause, and whether or not cheers are raised
- Vibration information (acceleration information and a camera state), environment information (temperature, atmospheric pressure, illuminance, humidity, and an amount of ultraviolet rays), and the like As a notification method, for example, there is a method of using sound emitted from the voice output unit 218 and LED lighting by the LED control unit 224. Imaging with a notification is performed on the basis of these conditions, and thus it is possible to record a preferable image of the camera's line of sight in a scene of high importance. As for a notification before imaging, information regarding a captured image or various information detected before imaging may be determined on the basis of the neural network, and a notification method or a timing may be determined. In this determination process, the determination conditions may be changed through the learning process that will be described later.

In S911, an editing process such as processing the image generated in S910 and adding the processed image to a moving image is executed. Specifically, the image processing includes a trimming process based on a person's face or an in-focus position, an image rotation process, high dynamic range (HDR) effect processing, blurring effect processing, color conversion filter effect processing, and the like. In the image processing, a plurality of processed images are generated through a combination of the above processes on the basis of the image data generated in S910. A process of storing the image data separately from the image data generated in S910 may be performed. As for the moving image processing, a process or the like of adding a captured moving image or still image to the generated edited moving image while performing special effect processing such as slide, zoom, and fade is performed. Regarding the editing process in S911, an image processing method may be determined by determining information regarding a captured image or various information detected before the imaging on the basis of the neural network. In this determination process, the determination conditions may be changed through the learning process that will be described later.

In S912, a learning information generation process for the captured image is performed. This process is a process of generating and recording information used for the learning process that will be described later. Specifically, for example, there is the following information.

- Zoom magnification at the time of imaging, a general object recognition result at the time of imaging, a face detection result, the number of faces in a captured image, a face smile degree, an eye closure degree, a face angle, a face authentication ID number, and a line-of-sight angle of a subject person, in the image captured this time
- A scene discrimination result, an elapsed time from the previous imaging, an imaging time, GPS position information, and an amount of change from the previous imaging position
- Information regarding a voice level at the time of imaging, a speaking person, an applause, and whether or not cheers are raised
- Vibration information (acceleration information and a camera state), environment information (temperature, atmospheric pressure, illuminance, humidity, and an amount of ultraviolet rays), and the like
- Moving image capturing time, information regarding whether or not there is a manual imaging instruction, and the like A score that is an output of a neural network that quantifies the user's preference for an image is calculated. A process of generating such information and recording the information as tag information in a captured image file is executed. Alternatively, there is a method of storing the information in the nonvolatile memory 216 or storing the information regarding each captured image as so-called catalog data in the recording medium 221 in a list form.

In S913, a process of updating the past imaging information is performed. Specifically, the process is a process of updating the number of captured images for each area described in S908, the number of captured images for each person registered for personal authentication, the number of captured images for each subject recognized through general object recognition, and the number of captured images for each scene subjected to scene discrimination. That is, a process of increasing a count number of the corresponding number of images captured this time by one is performed. Simultaneously, a process in which the current imaging time and an evaluation value for automatic imaging are stored and retained as imaging history information is performed. After S913, a series of processes is finished.

Next, learning in accordance with a user's preference will be described. In the present embodiment, the learning processing unit 219 performs learning in accordance with the user's preference on the basis of a neural network (NN) as illustrated in FIG. 13 by using a machine learning algorithm. The NN is used to predict an output value from an input value, and an output value can be estimated for a new input value by learning an actual value of the input value and an actual value of the output value in advance. It is possible to perform learning in accordance with the user's preference for the above-described automatic imaging, automatic editing, and subject search by using the NN. Registration of subject information (results of face recognition, general object recognition, and the like), which is also feature data to be input to the NN, imaging notification control, low power consumption mode control, and automatic file deletion are also be changed through learning.

In the present embodiment, examples of operations to which the learning process is applied is shown below.
(1) Automatic imaging
(2) Automatic editing
(3) Subject search
(4) Subject registration
(5) Imaging notification control
(6) Low power consumption mode control
(7) Automatic file deletion
(8) Image blur correction
(9) Automatic image transmission Among the operations to which the learning process is applied, (2) automatic editing, (7) automatic file deletion, and (9) automatic image transmission are not directly related to the spirit of the present invention, and thus description thereof will be omitted.

<Automatic Imaging>

Learning of automatic imaging will be described. In the automatic imaging, learning for automatically capturing an image in accordance with the user's preference is performed. As described with reference to FIG. 9B, the learning information generation process (S912) is performed after imaging (after S910). This is a process in which an image to be learned is selected according to a method that will be described later, and learning is performed by changing a weight of an NN on the basis of learning information included in the image. The learning is performed by changing an NN for determining an automatic imaging timing and changing an NN for determining an imaging method (still image capturing, moving image capturing, continuous imaging, panoramic imaging, and the like).

<Subject Search>

Learning of subject search will be described. In the subject search, learning for automatically searching for a subject in accordance with the user's preference is performed. In the subject search process (S904) in FIG. 9A, an importance level of each area is calculated, and a subject search is performed through panning, tilting, and zoom drive. The learning is performed on the basis of a captured image or detection information during the search, and is reflected as a learning result by changing a weight of an NN. It is possible to perform subject search in which a learning result is reflected by inputting various detection information during a search operation to the NN and determining an importance level. In addition to calculating the importance level, a search method (a speed or a frequency of movement) is controlled by panning and tilting.

<Subject Registration>

Learning of subject registration will be described. In the subject registration, learning for automatically registering or ranking subjects in accordance with the user's preference is performed. As the learning, for example, face authentication registration, general object recognition registration, gesture or voice recognition, and scene recognition registration using sound are performed. Authentication registration for people and objects is performed, and ranking is set on the basis of the number of times or a frequency of image acquisition, the number of times or a frequency of manual imaging, and a frequency of appearance of a subject during search. Each piece of information is registered as an input for determination using a neural network.

<Imaging Notification Control>

Learning of imaging notification will be described. As described in S910 in FIG. 9B, when predetermined conditions are satisfied immediately before imaging, the camera notifies the imaging target person that the imaging is performed, and then performs the imaging. For example, a process in which the subject's line of sight is visually guided through panning and tilting drive or attention of the subject is attracted by using speaker sound emitted from the voice output unit 218 or LED light from the LED control unit 224 is executed. It is determined whether or not detection information is used for learning on the basis of whether or not the detection information for the subject (for example, a smile degree, line-of-sight detection, and a gesture) is acquired immediately after the notification, and the learning is performed by changing a weight of an NN.

Each piece of the detection information immediately before imaging is input to the NN, and it is determined whether or not to provide a notification. A sound level, and the type and timing of the sound in a case of notification sound, and a lighting time, speed, and a camera orientation (panning/tilting motion) in a case of notification light are determined.

<Low Power Consumption Mode Control>

As described with reference to FIGS. 7 and 8, control for turning on/off the supply of power to the first control unit 223 (MainCPU) is performed. A condition for returning from the low power consumption mode and a condition for transitioning to the low power consumption state are learned. First, learning of conditions for canceling the low power consumption mode will be described.

Sound Detection

Learning may be performed by manually setting the user's specific voice, a specific sound scene desired to be detected, or a specific sound level, for example, through communication using a dedicated application of the external device 301. There is a method in which a plurality of detection methods are set in advance in the voice processing unit, and an image to be learned is selected according to a method that will be described later. Learning can be performed by learning information regarding the front and back sounds included in the selected image and setting sound determination (a specific sound command, or a sound scene such as "cheers" and "applause") as a starting factor.

Environment Information Detection

Learning can be performed by manually setting a change in environment information that the user wants to use as a starting condition, for example, through communication using a dedicated application of the external device 301. For example, specific conditions such as absolute amounts of or amounts of changes in temperature, atmospheric pressure, illuminance, humidity, and ultraviolet rays are set, and the imaging device can be started if the conditions are satisfied. A determination threshold value based on each piece of environment information may be learned. If it is determined that the factor is not a starting factor on the basis of camera detection information after starting based on the environment information, a parameter for each determination threshold value is set such that it is difficult to detect an environmental change.

Each of the above parameters also changes depending on a residual quantity of the battery. For example, when the residual quantity of the battery is small, it is difficult to transition to various determinations, and when the residual quantity of the battery is large, it is easy to transition to various determinations. Specifically, even in a shaking state detection result or a sound scene detection result, which is not a factor when the user intends to start the camera, it may be determined that the camera is to be started if the residual quantity of the battery is large.

Determination of cancelation conditions for the low power consumption mode may also be performed on the basis of the neural network by using shaking detection information, sound detection information, time passage detection information, each piece of environment information, a residual quantity of the battery, and the like. In this case, an image to be learned is selected according to a method that will be described later, and learning is performed by changing a weight of an NN on the basis of learning information included in the image.

Next, learning of transition conditions for a low power consumption state will be described. As illustrated in FIG. 7, in the mode setting determination in S704, if it is determined that the operation mode is not any of the "automatic imaging mode", the "automatic editing mode", the "automatic image transmission mode", the "learning mode", and the "automatic file deletion mode", the operation mode transitions to the low power consumption mode. The determination conditions for each mode are as described above, but the determination conditions for each mode are also changed through learning.

<Automatic Imaging Mode>

An importance level for each area is determined, and automatic imaging is performed while searching for a subject through panning and tilting. If it is determined that there is no imaging target subject, the automatic imaging mode is canceled. For example, if an importance level of all areas or a sum of the importance levels of the respective areas is equal to or less than a predetermined threshold value, the automatic imaging mode is canceled. In this case, a setting is made in which the predetermined threshold value is reduced according to an elapsed time from transition to the automatic imaging mode. As the elapsed time from the transition to the automatic imaging mode becomes longer, the transition to the low power consumption mode becomes easier.

It is possible to perform low power consumption mode control in consideration of a usable time of the battery by changing the predetermined threshold value according to a residual quantity of the battery. For example, when the residual quantity of the battery is small, the threshold value is increased to facilitate transition to the low power consumption mode, and when the residual quantity of the battery is large, the threshold value is reduced to make it difficult to transition to the low power consumption mode. Here, a parameter (elapsed time threshold value TimeC) for the next low power consumption mode cancelation condition is set in the second control unit 211 according to an elapsed time from the time of the previous transition to the automatic imaging mode and the number of captured images. Each of the above threshold values is changed through learning. Learning is performed by manually setting an imaging frequency, a starting frequency, or the like through communication using, for example, a dedicated application of the external device 301.

There may be a configuration in which an average value of an elapsed time from the time at which the power button of the camera 101 is turned on to the time at which the power button is turned off or distribution data for each time period is accumulated, and each parameter is learned. In this case, for a user whose elapsed time from the power ON time to the power OFF time is short, a time interval for returning from the low power consumption mode or transitioning to the low power consumption state is reduced through learning. On the contrary, for a user whose elapsed time from the power ON time to the power OFF time is long, the time interval is increased through learning.

Learning is also performed based on the detection information during the subject search. While it is determined that there are many important subjects set, the time interval for returning from the low power consumption mode and transitioning to the low power consumption state is shortened by learning. Conversely, while it is determined that there are few important subjects, the time interval becomes longer due to learning.

<Image Blur Correction>

Learning of image blur correction will be described. The image blur correction amount is calculated in S902 in FIG. 9A, and the image blur correction is performed through panning and tilting drive in S905 on the basis of the image blur correction amount. In the image blur correction, learning for performing correction in accordance with features of the user's shaking is performed. For example, a point spread function (PSF) is used for a captured image, and thus it is possible to estimate a direction and a magnitude of the blur. In the learning information generation in S912 in FIG. 9B, information regarding the estimated blur direction and magnitude is added to the image data.

In the learning mode process in S716 in FIG. 7, a process of learning a weight of the NN for image blur correction is performed on predetermined input information and output (estimated direction and magnitude of the blur). The predetermined input information is, for example, each piece of detection information at the time of imaging (motion vector information in an image at a predetermined time before imaging, motion information of a detected subject (a person or an object), and vibration information (gyro output, acceleration output, and a camera state). Environment information (temperature, atmospheric pressure, illuminance, and humidity), sound information (sound scene determination, specific voice detection, and a sound level change), time information (an elapsed time from starting and an elapsed time from the previous imaging), place information (GPS position information and a position movement change amount), and the like may be added to the input.

When the image blur correction amount is calculated in S902 in FIG. 9A, each of the pieces of detection information is input to the neural network, and thus it is possible to estimate a magnitude of the blur when an image is captured at that moment. When the estimated magnitude of the blur is more than a threshold value, control such as increasing a shutter speed may be performed. If the estimated magnitude of the blur is more than the threshold value, a blurred image may be acquired, and thus there is a method of prohibiting imaging.

Since a drive angle of panning or tilting is restricted, further image blur correction cannot be performed after reaching a drive end. In the present embodiment, a magnitude and a direction of the blur during imaging are estimated, and thus it is possible to estimate a range required for panning or tilting drive for correcting image blur during exposure. Regarding a drive angle of panning or tilting, if there is no margin in a movable range during exposure, a process is executed in which a drive angle is set not to exceed the movable range by increasing a cutoff frequency of a filter used to calculate an image blur correction amount. Consequently, it is possible to suppress large blur. If it is predicted that the drive angle will exceed the movable range, the drive angle is changed immediately before exposure, rotation is performed in a direction opposite to a direction in which the drive angle will exceed the movable range, and exposure is started. Consequently, it is possible to perform imaging in which image blur is suppressed while securing a movable range. Image blur of captured images can be suppressed or prevented through learning related to image blur correction in accordance with a feature of a user during imaging or a usage of the camera.

In the imaging method determination of the present embodiment, a panning determination process may be performed. In panning, an image is not blurred with respect to a moving subject, and the image is captured to flow against a non-moving background. In a process of determining whether or not to perform panning, drive speeds of panning and tilting for imaging a subject without blur are estimated from detection information before imaging, and image blur for the subject is corrected. In this case, the drive speeds can be estimated by inputting the information to the neural network in which each of the pieces of detection information has already been learned. An image is divided into a plurality of blocks and a PSF of each block is estimated, and thus a direction and a magnitude of blur in a block in which a main subject is located are estimated. Learning is performed on the basis of such information.

An amount of background flow may also be learned from information regarding an image selected by the user. In this case, a magnitude of blur in the block (image region) where the main subject is not located is estimated, and thus the user's preference can be learned on the basis of information regarding the magnitude. A shutter speed at the time of imaging is set on the basis of a background flow amount in accordance with the learned preference, and thus it is possible to automatically perform imaging in which a panning effect in accordance with the user's preference can be obtained.

Next, a learning method will be described. As the learning method, there are "learning in the camera" and "learning based on cooperation with an external device such as a communication device". First, the former learning method will be described. The learning in the camera in the present embodiment includes the following methods.

(1) Learning Based on Detection Information During Manual Imaging

As described in S907 to S913 in FIG. 9A, the camera 101 can perform manual imaging and automatic imaging. If there is a manual imaging instruction in S907, information indicating that the image is manually captured is added to the captured image in S912. If it is determined in S916 that the automatic imaging is ON and the image is captured, in S912, information indicating that the image is automatically captured is added to the captured image. In the case of manual imaging, it is very likely that the imaging was performed on the basis of a subject, a scene, and a place or a time interval in accordance with the user's preference. Therefore, learning is performed on the basis of each piece of feature data obtained at the time of manual imaging or learning data for the captured image. Learning is performed regarding extraction of feature amounts in captured images, registration of personal authentication, registration of facial expressions for each individual, and registration of combinations of people on the basis of detection information at the time of manual imaging. For example, learning for changing the importance of a person or an object in the vicinity from a facial expression of a personally registered subject is performed on the basis of detection information at the time of subject search.

(2) Learning Based on Detection Information when Searching for Subject

During the subject search, it is determined what kind of person, object, and scene a subject registered for personal authentication is being captured at the same time, and a time ratio at which the subject is captured within an angle of view at the same time is also calculated. For example, a time ratio at which a person A who is a subject registered for personal authentication is captured at the same time as a person B who is a subject registered for personal authentication is calculated. If the person A and the person B enter the angle of view, various detection information is stored as learning data such that a score for the automatic imaging determination is high, and learning is performed in the learning mode processing (FIG. 7: S716). In another example, a time ratio at which the person A who is a subject registered for personal authentication is captured at the same time as a "cat" that is a subject determined through general object recognition is calculated. If the person A and the "cat" enter the angle of view, various detection information is stored as learning data such that a score for the automatic imaging determination is high, and learning is performed in the learning mode process (FIG. 7: S716).

If a high smile level of the person A who is a subject registered for personal authentication is detected, or if a facial expression such as "joy" or "surprise" is detected, it is learned that a subject captured at the same time is important. Alternatively, if a facial expression such as "anger" or "straight face" is detected in the person A, it is determined that a subject captured at the same time is unlikely to be important, and learning is not performed.

Next, the following learning based on cooperation with an external device in the present embodiment will be described.

(1) Learning when the external device acquires an image
(2) Learning when a determination value is input to an image via the external device
(3) Learning when an image stored in the external device is analyzed
(4) Learning from information uploaded to a social networking service (SNS) server by the external device
(5) Learning when a camera parameter is changed by the external device
(6) Learning from information in which an image is manually edited by the external device Description will be made in order according to the given number.

<Learning when External Device Acquires Image>

As described with reference to FIG. 3, the camera 101 and the external device 301 have communication units configured to perform the first and second communications 302 and 303. Generally, image data is transmitted and received through the first communication 302, and an image in the camera 101 may be transmitted to the external device 301 by using a dedicated application of the external device 301. A thumbnail image of the image data stored in the camera 101 can be viewed by using a dedicated application of the external device 301. The user may transmit image data to the external device 301 by selecting and confirming an image that the user likes from among the thumbnail images or by performing an image acquisition instruction operation. The image obtained by the user selecting an image is very likely to be an image in accordance with the user's preference. Therefore, it is determined that the acquired image is an image to be learned. Various types of learnings in accordance with the user's preference can be performed on the basis of the learning information for the acquired image.

Figure 14:
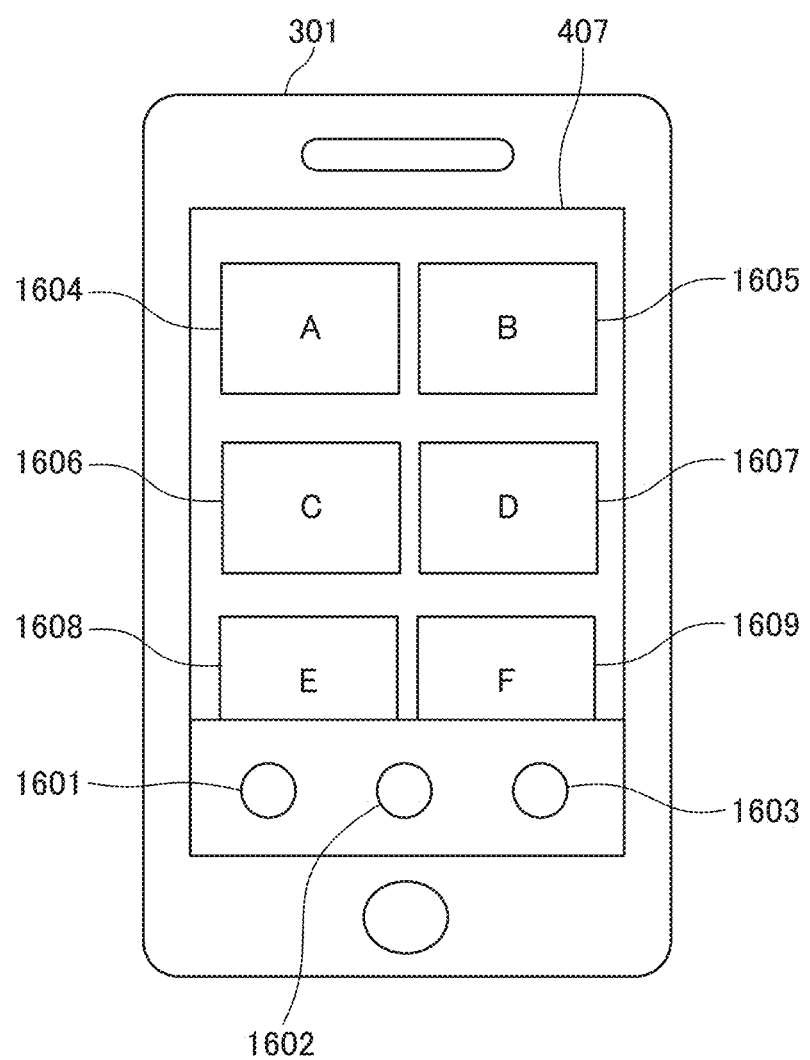
FIG. 14 is a diagram illustrating an image viewing state in the external device.

An operation example will be described with reference to FIG. 14. FIG. 14 is a diagram illustrating an example in which a user views an image in the camera 101 by using a dedicated application of the external device 301. Thumbnail images 1604 to 1609 of image data stored in the camera are displayed on the display unit 407. The user can select and acquire an image that the user likes. Buttons 1601 to 1603 are operated if a display method is changed, and configure a display method changing unit.

When the first button 1601 is pressed, the mode is changed to a date-and-time priority display mode, and images are displayed on the display unit 407 in the order of the capturing date and time of the images in the camera 101. For example, an image of which the date and time is new is displayed at the position indicated by the thumbnail image 1604, and an image of which the date and time is old is displayed at the position indicated by the thumbnail image 1609. When the second button 1602 is pressed, the mode is changed to a recommended image priority display mode. The images in the camera 101 are displayed on the display unit 407 in descending order of scores on the basis of the score for determining the user's preference for each image calculated in S912 in FIG. 9B. For example, an image having a high score is displayed at the position indicated by the thumbnail image 1604, and an image having a low score is displayed at the position indicated by the thumbnail image 1609. When the user presses the third button 1603, a subject such as a person or an object can be designated, and then when a subject such as a specific person or object is specified, only the specific subject can be displayed.

The buttons 1601 to 1603 can also turn on settings at the same time. For example, if all the settings are turned on, only a designated subject is displayed, an image with a new capturing date and time is prioritized, and an image with a high score is preferentially displayed. As described above, since the user's preference is also learned for the captured images, it is possible to extract only an image in accordance with the user's preference from a large number of captured images through a simple confirmation operation.

<Learning when Determination Value is Input to Image Via External Device>

With respect to viewing the images stored in the camera 101, the user may score each image. A high score (for example, five points) may be given to an image that the user thinks to like, and a low score (for example, one point) may be given to an image that the user does not like. The camera is configured to learn a determination value for an image according to the user operation. The score for each image is used for relearning together with the learning information in the camera. Learning is performed such that an output of a neural network with feature data from designated image information as an input approaches a score designated by the user.

In addition to the configuration in which the user inputs a determination value to a captured image via the external device 301, there is a configuration in which the user operates the camera 101 to directly input the determination value to the image. In this case, for example, the camera 101 includes a touch panel display. The user operates a graphical user interface (GUI) button displayed on a screen display unit of the touch panel display to set a mode for displaying a captured image. The user can perform the same learning as described above by inputting a determination value to each image while checking captured images.

<Learning when Image Stored in External Device is Analyzed>

Images other than images captured by the camera 101 are also recorded in the storage unit 404 of the external device 301. The images stored in the external device 301 are easy for the user to view and are also easy to upload to a shared server via the public wireless control unit 406, and are thus very likely to include many images in accordance with the user's preference.

It is assumed that the control unit 411 of the external device 301 can process the images stored in the storage unit 404 with the same ability as that of the learning processing unit 219 of the camera 101 by using a dedicated application. Learning is performed by transmitting the processed learning data to the camera 101 through communication. Alternatively, there may be a configuration in which an image or data desired to be learned is transmitted to the camera 101 and learning is performed in the camera 101. There may be a configuration in which the user selects an image desired to be learned from among the images stored in the storage unit 404, and learning is performed by using a dedicated application.

<Learning from Information Uploaded to SNS Server by External Device>

A description will be made of a method in which information in a social networking service (SNS) that is a service or a website that can build social networks that focus on people-to-people connections is used for learning. When an image is uploaded to an SNS, there is a technique of inputting a tag related to the image from the external device 301 and then transmitting the tag together with the image. There is also a technique for inputting likes and dislikes of images uploaded by other users. It may also be determined whether an image uploaded by another user is a favorite photograph of the user who owns the external device 301.

An image uploaded by the user and information regarding the image can be acquired by a dedicated SNS application downloaded in the external device 301. It is also possible to acquire user's favorite image or tag information by inputting data as to whether or not the user likes an image uploaded by another user. Learning is performed in the camera 101 by analyzing such image or tag information.

The control unit 411 of the external device 301 acquires an image uploaded by the user or an image determined to be liked by the user, and can process the image with the same ability as that of the learning processing unit 219 of the camera 101. Learning is performed by transmitting the processed learning data to the camera 101 through communication. Alternatively, there may be a configuration in which an image data desired to be learned is transmitted to the camera 101 and learning is performed in the camera 101.

It is possible to estimate subject information that the user may like on the basis of subject information (for example, object information such as dogs and cats, scene information such as beaches, and facial expression information such as smiles) set in the tag information. Learning is performed by registering the subject as a subject to be input to the neural network and to be detected. There may be a configuration in which image information currently popular in the world is estimated on the basis of statistical values of tag information (image filter information or subject information) in the SNS, and is learned in the camera 101.

<Learning when Camera Parameter is Changed by External Device>

Learning parameters (such as a weight of the NN and selection of a subject to be input to the NN) currently set in the camera 101 may be transmitted to the external device 301 and stored in the storage unit 404 of the external device 301. The learning parameters set in a dedicated server are acquired via the public wireless control unit 406 by using the dedicated application of the external device 301. This may also be set as a learning parameter in the camera 101. The learning parameters can be returned by storing the parameters at a certain point in the external device 301 and setting the parameters in the camera 101. Learning parameters possessed by other users may be acquired via the dedicated server and set in the owner's own camera 101.

A voice command, authentication registration, and a gesture registered by the user may be registered by using the dedicated application of the external device 301, or an important place may be registered. These pieces of information are handled as input data for an imaging trigger and automatic imaging determination described in the imaging mode process (FIGS. 9A and 9B). There may be a configuration in which an imaging frequency, a starting interval, a ratio between a still image and a moving image, a favorite image, and the like can be set, and the starting interval and the like described in the low power consumption mode control are set.

<Learning from Information in which Image is Manually Edited by External Device>

The dedicated application of the external device 301 may have a function that allows manual editing according to the user's operation, and may feed back details of editing work to learning. For example, it is possible to edit image effect additions (a trimming process, a rotation process, slide, zoom, fade, a color conversion filter effect, a time, a still image/moving image ratio, and BGM). The automatic editing neural network is trained so that the manually edited image effect additions are determined for image learning information.

Next, a learning process sequence will be described. In the mode setting determination in S704 in FIG. 7, it is determined whether or not the learning process is to be performed. If it is determined that the learning process is to be performed, the learning mode process in S716 is executed. The determination conditions for the learning mode will be described. Determination of whether or not to transition to the learning mode is performed on the basis of information such as an elapsed time from the time of performing the previous learning process, the number of pieces of information that can be used for learning, and whether or not there is an instruction for the learning process via a communication device. The learning mode determination process will be described with reference to FIG. 15.

Figure 15:
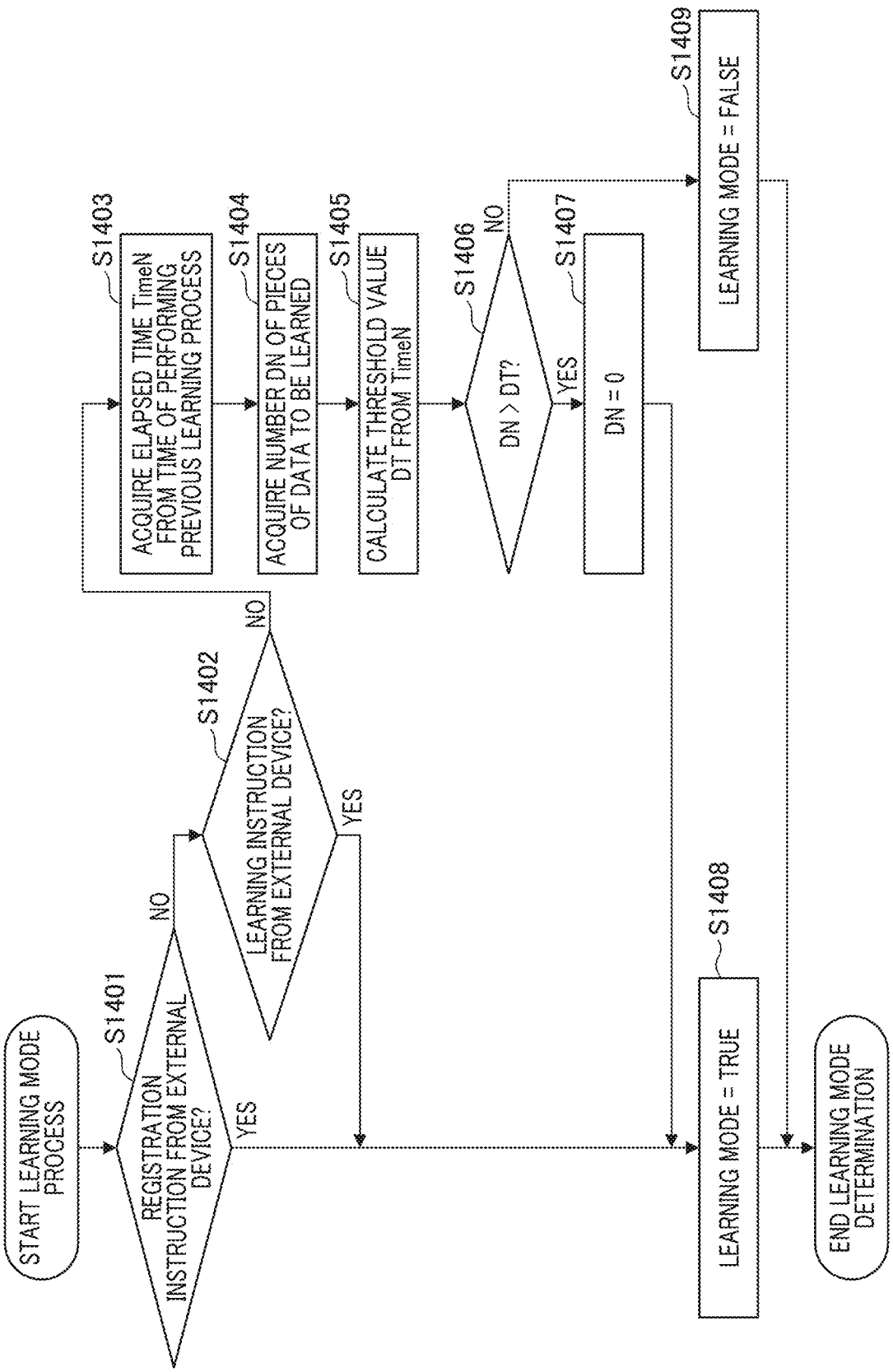
FIG. 15 is a flowchart illustrating learning mode determination.

FIG. 15 is a flowchart illustrating a determination process of whether or not to transition to the learning mode, which is executed in S704 (mode setting determination process) in FIG. 7. When an instruction for starting the learning mode determination is given in the mode setting determination process in S704, the process in FIG. 15 is started. In S1401, it is determined whether or not there is a registration instruction from the external device 301. This registration instruction is a registration instruction for learning such as the above <learning when external device acquires image>, <learning when determination value is input to image via external device>, and <learning when image stored in external device is analyzed>.

If it is determined in S1401 that there is a registration instruction from the external device 301, the flow proceeds to the process in S1408. In S1408, a learning mode determination flag is set to TRUE such that the process in S716 is set to be performed, and then the learning mode determination process is finished. If it is determined in S1401 that there is no registration instruction from the external device 301, the flow proceeds to the process in S1402.

In S1402, it is determined whether or not there is a learning instruction from the external device 301. This learning instruction is an instruction for setting a learning parameter, as in the above <learning when camera parameter is changed by external device>. If it is determined in S1402 that there is a learning instruction from the external device 301, the flow proceeds to the process in S1408. If it is determined in S1402 that there is no learning instruction from the external device 301, the flow proceeds to the process in S1403.

In S1403, an elapsed time (indicated by TimeN) from the time of performing the previous learning process (recalculation of a weight of an NN) is acquired. The flow proceeds to the process in S1404, and the number of pieces of new data to be learned (indicated by DN) is acquired. The number DN of the pieces of data corresponds to the number of images designated to be learned during the elapsed time TimeN from the time of performing the previous learning process.

Next, the flow proceeds to the process in S1405, and a threshold value DT for determining whether or not to transition to the learning mode is calculated on the basis of the elapsed time TimeN. As the threshold value DT is set to a smaller value, it becomes easier to transition to the learning mode. For example, a value of the threshold value DT if TimeN is smaller than a predetermined value is indicated by DTa, and a value of the threshold value DT if TimeN is greater than the predetermined value is indicated by DTb. DTa is set to be greater than DTb, and the threshold value is set to become smaller with the passage of time. Consequently, even if the number of pieces of learning data is small, if the elapsed time is long, it becomes easy to transition to the learning mode, and learning is performed again. That is, the setting of ease and difficulty of transition of the camera to the learning mode is changed according to a usage time.

After the process in S1405, the flow proceeds to the process in S1406, and it is determined whether or not the number DN of pieces of data to be learned is more than the threshold value DT. If it is determined that the number DN of pieces of data is more than the threshold value DT, the flow proceeds to the process in S1407, and if it is determined that the number DN of pieces of data is equal to or less than the threshold value DT, the flow proceeds to the process in S1409. In S1407, the number DN of pieces of data is set to zero. Thereafter, the process in S1408 is executed, and then the learning mode determination process is finished.

If the flow proceeds to the process in S1409, since there is no registration instruction or learning instruction from the external device 301 and the number DN of pieces of data is equal to or less than the threshold value DT, the learning mode determination flag is set to FALSE. After the process in S716 is set not to be performed, the learning mode determination process is finished.

Figure 16:
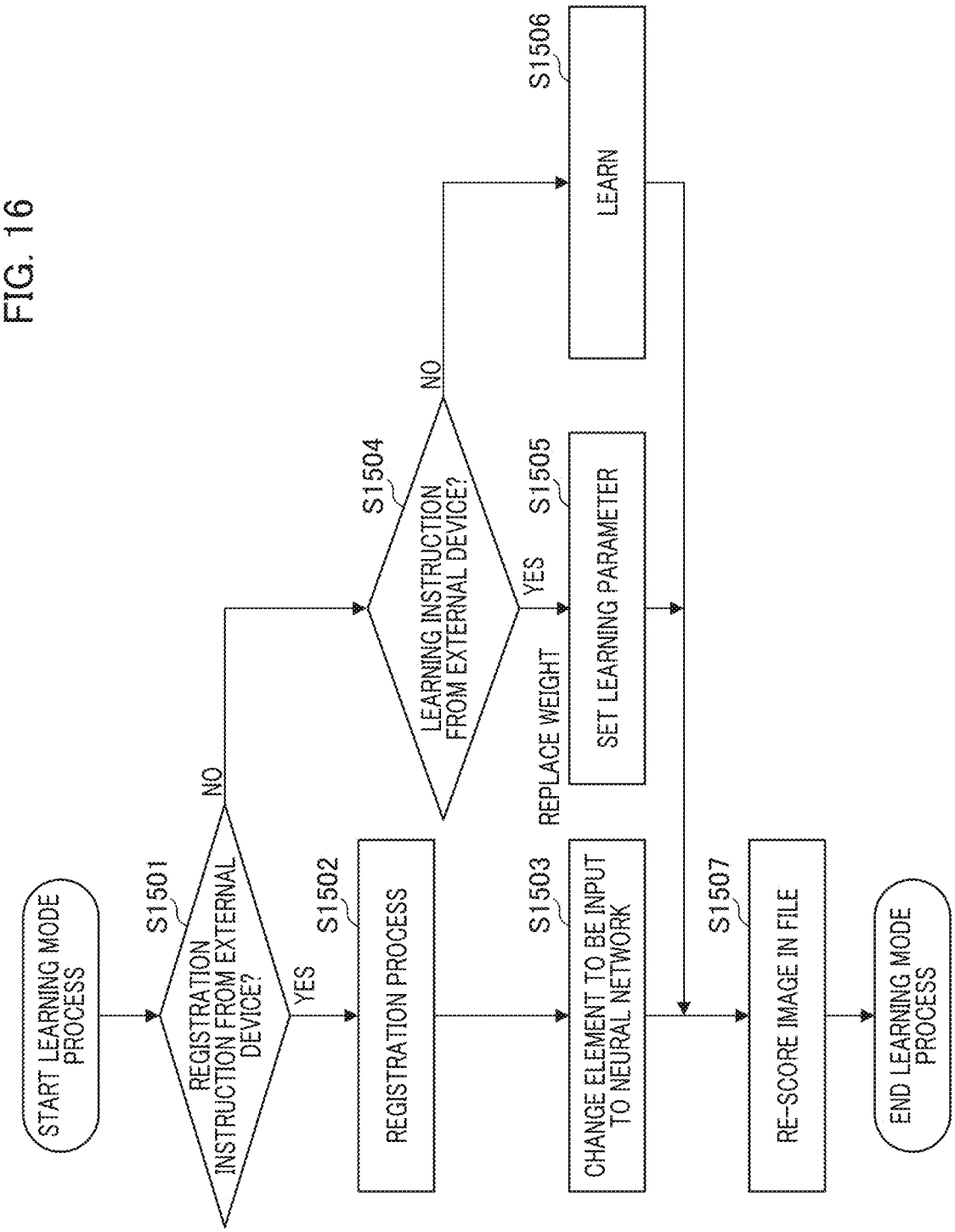
FIG. 16 is a flowchart illustrating a learning mode process.

Next, processes in the learning mode process (FIG. 7: S716) will be described. FIG. 16 is a flowchart illustrating an example of the learning mode process. When the learning mode is determined in S715 in FIG. 7 and the flow proceeds to the process in S716, the process in FIG. 16 is started. In S1501, it is determined whether or not there is a registration instruction from the external device 301. If it is determined in S1501 that there is a registration instruction from the external device 301, the flow proceeds to the process in S1502. If it is determined in S1501 that there is no registration instruction from the external device 301, the flow proceeds to the process in S1504.

In S1502, various registration processes are executed. Various types of registration are registration of features to be input to the neural network, such as face recognition registration, general object recognition registration, sound information registration, and place information registration. After the registration process is finished, the flow proceeds to the process in S1503. In S1503, a process of changing an element to be input to the neural network is performed on the basis of the information registered in S1502. When the process of S1503 is finished, the flow proceeds to the process in S1507.

In S1504, it is determined whether or not there is a learning instruction from the external device 301. If it is determined that there is a learning instruction from the external device 301, the flow proceeds to the process in S1505, and if it is determined that there is no learning instruction, the flow proceeds to the process in S1506.

In S1505, after the learning parameters transmitted from the external device 301 through communication are set in respective determinators (such as a weight of the NN), the flow proceeds to the process in S1507. In S1506, learning (recalculation of the weight of the NN) is performed. A case of transition to the process in S1506 is a case where the number DN of pieces of data exceeds the threshold value DT and each determinator is relearned, as described with reference to FIG. 15. The weight of the NN is recalculated through relearning using an error back propagation method, a gradient descent method, or the like, and the parameters in the respective determinators are changed. When the learning parameters are set, the flow proceeds to the process in S1507.

In S1507, a process of rescoring the images in the file is executed. The present embodiment provides a configuration in which all captured images stored in the file of the recording medium 221 are scored on the basis of learning results, and automatic editing or automatic file deletion is performed according to the scores. Therefore, if relearning is performed or learning parameters from an external device are set, it is also necessary to update the score of the captured image. In S1507, recalculation for adding new scores to the captured images stored in the file is performed, and when the processing is finished, the learning mode processing is finished.

In the above description, a method of proposing a user's favorite image by extracting a scene presumed to be preferred by the user, learning its features, and reflecting the features in camera operations such as automatic imaging and automatic editing has been described. Embodiments of the present invention are not limited to this application. For example, as described below, the present invention can be applied to an application of proposing a video that is not to a user's preference.

<Method of Using Neural Network in which Preference has been Learned>

Learning of a user's preference is performed according to the above-described method. In S908 in FIG. 9A, the automatic imaging determination process is executed. Automatic imaging is performed when an output value of the NN is a value indicating that a subject is not to the user's preference that is training data. For example, it is assumed that an image preferred by the user is used as a training image, and learning is performed such that a high value is output when a feature similar to the training image is shown. In this case, on the contrary, automatic imaging is performed on condition that the output value is smaller than a predetermined threshold value. Similarly, in the subject search process or the automatic editing process, a process is executed such that an output value of the NN is a value indicating that a subject is not to the user's preference that is training data.

<Method of Using Neural Network in which Situation that is not to Preference has been Learned>

At the time of the learning process, a process of learning a situation that is not to the user's preference as training data is executed. In the above example, a manually captured image is assumed to be a scene willingly captured by the user, and a learning method using this as training data has been described. On the other hand, the manually captured image is not used as training data, and a process of adding a scene that has not been manually captured for a predetermined time or more as training data is performed. Alternatively, if the training data includes scene data having a feature similar to that of the manually captured image, a process of deleting this data from the training data is performed. A process of adding an image having a feature different from that of an image acquired by the external device to the training data or a process of deleting an image having a feature similar to that of an acquired image from the training data is performed. In the above-described way, data that is not to the user's preference is accumulated in the training data, and, thus, as a result of learning, the NN can discriminate a situation that is not to the user's preference. In automatic imaging, imaging is performed according to an output value of the NN, and thus it is possible to image a scene that is not to the user's preference.

According to the method of proposing an image that is not to the user's preference, the number of imaging misses can be reduced due to a scene that the user would not manually image being imaged. There is an effect of promoting awareness to the user or broadening a range of tastes by proposing imaging in a scene that is not in the user's own idea.

It is easy to propose a situation that is somewhat similar to the user's preference but is not partially thereto or to adjust the degree of conformity to the user's preference by combining the above methods. The degree of conformity to the user's preference may be changed according to a mode setting, states of various sensors, and a state of detection information.

In the present embodiment, the configuration for learning in the camera 101 has been described. On the other hand, if the external device 301 has a learning function, data necessary for learning is transmitted to the external device 301, and learning is executed only by the external device 301. Even with such a configuration, the same learning effect as described above can be achieved. For example, as described in the above <learning when camera parameter is changed by external device>, learning may be performed by setting parameters such as a weight of the NN learned by the external device 301 in the camera 101 through communication.

In addition, there is an embodiment in which the camera 101 and the external device 301 each have a learning function. For example, at a timing at which the learning mode process (FIG. 7: S716) is performed in the camera 101, learning information stored in the external device 301 is transmitted to the camera 101, learning parameters are merged, and learning is performed by using the merged parameters.

According to the present embodiment, if automatic imaging and automatic authentication registration are performed by using a single imaging device, it is possible to achieve both imaging for the automatic imaging and imaging for the automatic authentication registration. In particular, the automatic authentication registration can improve the accuracy of the automatic imaging and also realize control that does not hinder an opportunity for the automatic imaging.

Hereinafter, an Example in which a subject imaging target person is determined and tracking control is performed will be described with reference to FIGS. 17 to 35. In automatic imaging, for example, a user registers feature information regarding a main person in the camera and designates that the registered person is to be tracked and imaged preferentially, and thus imaging centering on the person (priority person) is possible. If a priority person is not detected, or even if the priority person is detected but not recognized as the priority person, it is desirable that a main person is imaged as much as possible. Even if a priority person is detected, in a case where another main person such as a family member or a friend is detected at the same time, it is desirable to perform control such that such a person is also included in an angle of view, and an unrelated person is not included in the angle of view as much as possible.

As a subject identification technique, there is a technique in which image data is analyzed on a frame-by-frame basis to identify detected subjects, appearance frequencies of the identified subjects are extracted, and a main subject is selected from among the subjects on the basis of the appearance frequencies. With this technique, a specific number of subjects are always selected in descending order of appearance frequencies. Thus, in a case where the absolute number of people is small, a person may be determined as being a main person even if an appearance frequency thereof is significantly lower than that of an original main person. Since a distance between a subject and the imaging device is not taken into consideration, there is a probability that an unrelated person who is far from the imaging device may be included in a main person.

Hereinafter, a technique will be described in which, in an automatic imaging camera that performs imaging regularly and continuously without a user giving an imaging instruction, a frequency at which an unrelated person is included in an imaging angle of view is reduced while keeping a main person within the imaging angle of view. Specifically, an example will be described in which an imaging priority of a person is determined on the basis of a face size, a face position, face reliability, and a detection frequency of the detected person, and user settings, and a person who is set as an imaging target is determined according to an imaging priority of each person. Control is performed such that, if a person with a high imaging priority is detected, the person and a person with a similar imaging priority are determined as imaging targets, and a person whose imaging priority is separated by a certain amount or more is excluded from imaging targets. It is possible to increase a probability that a user and a person whose imaging priority is similar to the user may be imaged, and reduce a probability that an unrelated person may be imaged by selecting an imaging target.

Figure 17:
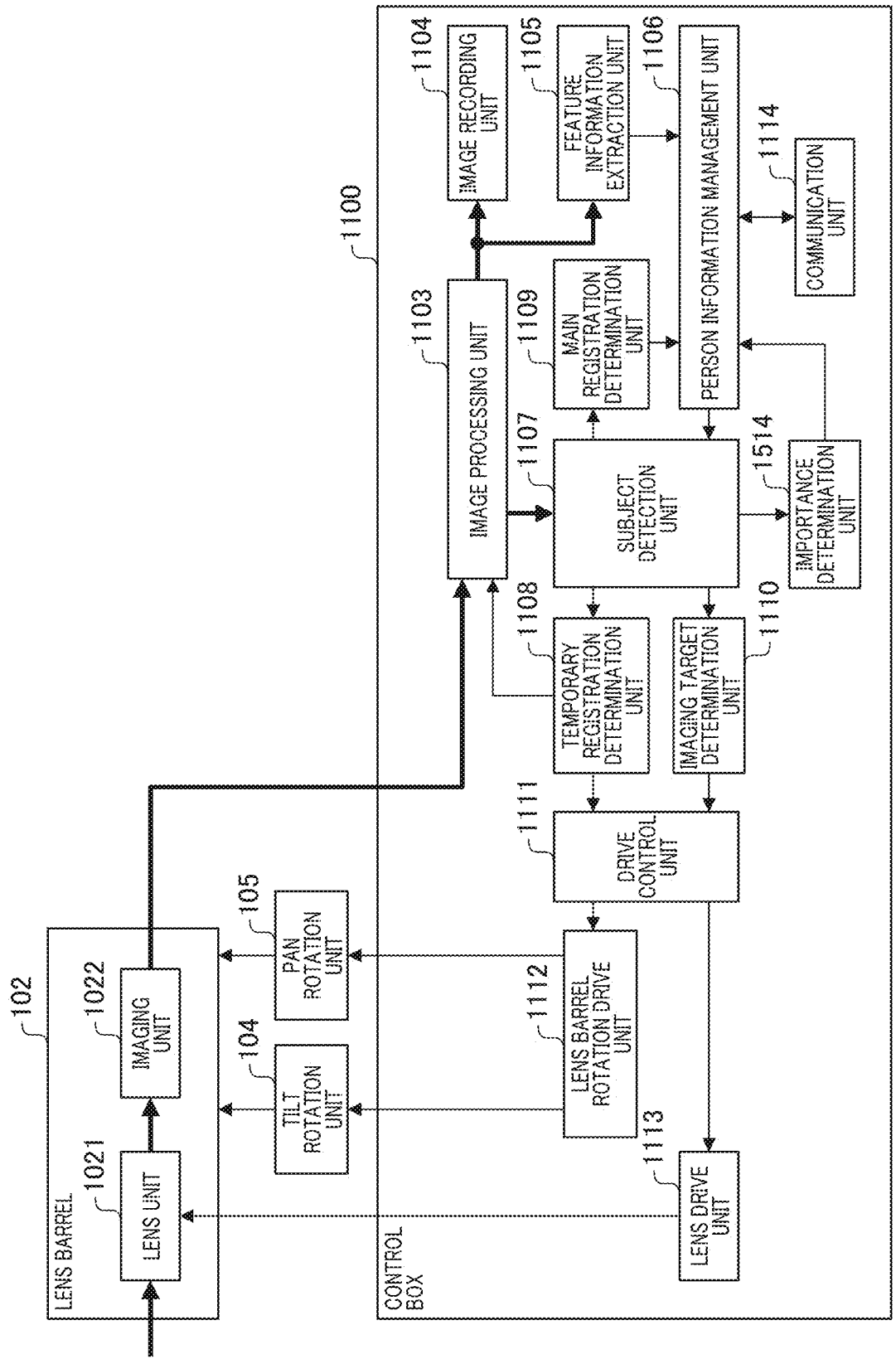
FIG. 17 is a block diagram illustrating a configuration of an imaging device.

FIG. 17 is a block diagram illustrating an imaging device including a lens barrel 102, a tilt rotation unit 104, a pan rotation unit 105, and a control box 1100. The control box 1100 includes a microcomputer and the like for controlling a group of imaging lenses included in the lens barrel 102, the tilt rotation unit 104, and the pan rotation unit 105. The control box 1100 is disposed in the fixed portion 103 of the imaging device. The control box 1100 is fixed even when panning drive or tilting drive of the lens barrel 102 is performed.

The lens barrel 102 includes a lens unit 1021 that forms an imaging optical system, and an imaging unit 1022 having an imaging element. The lens barrel 102 is controlled to be rotationally driven in the tilting direction and the panning direction by the tilt rotation unit 104 and the pan rotation unit 105, respectively. The lens unit 1021 includes a zoom lens that varies a magnification, a focus lens that adjusts a focus, and the like, and is driven and controlled by a lens drive unit 1113 in the control box 1100. A zoom mechanism unit is formed of the zoom lens and the lens drive unit 1113 that drives the lens. The zoom lens is moved in the optical axis direction by the lens drive unit 1113, and thus a zoom function is realized.

The imaging unit 1022 has an imaging element, receives light incident through each lens group forming the lens unit 1021, and outputs charge information corresponding to an amount of the light to an image processing unit 1103 as digital image data. The tilt rotation unit 104 and the pan rotation unit 105 rotate and drive the lens barrel 102 according to a drive instruction input from a lens barrel rotation drive unit 1112 in the control box 1100.

Next, a configuration of the control box 1100 will be described. An imaging direction in automatic imaging is controlled by a temporary registration determination unit 1108, an imaging target determination unit 1110, a drive control unit 1111, and the lens barrel rotation drive unit 1112.

The image processing unit 1103 acquires digital image data output from the imaging unit 1022. Image processing such as distortion correction, white balance adjustment, and a color interpolation process is applied to the acquired digital image data. The digital image data to which the image processing has been applied is output to an image recording unit 1104 and a subject detection unit 1107. The image processing unit 1103 outputs the digital image data to a feature information extraction unit 1105 in response to an instruction from the temporary registration determination unit 1108.

The image recording unit 1104 converts the digital image data output from the image processing unit 1103 into a recording format such as a JPEG format and records the digital image data on a recording medium (nonvolatile memory or the like). The feature information extraction unit 1105 acquires an image of the face located at the center of the digital image data output from the image processing unit 1103. The feature information extraction unit 1105 extracts feature information from the acquired face image and outputs the face image and the feature information to a person information management unit 1106. The feature information is information indicating a plurality of facial feature points located at parts such as the eyes, nose, and mouth of the face, and is used for discriminating a person as a detected subject. The feature information may be other information indicating features of the face, such as a contour of the face, color information of the face, and depth information of the face.

The person information management unit 1106 performs a process of storing and managing person information associated with each person in the storage unit. An example of person information will be described with reference to FIG. 18. The person information is formed of a person ID, a face image, feature information, a registration state, a priority setting, and a name. The person ID is an ID (identification information) for identifying each of a plurality of pieces of person information, and the same ID is not issued and a value of 1 or greater is set. The face image data is data of a face image input from the feature information extraction unit 1105. The feature information is information input from the feature information extraction unit 1105. Regarding the registration state, it is assumed that two states, "temporary registration" and "main registration", are defined. "Temporary registration" indicates a state in which it is determined through temporary registration determination that there is a probability that a person may be a main person. "Main registration" indicates a state in which it is determined that a person is a main person through main registration determination or depending on the presence or absence of a user operation. Details of a temporary registration determination process and a main registration determination process will be described later. The priority setting is a setting indicating whether or not to preferentially perform imaging through a user operation. The name is a name given to each person through a user operation.

When the face image and the feature information are acquired from the feature information extraction unit 1105, the person information management unit 1106 issues a new person ID, associates the person ID with the input face image and feature information, and adds new person information. When the new person information is added, an initial value of the registration state is "temporary registration", an initial value of the priority setting is "absence", and an initial value of the name is blank. When a main registration determination result (a person ID to be registered) is acquired from the main registration determination unit 1109, the person information management unit 1106 changes a registration state of person information corresponding to the person ID to "main registration". If an instruction for changing person information (a priority setting or a name) is received from the communication unit 1114 through a user operation, the person information management unit 1106 changes the person information according to the instruction. If either a priority setting or a name is changed for a person whose registration state is "temporary registration", the person information management unit 1106 determines that the person is a main person and changes the registration state of the person to "main registration". An importance determination unit 1514 will be described later.

Figure 19:
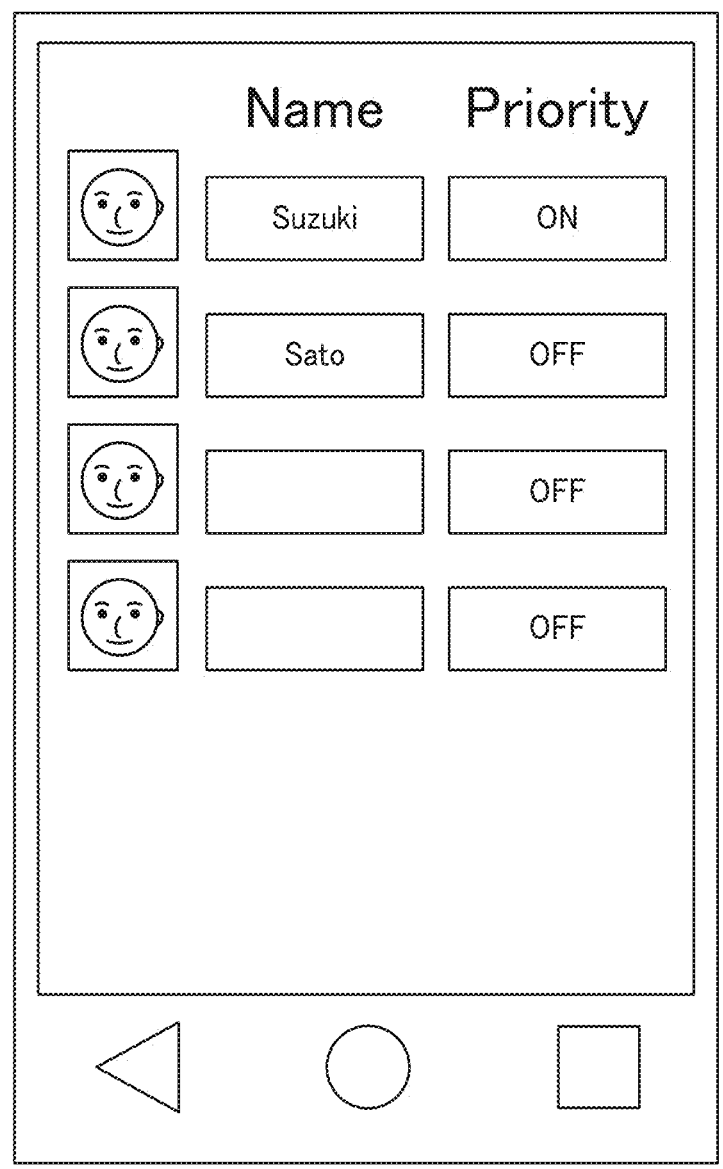
FIG. 19 is a diagram illustrating a screen example of person information displayed on the external device.

FIG. 19 is a schematic diagram illustrating a screen example on a mobile terminal device (external device) that communicates with the camera 101. The mobile terminal device acquires person information via the communication unit 1114 of the camera 101 and displays the person information in a list form on a screen. In the example illustrated in FIG. 19, a face image, a name, and a priority setting are displayed on the screen. The name and the priority setting can be changed by a user. If a name or a priority setting is changed, the mobile terminal device outputs an instruction for changing the name or the priority setting associated with a person ID to the communication unit 1114.

The subject detection unit 1107 (FIG. 17) detects a subject from the digital image data input from the image processing unit 1103, and extracts information regarding the detected subject (subject information). An example in which the subject detection unit 1107 detects a person's face as a subject will be described. The subject information includes, for example, the number of detected subjects, a position of the face, a face size, an orientation of the face, and reliability of the face indicating the certainty of detection. The subject detection unit 1107 calculates a similarity by collating the feature information of each person acquired from the person information management unit 1106 with the feature information of the detected subject. If the similarity is equal to or more than a threshold value, a process of adding a person ID, a registration state, and a priority setting of the detected person to the subject information is executed. The subject detection unit 1107 outputs the subject information to the temporary registration determination unit 1108, the main registration determination unit 1109, and the imaging target determination unit 1110. Examples of the subject information will be described later with reference to FIGS. 20A and 20B.

The temporary registration determination unit 1108 determines whether or not there is a probability that the subject detected by the subject detection unit 1107 may be a main person, that is, whether or not temporary registration is to be performed. If it is determined that any subject is a person to be temporarily registered, the temporary registration determination unit 1108 calculates a panning drive angle, a tilting drive angle, and a target zoom position required to dispose the person to be temporarily registered at the screen center with a designated size. A command signal based on the calculation results is output to the drive control unit 1111. Details of the temporary registration determination process will be described later with reference to FIG. 22.

The main registration determination unit 1109 determines a person similar to the user, that is, a person to be mainly registered, on the basis of the subject information acquired from the subject detection unit 1107. If it is determined that any person is a person to be mainly registered, a person ID of the person to be mainly registered is output to the person information management unit 1106. Details of the main registration determination process will be described later with reference to FIGS. 24 to 26.

The imaging target determination unit 1110 determines an imaging target subject on the basis of the subject information acquired from the subject detection unit 1107. The imaging target determination unit 1110 calculates a panning drive angle, a tilting drive angle, and a target zoom position required to dispose the imaging target person within an angle of view with a designated size on the basis of a determination result of the imaging target person. A command signal based on the calculation results is output to the drive control unit 1111. Details of the imaging target determination process will be described later with reference to FIG. 27.

When a command signal is acquired from the temporary registration determination unit 1108 or the imaging target determination unit 1110, the drive control unit 1111 outputs control parameter information to the lens drive unit 1113 and the lens barrel rotation drive unit 1112. A parameter based on the target zoom position is output to the lens drive unit 1113. Parameters corresponding to the target position based on the panning drive angle and the tilting drive angle are output to the lens barrel rotation drive unit 1112.

If there is an input from the temporary registration determination unit 1108, the drive control unit 1111 does not refer to an input from the imaging target determination unit 1110, and determines each target position (a target zoom position and target positions based on the drive angles) on the basis of an input value from the temporary registration determination unit 1108. The lens barrel rotation drive unit 1112 outputs drive commands to the tilt rotation unit 104 and the pan rotation unit 105 on the basis of the target position and a drive speed from the drive control unit 1111. The lens drive unit 1113 has a motor and a driver unit for driving a zoom lens, a focus lens, and the like included in the lens unit 1021. The lens drive unit 1113 drives each lens on the basis of the target position from the drive control unit 1111.

The communication unit 1114 transmits the person information stored in the person information management unit 1106 to an external device such as a mobile terminal device. When an instruction for changing the person information is received from the external device, the communication unit 1114 outputs an instruction signal to the person information management unit 1106. In the present example, it is assumed that a change instruction from the external device is an instruction for changing a priority setting and a name of the person information.

FIGS. 20A and 20B are diagrams illustrating an example of image data and an example of subject information acquired by the subject detection unit 1107. FIG. 20A is a schematic diagram illustrating an example of image data that is input to the subject detection unit 1107. For example, the image data is formed of a horizontal resolution of 960 pixels and a vertical resolution of 540 pixels. FIG. 20B is a table illustrating an example of subject information extracted if the image data illustrated in FIG. 20A is input to the subject detection unit 1107. The exemplified subject information includes the number of subjects, a subject ID of each subject, a face size, a face position, a face orientation, face reliability, a person ID, a registration state, and a priority setting.

The number of subjects indicates the number of detected faces. The example in FIG. 20B is an example in which the number of subjects is four, and face sizes, face positions, face orientations, face reliabilities, person IDs, registration states, and priority settings for the four subjects are included. The subject ID is a numerical value for identifying the subject, and is issued when a new subject is detected. The same subject ID is not issued, and a new value is issued each time a subject is detected. For example, if a specific subject moves out of an angle of view once and cannot be detected, and then returns to the angle of view and is re-detected, another new value is issued even for the same subject.

The face size (w, h) is a numerical value indicating a size of the detected face, and the number of pixels of a width (w) and a height (h) of the face is input. In the present example, it is assumed that the width and the height are the same value. The face position (x, y) is a numerical value indicating a relative position of the detected face within an imaging range. If an upper left corner of the image data is defined as a start point (0,0) and a lower right corner of the screen is defined as an end point (960,540), the number of horizontal pixels and the number of vertical pixels from the start point to the center coordinates of the face are input. The face orientation is information indicating an orientation of the detected face, and any one of the front, right-facing 45 degrees, right-facing 90 degrees, left-facing 45 degrees, left-facing 90 degrees, and unknown is input. The face reliability is information indicating the certainty of the detected human face, and any value from 0 to 100 is input. The face reliability is calculated from the similarity with feature information of a plurality of standard face templates stored in advance.

The person ID is the same as the person ID managed by the person information management unit 1106. When the subject is detected, the subject detection unit 1107 calculates the similarity between feature information of each person acquired from the person information management unit 1106 and feature information of the subject. The person ID of the person whose similarity is equal to or more than a threshold value is input. If the feature information acquired from the person information management unit 1106 is not similar to feature information of any person, zero is input as an ID value. The information regarding the registration state and the priority setting is the same as the information regarding the registration state and the priority setting managed by the person information management unit 1106. If the person ID is not zero, that is, it is determined that the person is one of the persons managed by the person information management unit 1106, the information regarding the registration state and the priority setting of the corresponding person acquired from the person information management unit 1106 is input.

Figure 21:
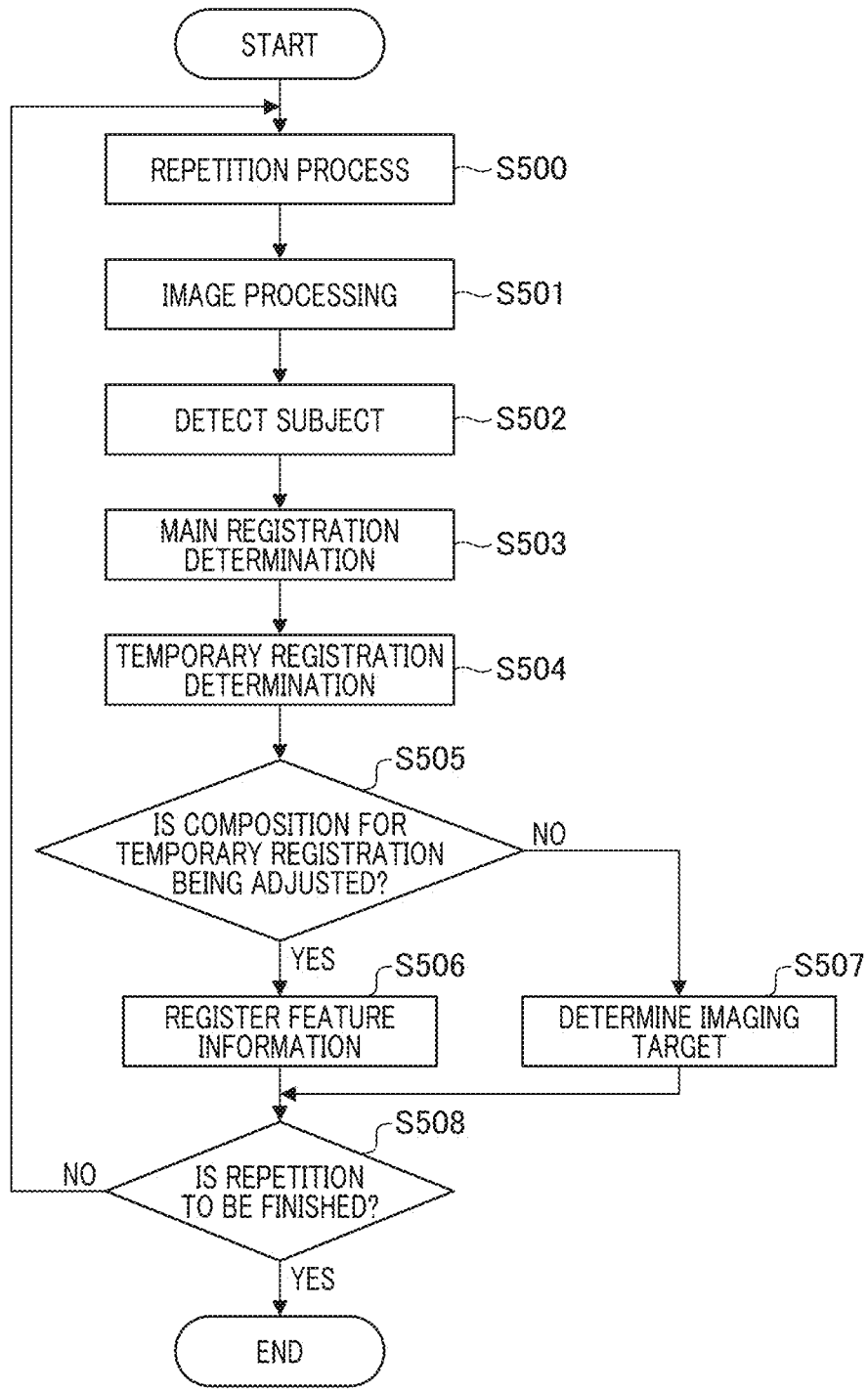
FIG. 21 is a flowchart illustrating an outline of a cyclic operation performed by the imaging device.

In the present example, a process executed cyclically will be described with reference to FIG. 21. FIG. 21 is a flowchart illustrating the overall flow of imaging, registration and update of person information. When the imaging device is powered on, the imaging unit 1022 of the imaging device starts cyclic imaging (moving image capturing) in order to acquire image data used for various determinations (imaging target determination, temporary registration determination, and main registration determination). In S500, a repetition process is started.

The image data acquired through imaging is output to the image processing unit 1103, and, in S501, the image data subjected to various types of image processing is acquired. Since the acquired image data is image data for various determinations, this image data is output from the image processing unit 1103 to the subject detection unit 1107. In other words, the image data acquired here corresponds to image data for live view display in the imaging device in which a user adjusts a composition and operates the shutter to capture images, and the cyclic imaging for acquiring the image data corresponds to live view imaging. The control box 1100 adjusts a composition or determines an automatic imaging timing by using the acquired image data.

Next, in S502, the subject detection unit 1107 detects a subject on the basis of the image data and acquires subject information (refer to FIG. 20B). After detecting the subject and acquiring the subject information, main registration determination is performed in S503. In the main registration determination, a person to be mainly registered is determined by using the information regarding the detected subject. In this determination, the person information in the person information management unit 1106 is updated, but panning drive, tilting drive, and zoom drive are not executed.

Temporary registration determination is performed in S504. In the temporary registration determination, a subject to be temporarily registered is determined from the detected subjects, and a panning drive angle and a tilting drive angle are acquired on the basis of a position of the face of the subject to be temporarily registered. A target zoom position is acquired on the basis of the position and the face size. The temporary registration determination unit 1108 instructs the image processing unit 1103 to output the image data to the feature information extraction unit 1105. When the panning drive angle, the tilting drive angle, and the target zoom position are acquired in the temporary registration determination, panning drive, tilting drive, and zoom drive are executed on the basis of the information, and thus a composition for temporary registration is adjusted.

After the process in S504, the flow proceeds to the process in S505, and it is determined whether or not a process of adjusting a composition for temporary registration is being executed. In S505, if the process of adjusting a composition for temporary registration is being executed, the flow proceeds to the process in S506, and if the process of adjusting a composition for temporary registration is not being executed, the flow proceeds to the process in S507.

In S506, the feature information extraction unit 1105 extracts feature information of the subject located at the center of the image data, and outputs the extracted feature information to the person information management unit 1106. In S507, imaging target determination is executed. The imaging target determination unit 1110 determines an imaging target subject among the detected subjects. A panning drive angle and a tilting drive angle are acquired on the basis of a position of the face of the imaging target subject. A target zoom position is acquired on the basis of the position and the face size. When the panning drive angle, the tilting drive angle, and the target zoom position are acquired through the imaging target determination, panning drive, tilting drive, and zoom drive are executed on the basis of the information, and thus an imaging composition is adjusted.

After S506 and S507, the flow proceeds to the process in S508, and it is determined whether or not the repetition process is to be finished. If the process is to be continued, the flow returns to S500 and the process is continued. The processes in S501 to S507 are repeatedly executed in accordance with an imaging cycle of the imaging unit 1022.

<Temporary Registration Process>

Figures 22A, 22B:
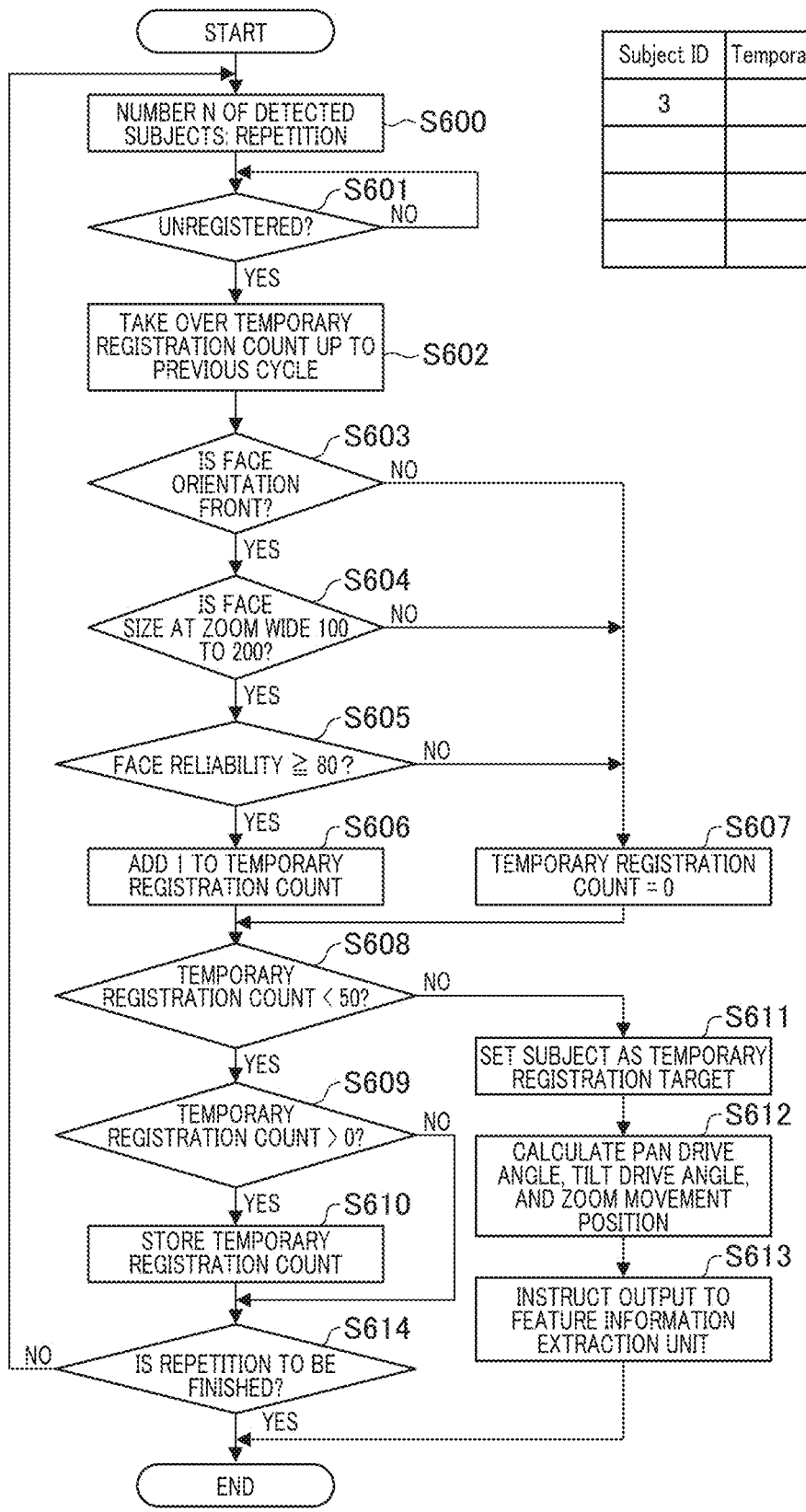
FIGS. 22A and 22B are a flowchart and a table illustrating a temporary registration determination process.

A temporary registration determination process illustrated in S504 in FIG. 21 will be described with reference to FIGS. 22A and 22B. FIG. 22A is a flowchart illustrating the temporary registration determination process performed by the temporary registration determination unit 1108. This process is executed cyclically and it is determined whether or not there is a probability that a person may be a main person. FIG. 22B is a table illustrating a temporary registration count. The temporary registration count is associated with a subject ID, and if the temporary registration count reaches 50 or more, it is determined that a corresponding subject is a temporary registration target person. Since the temporary registration determination is executed over a plurality of cycles, a process of storing the current temporary registration count at the time of determination in the current cycle and referring to and taking over the temporary registration count added up to the previous cycle in the next cycle is performed.

In S600, repetition processes corresponding to the number of detected subjects are started. When the subject information is acquired from the subject detection unit 1107, the temporary registration determination unit 1108 executes the processes in S601 to S609 for each subject, and executes the processes in S610 to S613 in a case where any of the subjects is determined as being a temporary registration target. In S601, a process of determines whether a subject is not registered is executed. The temporary registration determination unit 1108 refers to the person ID of the subject information, and if it is determined that the subject is not registered (the person ID is zero), the flow proceeds to the process in S602. If it is determined that a value of the person ID is 1 or more, that is, the subject has already been registered, the flow proceeds to the next subject determination process.

In S602, the temporary registration determination unit 1108 refers to the stored temporary registration count up to the previous frame, and takes over temporary registration count if there is a temporary registration count for the same subject ID. Next, in S603, the temporary registration determination unit 1108 determines whether or not the face is facing the front. If it is determined that the face is facing the front, the flow proceeds to the process in S604, and if it is determined that the face is not facing the front, the flow proceeds to the process in S607.

S604 is a process for determining whether or not the face size at zoom wide is in a range of 100 to 200. If this condition is satisfied, the flow proceeds to the process in S605, and if the condition is not satisfied, the flow proceeds to the process in S607. S605 is a process for determining whether or not the face reliability is equal to or more than a threshold value of 80. If this condition is satisfied, the flow proceeds to the process in S606, and if the condition is not satisfied, the flow proceeds to the process in S607.

When all the conditions shown in S603 to S605 are satisfied, the flow proceeds to the process in S606. In S606, the temporary registration determination unit 1108 determines that the person may be a main person similar to the user, and adds 1 to the temporary registration count (increment). On the other hand, if any one of the conditions shown in S603 to S605 is not satisfied, the flow proceeds to the process in S607. In S607, the temporary registration determination unit 1108 determines that the target person is unlikely to be a main person, and sets the temporary registration count to zero.

After the processes in S606 and S607, in S608, the temporary registration determination unit 1108 compares the value of the temporary registration count for the subject with a threshold value of 50. If it is determined that the value of the temporary registration count is smaller than 50, the flow proceeds to the process in S609. If it is determined that the value of the temporary registration count is equal to or greater than 50, the flow proceeds to the process in S611.

In S609, the temporary registration determination unit 1108 determines whether or not a value of the temporary registration count is greater than zero. If it is determined that the value of the temporary registration count is greater than zero, the flow proceeds to the process in S610, and if this condition is not satisfied (the value of the temporary registration count is zero), the flow proceeds to the process in S614 without storing the temporary registration count. In S610, the temporary registration determination unit 1108 stores the temporary registration count, and then proceeds to a determination process in S614. It is determined whether or not the repetition process is to be finished in S614, and if the process is continued, the flow returns to S600 and proceeds to the next subject determination process.

In S611, the temporary registration determination unit 1108 determines that a corresponding subject may be a main person and sets the subject as a temporary registration target. In S612, the temporary registration determination unit 1108 calculates a panning drive angle, a tilting drive angle, and a zoom movement position such that the face of the temporary target subject is disposed at the screen center with an appropriate face size, and outputs a command based on calculation results to the drive control unit 1111. For example, if the center position of the face is within 5% of the screen center and the face size is 100 to 200, the feature information extraction unit 1105 can acquire the feature information.

In the present example, in order to acquire the feature information, control is performed such that an imaging target subject is disposed at the screen center. The present example is not limited thereto, and the feature information may be extracted by performing image processing such as cutting out a part of image data including the face of a target subject without changing a position of the subject.

In S613, the temporary registration determination unit 1108 instructs the image processing unit 1103 to output the image data to the feature information extraction unit 1105. The feature information extraction unit 1105 cuts out a face image located at the center of the input image data, extracts feature information, and outputs the feature information to the person information management unit 1106. The person information management unit 1106 adds new person information on the basis of the input face image and feature information. After the process in S613, a series of processes is finished.

It is assumed that a zoom position in the imaging device of the present example can be set from 0 to 100. As a value of the zoom position becomes smaller, the lens is located toward the wide angle side, and as the value becomes greater, the lens is located toward the telephoto side. That is, the zoom wide shown in S604 indicates a state in which the zoom position is zero and an angle of view is the widest. In the imaging device, if a face size at zoom wide is 100 to 200, it is determined that a distance between the subject and the imaging device can be predicted to be about 50 cm to 150 cm. That is, if the subject is not too close to the imaging device and is not too far away, it is determined that the subject may be a main person. In the example in FIG. 22A, the process of calculating a distance between the subject and the imaging device on the basis of the face size has been described, but a distance to the subject may be measured according to another method using a depth sensor, a compound eye lens, or the like.

Subsequently, a specific example of the temporary registration determination if the subject information illustrated in FIG. 20B is input will be described. Here, the zoom position is set to zero. Since the subject 1 and the subject 2 in FIG. 20B have already been registered in S601 in FIG. 22A (the person ID is not zero), the processes in and after S602 are not executed.

Since the person ID of the subject 3 in FIG. 20B is zero (unregistered) in S601 of FIG. 22A, the processes in and after S602 are executed. As illustrated in FIG. 22B, the temporary registration count for the subject ID 3 up to the previous cycle is set to 30. In S602 of FIG. 22A, the temporary registration count up to the previous cycle is referred to, and if there is the temporary registration count for the subject ID 3, the information is taken over. Since the subject 3 in FIG. 20B is facing the front, the flow proceeds from S603 to S604 in FIG. 22A. In S604, since the face size at zoom wide is 120, the flow proceeds to the process in S605, and in S605, the face reliability is 80, and thus the flow proceeds to the process in S606. In S606 in FIG. 22A, 1 is added to the temporary registration count to obtain 31. Since the temporary registration count is less than 50 in S608, after the temporary registration count is stored in S609, the flow proceeds to the next subject determination.

Since the person ID of the subject 4 in FIG. 20B is zero in S601 of FIG. 22A, the processes in and after S602 are executed. In S602, the temporary registration count up to the previous cycle is referred to, and if there is the temporary registration count for the subject ID 4, the information is taken over. Here, it is assumed that there is no temporary registration count for the subject ID up to the previous cycle. In S603 in FIG. 22A, since the face orientation is 90 degrees to the left, the flow proceeds to the process in S607, and the temporary registration count is set to zero. In S608, since the temporary registration count is less than 50, the flow proceeds to the process in S609, and in S609, since the temporary registration count is zero, the temporary registration count is not stored and the process is finished.

Subsequently, a description will be made of an example in which the temporary registration count becomes 50 or more in S608 in FIG. 22A and a subject that is a temporary registration target is disposed at the center of an angle of view through panning drive, tilting drive, and zoom drive. If the subject 3 in FIG. 20B is a temporary registration target, a panning drive angle and a tilting drive angle are calculated such that a face position of the subject falls within a predetermined range. The predetermined range is a range in which a face position of the subject is within 5% of the screen center, that is, a range in which a x position coordinate value is in a range of 432 to 528 and a y position coordinate value is in a range of 513 to 567. Since a face size of the subject 3 is within 100 to 200, the zoom position is not changed.

FIG. 23A is a diagram illustrating an example of image data if a panning position and a tilting position are changed with respect to FIG. 20A. FIG. 23B is a table illustrating an example of subject information extracted if the image data illustrated in FIG. 23A is input to the subject detection unit 1107. In the present example, the face is disposed at the center of the screen with an appropriate size, and thus the feature information extraction unit 1105 can acquire the feature information. In the temporary registration determination process, an unregistered person who satisfies a specific condition over a plurality of cycles is likely to be determined as being a main person and is added to the person information management unit 1106.

<Main Registration>

Next, with reference to FIGS. 24A and 24B, the main registration determination process shown in S503 in FIG. 21 will be described. FIG. 24A is a flowchart illustrating the main registration determination process performed by the main registration determination unit 1109. Similar to the temporary registration determination, this determination process is executed over a plurality of cycles, and a main person is determined from persons who have already been temporarily registered.

FIG. 24B is a table illustrating a count A, a count B, and a main registration count associated with a person ID. The count A and the count B are respectively added under different conditions, and if a value of the count A is 50 or more or a value of the count B is 50 or more, the main registration count is added. If the main registration count reaches 100, a corresponding subject is determined as being a main registration target person. It is assumed that a process is performed in which the current count A, count B, and main registration count are stored at the time of determination for each cycle, and in the next cycle, various counts added up to the previous cycle are referred to and taken over.

In S1700, repetition processes corresponding to the number of detected subjects are started. When subject information is acquired from the subject detection unit 1107, the main registration determination unit 1109 executes the processes in S1701 to S1707 of FIG. 24A for each subject. In S1701, the main registration determination unit 1109 determines "temporary registration". If a registration state of the subject information is referred to and it is determined that the registration state is "temporary registration", the flow proceeds to the process in S1702. If it is determined that the registration state is not "temporary registration", the flow proceeds to the next subject determination process.

In S1702, the main registration determination unit 1109 refers to the stored counts up to the previous frame, and if there are various counts for the same person ID, the registration determination unit 1109 takes over the various counts. Then, the main registration determination unit 1109 executes first main registration count determination (S1703), and further executes second main registration count determination (S1704). The first main registration count determination is determination based on the subject information of a single person. A process of adding the count A according to the distance and reliability between the target person and the imaging device and adding the main registration count is executed. The second main registration count determination is determination based on the degree of relevance to the "mainly registered" person who has already been determined as being a main person. Specifically, a plurality of "mainly registered persons" are detected at the same time, and a process of adding the count B according to whether or not distances from the imaging device are the same and adding the main registration count is executed. The details of the first and second main registration count determination processes will be described later.

In S1705 following S1704, the main registration determination unit 1109 compares a value of the main registration count for the corresponding person with a threshold value of 100. If it is determined that the value of the main registration count is greater than 100, the flow proceeds to the process in S1706, and if it is determined that the value of the main registration count is smaller than 100, the flow proceeds to the process in S1707. In S1706, the main registration determination unit 1109 instructs the person information management unit 1106 to change the registration state of the corresponding person to "main registration". Further, in S1707, the main registration determination unit 1109 stores various current counts. After S1706 and S1707, the flow proceeds to the process in S1708, and it is determined whether or not the repetition process is to be finished. If the process is to be continued, the flow returns to S1700 and the process on the next detected subject is continued.

Figure 25:
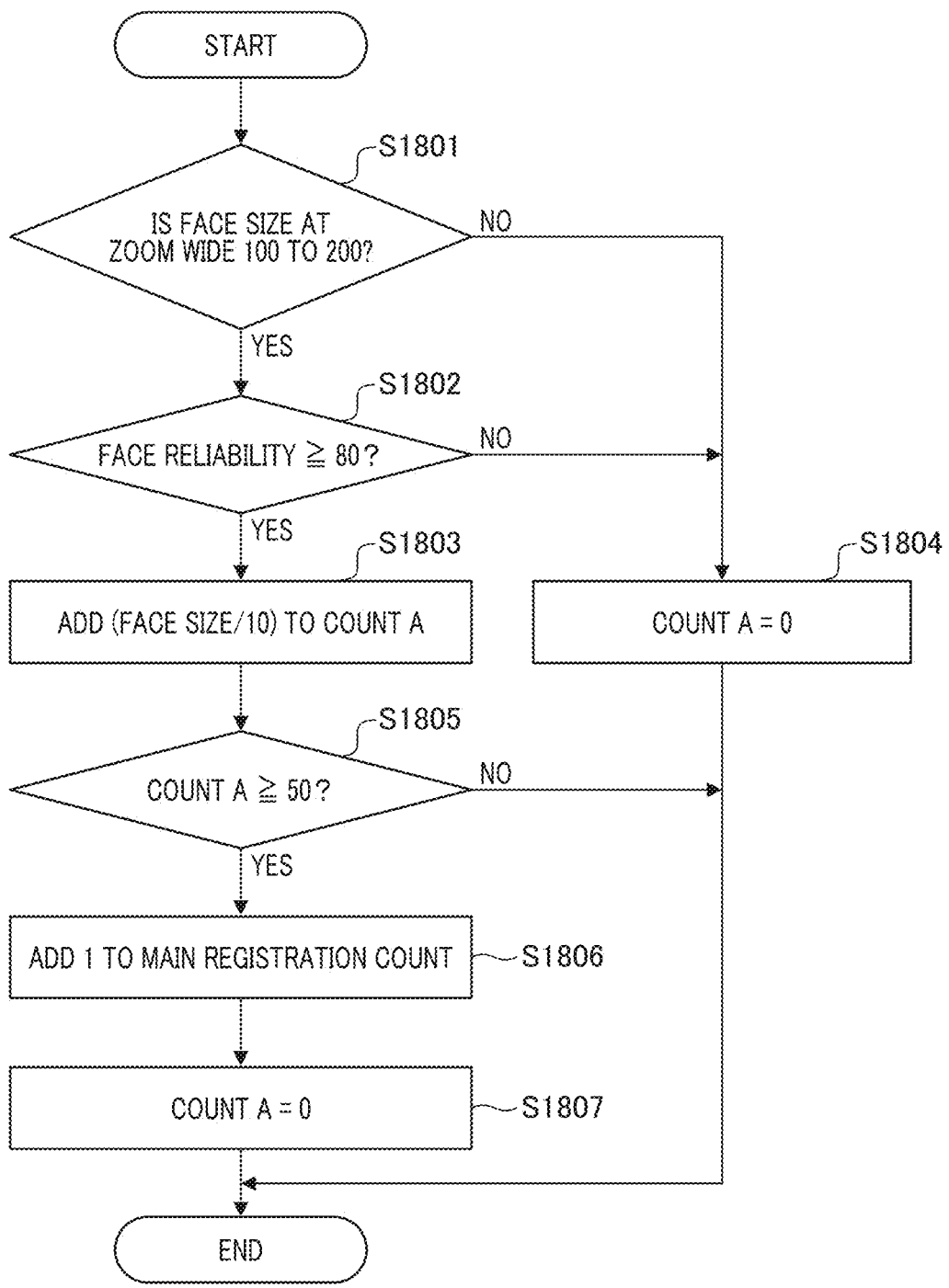
FIG. 25 is a flowchart illustrating a first main registration count determination process.

Subsequently, the process in S1703 (first main registration count determination) in FIG. 24A will be described with reference to the flowchart of FIG. 25. In S1801, the main registration determination unit 1109 determines whether or not a face size at zoom wide is within a range of 100 to 200. If this condition is satisfied, the flow proceeds to the process in S1802, and if the condition is not satisfied, the flow proceeds to the process in S1804.

In S1802, the main registration determination unit 1109 determines whether or not the face reliability is equal to or more than a threshold value of 80. If this condition is satisfied, the flow proceeds to the process in S1803, and if the condition is not satisfied, the flow proceeds to the process in S1804. If all the conditions in S1801 and S1802 are satisfied, the flow proceeds to the process in S1803, and a process of adding a value corresponding to "face size at zoom wide/10" to the count A is performed. In S1804, the main registration determination unit 1109 sets the count A to zero, and then finishes the process.

In S1805 following S1803, the main registration determination unit 1109 compares a value of the count A with a threshold value of 50. If it is determined that the value of the count A is equal to or greater than 50, the flow proceeds to the process in S1806, and if it is determined that the count A is smaller than 50, the process is finished. The main registration determination unit 1109 adds 1 to the main registration count in S1806, and sets the count A to zero in S1807. After S1807, the process is finished.

The process in S1704 (second main registration count determination) in FIG. 24A will be described with reference to the flowchart of FIG. 26. In S1901, the main registration determination unit 1109 refers to the subject information and determines whether or not persons whose registration state is "main registration", that is, a plurality of persons already determined as being main ones are detected at the same time. If it is determined that mainly registered persons are detected at the same time, the flow proceeds to the process in S1902. If it is determined that mainly registered persons are not detected at the same time, the flow proceeds to the process in S1905.

In S1902, the main registration determination unit 1109 refers to the face size of the subject information, and determines whether or not the face size is similar to that of any of the mainly registered persons detected at the same time. Specifically, for example, if the face size of the subject information is within a range of "the mainly registered person's face size ±10%" as a determination condition, the face size is considered to be similar. If the condition in S1902 is satisfied, the flow proceeds to the process in S1903, and if the condition is not satisfied, the flow proceeds to the process in S1905.

In S1903, the main registration determination unit 1109 compares the face reliability with the threshold value of 80. If it is determined that the face reliability is equal to or more than 80, the flow proceeds to the process in S1904, and if it is determined that the face reliability is less than 80, the flow proceeds to the process in S1905. In S1904, the main registration determination unit 1109 adds a value corresponding to "face size at zoom wide/10" to the count B. In S1905, the main registration determination unit 1109 sets the count B to zero and then finishes the process.

In S1906 following S1904, the main registration determination unit 1109 compares a value of the count B with the threshold value of 50. If it is determined that the value of the count B is equal to or greater than the threshold value of 50, the flow proceeds to the process in S1907. If it is determined that the value of the count B is less than the threshold value of 50, the process is finished. In S1907, the main registration determination unit 1109 adds 1 to the main registration count, sets the count B to zero in S1908, and then finishes the process.

Subsequently, a description will be made of a specific example of the main registration determination if the main registration determination unit 1109 acquires the subject information illustrated in FIG. 20B. A zoom position is set to zero. Since the registration state of the subject 1, the subject 3, and the subject 4 in FIG. 20B is not "temporary registration" in S1701 in FIG. 24A, the processes in and after S1702 are not executed. Since the registration state of the subject 2 in FIG. 20B is "temporary registration" in S1701 in FIG. 24A, the processes in and after S1702 are executed.

In S1702 in FIG. 24A, the count A, the count B, and the main registration count up to the previous cycle are referred to, and if there are various counts for the person ID 4, the information is taken over. As illustrated in FIG. 24B, the count A, the count B, and the main registration count for the person ID 4 up to the previous cycle are set to 30, 40, and 70, respectively. A sum of the values of the count A and the count B is the value of the main registration count. In S1703 in FIG. 24A, the first main registration count determination is executed. Since the face size at zoom wide is 110 in S1801 in FIG. 25, the flow proceeds to the process in S1802, and since the face reliability is 90 in S1802, the flow proceeds to the process in S1803. In S1803 in FIG. 25, since the face size at zoom wide is 110, 11 (=110/10) is added to the count A which then becomes 41 (=30+11). In S1805 in FIG. 25, since the value of the count A is smaller than the threshold value of 50, the first main registration count determination process is finished.

Subsequently, in S1704 in FIG. 24A, the second main registration count determination is executed. In S1901 in FIG. 26, the subject information is referred to, and it is determined that the registration state of the subject 1 detected at the same time is "main registration". It is determined that a mainly registered person is detected at the same time, and the flow proceeds to the process in S1902. In S1902 in FIG. 26, the face sizes are compared between the subject 1 that is the mainly registered person and the subject 2. Since the face size of the subject 1 is 120, if the face size is 120±10%, that is, 108 to 132, it is determined that the face sizes are similar. Since the face size of the subject 2 is 110, it is determined that the face size is similar to that of the mainly registered person, and the flow proceeds to the process in S1903. Since the face reliability is 90 in S1903, the flow proceeds to the process in S1904.

Figure 26:
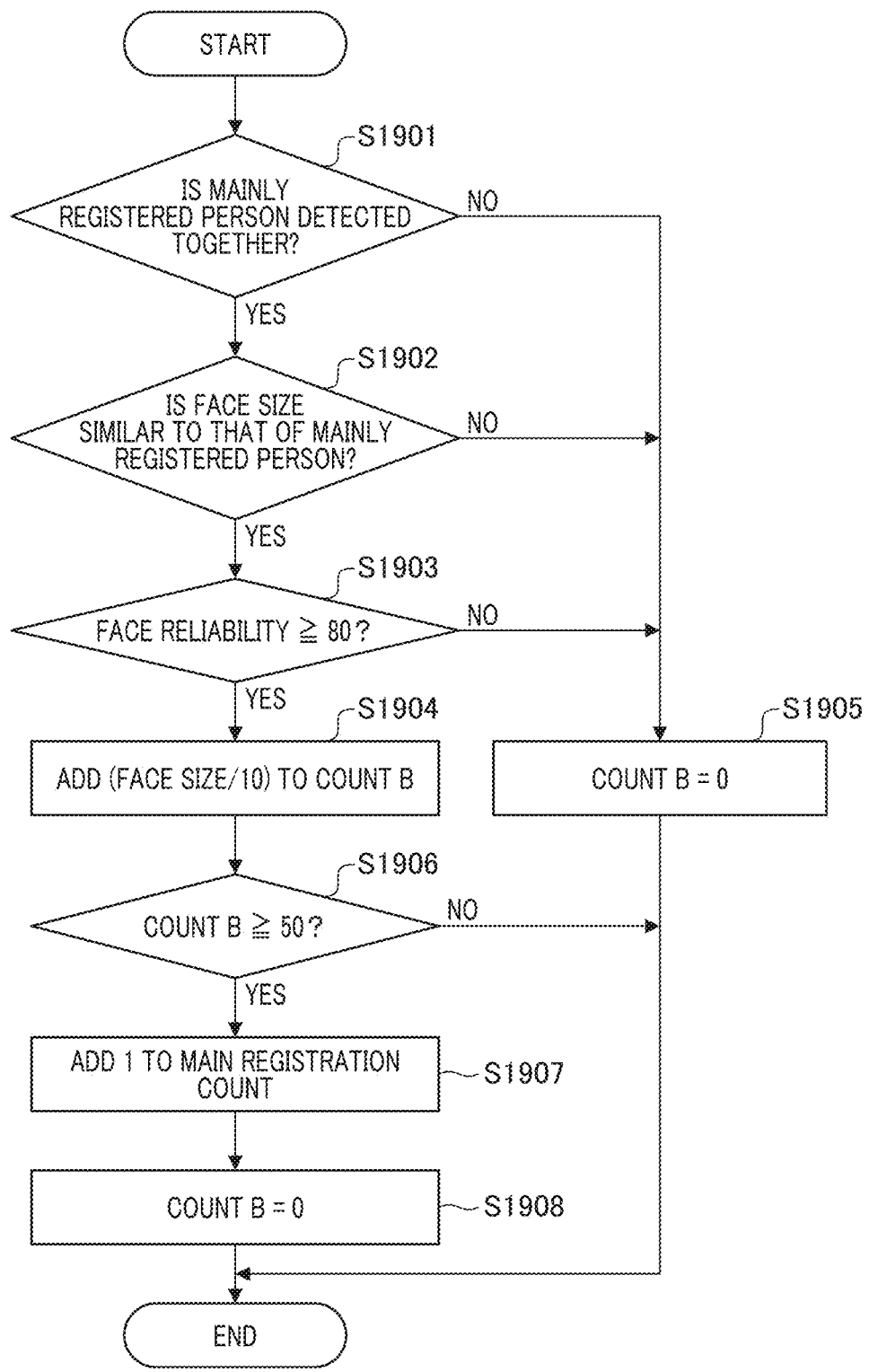
FIG. 26 is a flowchart illustrating a second main registration count determination process.

In S1904 in FIG. 26, since the face size at zoom wide is 110, 11 (=110/10) is added to the count B which then becomes 51 (=40+11). In S1906 in FIG. 26, since the count B is equal to or more than 50, the flow proceeds to the process in S1907. In S1907, 1 is added to the value of 70 of the main registration count such that 71 is obtained. In S1908, after the count B is set to zero, the second main registration count determination process is finished. Subsequently, in S1705 in FIG. 24A, since the value of the main registration count is smaller than the threshold value of 100, the flow proceeds to the process in S1707. For the person ID 4, the count A is set to 41, the count B is set to 0, and the main registration count is set to 71, and a process of storing various counts is executed.

A temporarily registered person who has continued to satisfy the condition that a distance to the imaging device is within a predetermined range or a distance to a person who has already been determined as being a main person is short through the main registration determination process over a plurality of cycles is determined as being a main person. The person information management unit 1106 can perform update on the basis of this determination result.

<Imaging Target Determination>

Details of the imaging target determination process shown in S507 in FIG. 21 will be described with reference to FIGS. 27A and 27B. FIG. 27A is a flowchart illustrating a process performed by the imaging target determination unit 1110. The present process is executed every cycle, and an imaging target person is determined from detected persons. When the subject information is acquired from the subject detection unit 1107, the imaging target determination unit 1110 executes the processes in S1001 to S1008 to determine an imaging target subject. A panning drive angle, a tilting drive angle, and a zoom movement position are calculated in the processes in S1009 and S1010 on the basis of the determination result.

In S1001, the imaging target determination unit 1110 refers to the subject information and determines whether or not a person whose priority setting is "presence" has been detected. If a corresponding person has been detected, the flow proceeds to the process in S1002, and if the corresponding person has not been detected, the flow proceeds to the process in S1005.

In S1002, the imaging target determination unit 1110 adds the person whose priority setting is "presence" as an imaging target person, and proceeds to S1003. In S1003, the imaging target determination unit 1110 refers to the subject information and determines whether or not a person whose registration state is "main registration" has been detected. If a corresponding person has been detected, the flow proceeds to the process in S1004, and if the corresponding person has not been detected, the flow proceeds to the process in S1009. In S1004, the imaging target determination unit 1110 adds the person whose registration state is "main registration" as an imaging target person, and proceeds to S1009.

If a person whose priority setting is "presence" has been detected, it is determined in the processes in S1001 to S1004 that the person whose priority setting is "presence" and the person whose registration state is "main registration" are imaging target persons. In S1005, the imaging target determination unit 1110 refers to the subject information and determines whether or not a person whose registration state is "main registration" has been detected. If a corresponding person has been detected, the flow proceeds to the process in S1006, and if the corresponding person has not been detected, the flow proceeds to the process in S1009. In S1006, the imaging target determination unit 1110 adds the person whose registration state is "main registration" as an imaging target person, and proceeds to S1007.

In S1007, the imaging target determination unit 1110 refers to the subject information and determines whether or not a person whose registration state is "temporary registration" has been detected. If a corresponding person has been detected, the flow proceeds to the process in S1008, and if the corresponding person has not been detected, the flow proceeds to the process in S1009. In S1008, the imaging target determination unit 1110 adds the person whose registration state is "temporary registration" as an imaging target person, and proceeds to S1009.

If a person whose priority setting is "presence" is not detected and a person whose registration state is "main registration" is detected, an imaging target person is determined through the processes in S1006 to S1008. That is, it is determined that a person whose registration state is "main registration" and a person whose registration state is "temporary registration" are imaging target persons.

In S1009, the imaging target determination unit 1110 determines the number of imaging target persons. If it is determined that there are one or more imaging target persons, the flow proceeds to the process in S1010, and if it is determined that the number of imaging target persons is zero, the process is finished. In S1010, the imaging target determination unit 1110 calculates a panning drive angle, a tilting drive angle, and a zoom movement position such that the imaging target is included in an angle of view, and outputs calculation results to the drive control unit 1111.

FIG. 27B is a table illustrating the importance of a person according to a registration state and a priority setting of the subject information. An imaging priority is represented by a numerical value from 1 to 4, where 1 is the highest imaging priority and 4 is the lowest imaging priority.

A person with an imaging priority of 1 is a person whose registration state is "main registration" and whose priority setting is "presence".

A person with an imaging priority of 2 is a person whose registration state is "main registration" and whose priority setting is "absence".

A person with an imaging priority of 3 is a person whose registration state is "temporary registration".

A person with an imaging priority of 4 is an unregistered person.

According to the process in FIG. 27A, if a person with the imaging priority of 1 is detected, the imaging target determination unit 1110 sets the persons with the imaging priorities of 1 and 2 as imaging targets, and does not set the persons with the imaging priorities of 3 and 4 as imaging targets. If the person with the imaging priority of 1 is not detected and the person with the imaging priority of 2 is detected, the imaging target determination unit 1110 sets the persons with the imaging priorities of 2 and 3 as imaging targets and does not set the person with the imaging priority of 4 as an imaging target. If the person with the imaging priority of 1 or 2 is not detected, a determination result is that no subject is set as an imaging target.

Figure 28A:
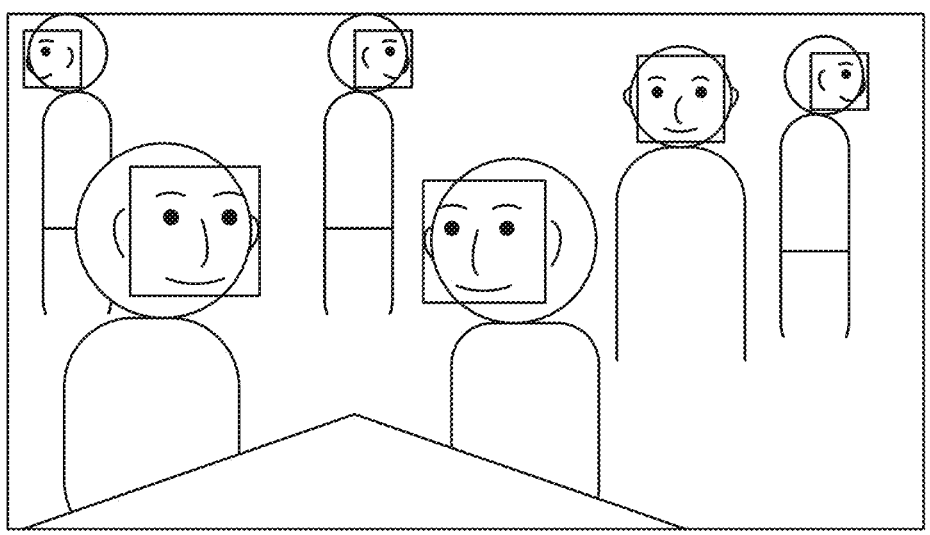

FIGS. 28A and 28B are diagrams illustrating examples of image data and subject information. FIG. 28A is a schematic diagram illustrating an example of image data input to the subject detection unit 1107. FIG. 28B is a table illustrating an example of subject information extracted if the image data illustrated in FIG. 28A is input to the subject detection unit 1107. The example in FIG. 28B is an example of the information in which the number of subjects is six, and subject IDs, face sizes, face positions, face orientations, face reliabilities, person IDs, registration states, and priority settings for the six subjects are included. A specific example of imaging target determination if the imaging target determination unit 1110 acquires the subject information illustrated in FIG. 28B will be described. A zoom position is set to zero.

In S1001 in FIG. 27A, the subject information in FIG. 28B is referred to, and since the priority setting of the subject 2 is "presence", the flow proceeds to the process in S1002, and the subject 2 is added as an imaging target. In S1003, the subject information in FIG. 28B is referred to, and since the registration state of the subject 1 is "main registration", the flow proceeds to the process in S1004, and the subject 1 is added as an imaging target.

In S1009 in FIG. 27A, since the number of imaging target persons is two, the flow proceeds to the process in S1010. In S1010, a panning drive angle, a tilting drive angle, and a zoom movement position are calculated such that the subject 1 and the subject 2 are included in an angle of view. Description of a method of calculating a specific numerical values of an angle or a position will be omitted. There is a method of designating an angle or a position to an absolute value, a method of setting a minimum value of a drive angle and a position that can be designated and gradually changing the minimum value to a target angle or position over a plurality of cycles.

Figure 29:
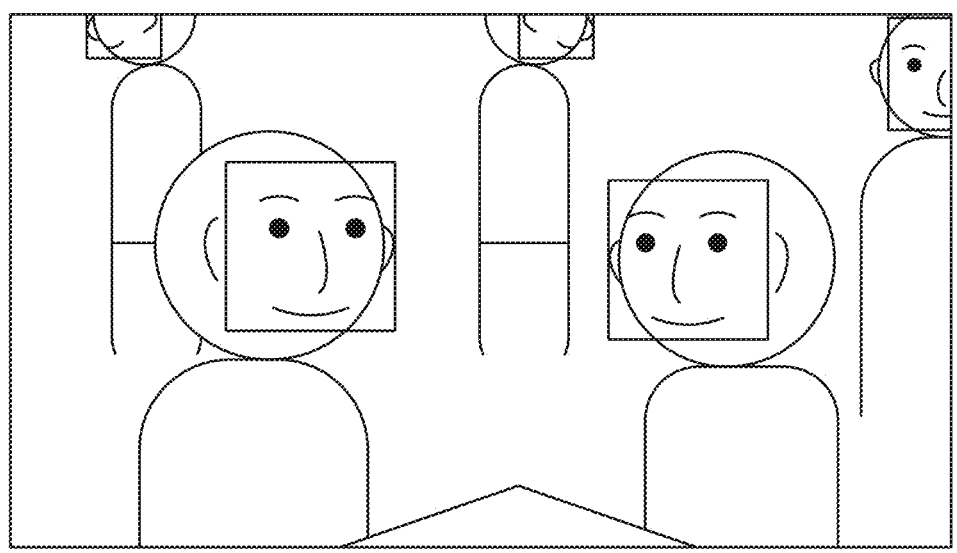
FIG. 29 is a diagram illustrating an example of an image after an angle of view is adjusted due to imaging target determination.

FIG. 29 is a schematic diagram illustrating an example of image data which is a result of the drive control unit 1111 controlling each drive unit when the calculated panning drive angle, tilting drive angle, and zoom movement position are input. In the example in FIG. 29, panning drive, tilting drive, and zoom position movement are controlled such that the centroid of the face positions of the subject 1 on the right side and the subject 2 on the left side is disposed at the screen center, and a face size of each subject is within 150 to 200.

Through the above control, imaging can be performed such that the subject 1 and the subject 2 that are imaging targets and are determined to have a high imaging priority are included in an angle of view, and the subjects 3 to 6 that are not imaging targets and are determined to have a low imaging priority are not included in the angle of view. If a person whose imaging priority is equal to or more than a certain level is detected, a process is executed in which a person with a similar imaging priority is set as an imaging target and a person whose imaging priority is far from a main person is not set as an imaging target. As a result, it is possible to perform imaging in which a main person is set as an imaging target and a person with a low degree of relationship is excluded from an imaging target as much as possible.

Next, an Example in which the importance determination unit 1514 is added will be described with reference to FIGS. 17, and 30 to 34. In the present example, an example is shown in which person information for determining an imaging priority is further subdivided, and the importance is changed according to a detection interval of each person to improve the discrimination accuracy of a main person.

With reference to FIG. 17, details of the process performed by the control box 1100 will be described focusing on differences from the above-described Example. The person information management unit 1106 stores and manages person information associated with each person. The person information will be described below with reference to FIG. 30.

FIG. 30 is a table illustrating an example of the personal information including the importance. Items other than the importance are the same as in the above example, and thus description thereof will be omitted. The importance is set in 10 steps from 1 to 10, where 1 indicates the lowest importance and 10 indicates the highest importance. A lower limit value of the importance is "0" if a name is blank, and is "5" if the name is entered.

When the face image and the feature information are acquired from the feature information extraction unit 1105, the person information management unit 1106 issues a new person ID, associates the person ID with the input face image and feature information, and adds new person information. When the new person information is added, an initial value of the registration state is "temporary registration", the importance is "0" (unset), an initial value of the priority setting is "absence", and an initial value of the name is blank. When a main registration determination result (a person ID to be registered) is acquired from the main registration determination unit 1109, the person information management unit 1106 changes a registration state of person information corresponding to the person ID of the corresponding person to "main registration", and sets the importance to "1". If an instruction for changing person information (information regarding a priority setting or a name) is received from the communication unit 1114 through a user operation, the person information management unit 1106 changes the person information according to the instruction. If either a priority setting or a name is changed for a person whose registration state is "temporary registration", the person information management unit 1106 changes the registration state of the corresponding person to "main registration", and sets the importance to "5" if the name is changed.

When an instruction for adding or subtracting the importance for the person ID is received from the importance determination unit 1514, the person information management unit 1106 adds or subtracts the importance of the person information corresponding to the person ID of the corresponding person. The subject detection unit 1107 detects a subject from the digital image data from the image processing unit 1103, and extracts information regarding the detected subject. An example in which the subject detection unit 1107 detects a person's face as a subject will be described. The subject information includes, for example, the number of detected subjects, a position of the face, a face size, an orientation of the face, and reliability of the face indicating the certainty of detection. Examples of the subject information will be described later with reference to FIGS. 31A and 31B.

The subject detection unit 1107 calculates a similarity by collating the feature information of each person acquired from the person information management unit 1106 with the feature information of the detected subject. If the similarity is equal to or more than a threshold value, the subject detection unit 1107 adds a person ID, a registration state, an importance, and a priority setting of the detected person to the subject information. The subject detection unit 1107 outputs the subject information to the temporary registration determination unit 1108, the main registration determination unit 1109, the imaging target determination unit 1110, and the importance determination unit 1514.

The imaging target determination unit 1110 determines an imaging target subject on the basis of the subject information acquired from the subject detection unit 1107. The imaging target determination unit 1110 further calculates a panning drive angle, a tilting drive angle, and a target zoom position required to dispose the imaging target person within an angle of view with a designated size on the basis of a determination result of the imaging target person. A command based on the calculation results is output to the drive control unit 1111. Details of the imaging target determination process will be described later with reference to FIG. 34.

Figure 31A:
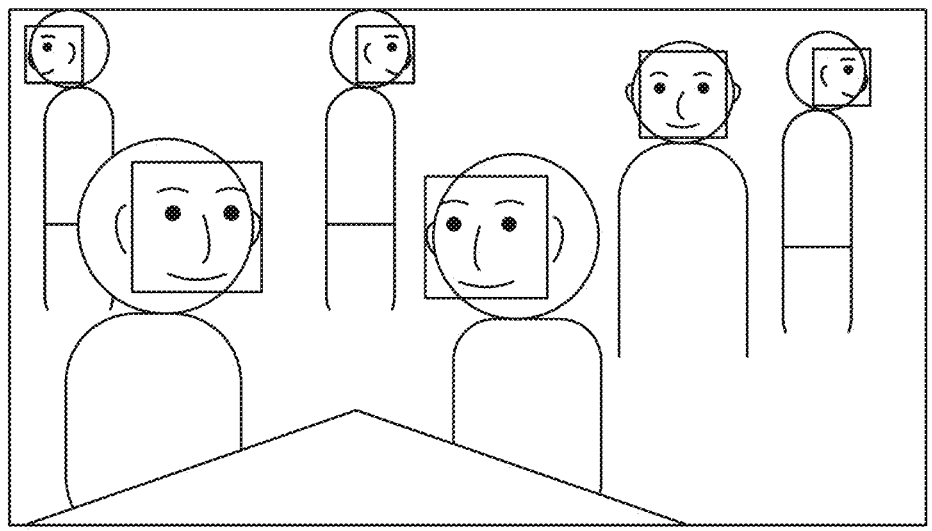

FIGS. 31A and 31B are diagrams illustrating examples of image data and subject information. FIG. 31A is a schematic diagram illustrating an example of image data input to the subject detection unit 1107. FIG. 31B is a table illustrating an example of subject information extracted if the image data illustrated in FIG. 31A is input to the subject detection unit 1107. An example is illustrated in which the subject information includes the number of subjects, a subject ID of each subject, a face size, a face position, a face orientation, a face reliability, a person ID, a registration state, an importance, and a priority setting. Items other than the importance are the same as in the above Example, and description thereof will be omitted.

The importance is the same as the importance managed by the person information management unit 1106. If the person ID is not zero, that is, it is determined that a person is any person managed by the person information management unit 1106, the importance of the corresponding person acquired from the person information management unit 1106 is acquired.

Figure 32:
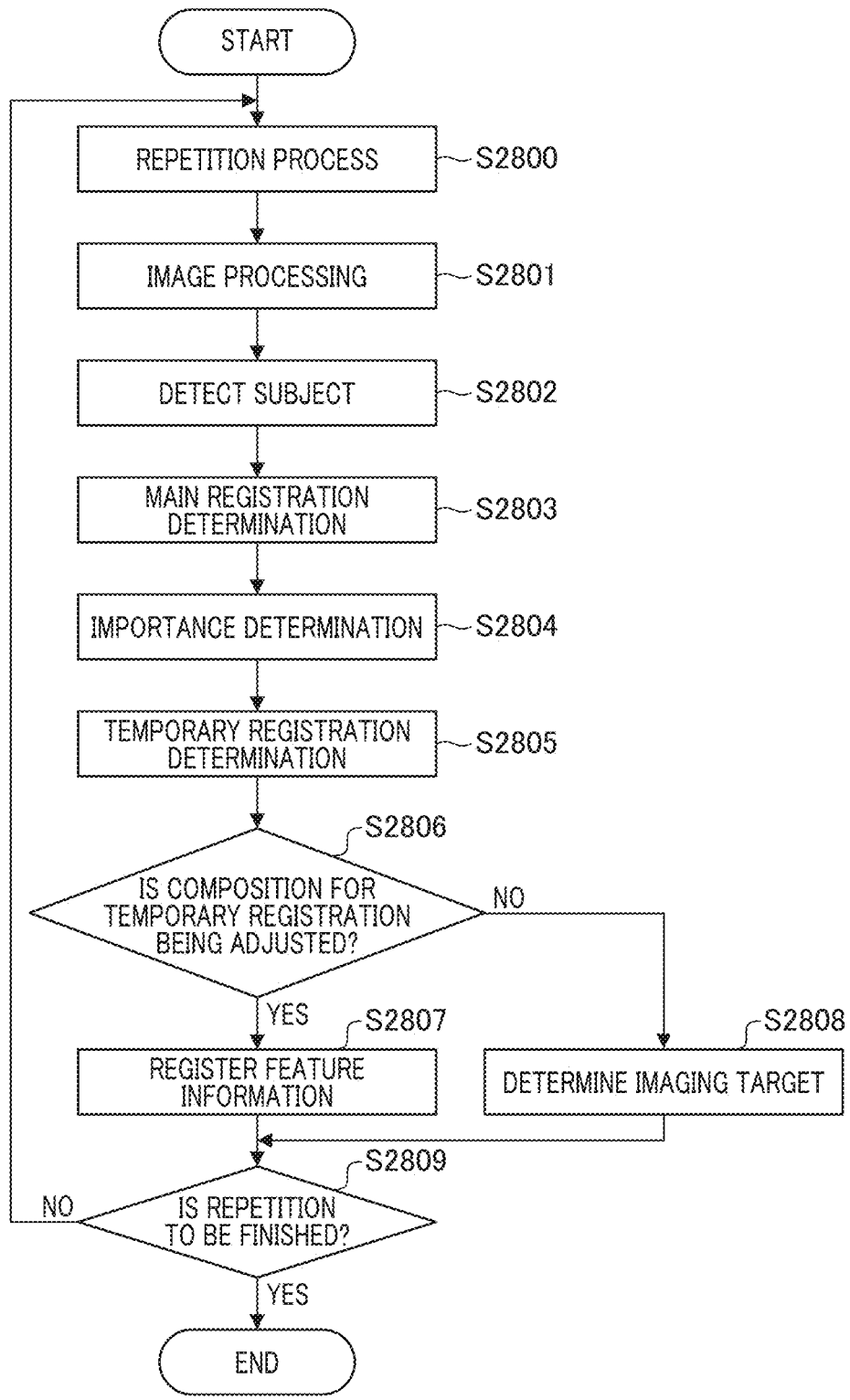
FIG. 32 is a flowchart illustrating an outline of a cyclic operation performed by the imaging device.

FIG. 32 is a flowchart illustrating the overall flow of imaging and registration and update of person information in the present example, and the following process is executed cyclically. When the imaging device is powered on, the imaging unit 1022 starts cyclic imaging (moving image capturing) in order to acquire image data used for various determinations. The various determinations are imaging target determination, temporary registration determination, main registration determination, and importance determination. In S2800, a repetition process is started.

In S2801, image data acquired through imaging is output to the image processing unit 1103, and the image data subjected to various types of image processing is acquired. When a subject is detected in S2802 and a subject information is acquired, the main registration determination is performed in S2803, the importance determination is performed in S2804, and the temporary registration determination is performed in S2805. Description of the temporary registration determination process and the main registration determination process will be omitted. In S2804, the importance determination unit 1514 determines the importance of a person by using the information regarding the detected subject. In the importance determination, the person information in the person information management unit 1106 is updated, but panning drive, tilting drive, and zoom drive are not executed.

S2806 is a process for determining whether or not a temporary registration composition adjustment process is being executed. If it is determined that the temporary registration composition adjustment process is being executed, the flow proceeds to the process in S2807, and if it is determined that the temporary registration composition adjustment process is not being executed, the flow proceeds to the process in S2808. In S2807, the feature information extraction unit 1105 extracts feature information of the subject located at the center of the image data and outputs the feature information to the person information management unit 1106. In S2807, the imaging target determination is executed.

After S2807 and S2808, the flow proceeds to the process in S2809, and it is determined whether or not the repetition process is to be finished, and if the process is continued, the flow returns to S2800. The processes in S2801 to S2808 are repeatedly executed in accordance with an imaging cycle of the imaging unit 1022.

Figures 33A, 33B:
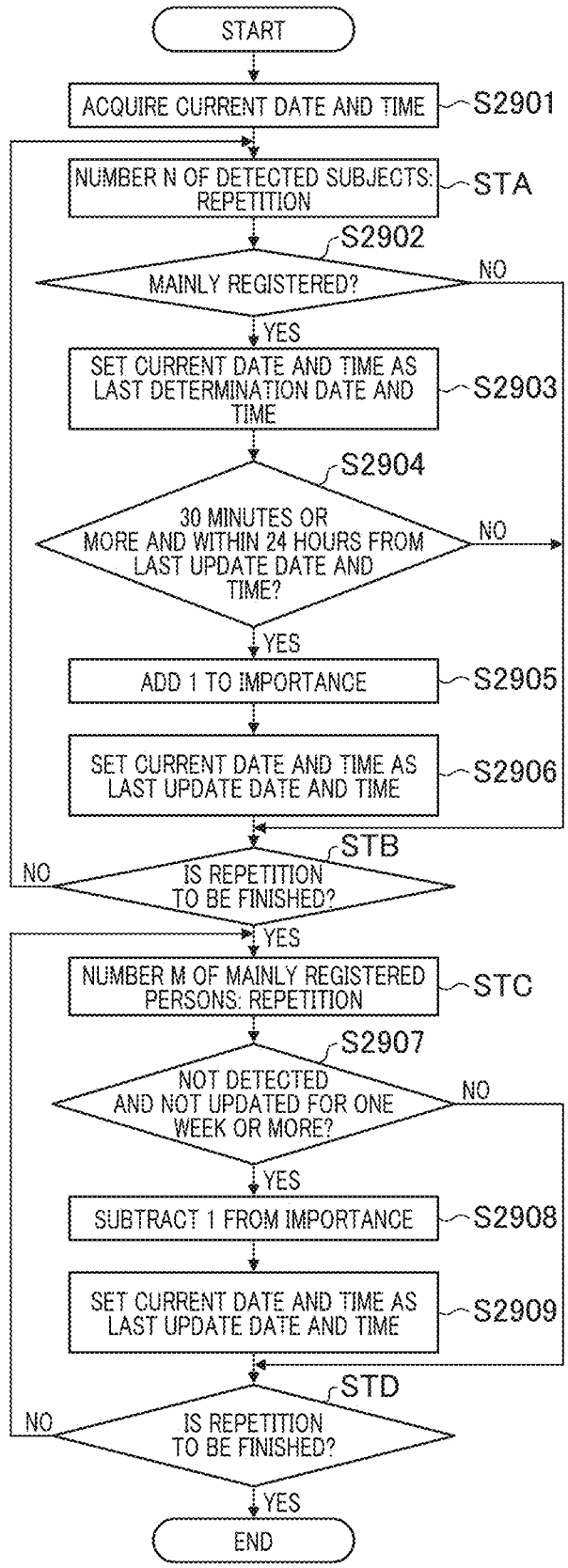
FIGS. 33A and 33B are a flowchart and a table illustrating an importance determination process.

Next, with reference to FIGS. 33A and 33B, the importance determination process shown in S2804 in FIG. 32 will be described. FIG. 33A is a flowchart illustrating a process performed by the importance determination unit 1514. The importance determination process is executed over a plurality of cycles, and the importance of person who has already mainly registered is determined and updated. FIG. 33B is a table illustrating the last detection date and time and the last update date and time associated with the person ID. The last detection date and time is the date and time when a mainly registered person was detected last. The last update date and time is the date and time when the importance of the mainly registered person was updated last. The last detection date and time and the last update date and time are stored in the memory by data corresponding to the number of mainly registered persons and are referred to at the time of determination in each cycle.

When the subject information is acquired from the subject detection unit 1107, the importance determination unit 1514 executes the process in S2901, and then executes the processes in S2902 to S2906 on the detected subject, and also executes the processes in S2907 to S2909 on the mainly registered person. In S2901, the importance determination unit 1514 acquires the current date and time from the system time of the camera 101. In STA, repetition processes corresponding to the number of detected subjects are started. In S2902, the importance determination unit 1514 refers to the subject information and determines whether or not the registration state is "main registration". If it is determined that the registration state is "main registration", the flow proceeds to the process in S2903, and if the registration state is not "main registration", the flow proceeds to the process in STB.

In S2903, the importance determination unit 1514 sets the current date and time as the last detection date and time for the detected person. In S2904, the importance determination unit 1514 determines whether or not the current date and time has passed 30 minutes or more from the last update date and time and is within 24 hours. If this condition is satisfied, the flow proceeds to the process in S2905, and if the condition is not satisfied, the flow proceeds to the process in STB.

The importance determination unit 1514 instructs the person information management unit 1106 to add 1 to the importance in S2905, and sets the current date and time as the last update date and time in S2906. It is determined whether or not the repetition process is to be finished in STB, and if the process is continued, the flow returns to STA and proceeds to processing on the next subject.

Next, the following processing is executed for each mainly registered person. In STC, repetition processes corresponding to the number of mainly registered subjects are started. In S2907, the importance determination unit 1514 refers to the current date and time, and determines whether or not there is an interval of one week or more for both the last detection date and time and the last update date and time. If it is determined that detection or update has not been performed for one week or more, the flow proceeds to S2908, and if it is determined that detection or update has been performed within one week, the flow proceeds to STD.

The importance determination unit 1514 instructs the person information management unit 1106 to subtract 1 from the importance in S2908, and sets the current date and time as the last update date and time in S2909. It is determined whether or not the repetition process is to be finished in STD, and if the process is continued, the flow returns to STC and proceeds to processing on the next mainly registered subject.

Through the importance determination process, the importance of the person rediscovered every other day increases, and the importance of the subject that is not detected for one week or more decreases. In other words, it is possible to increase the importance of the main person who appears frequently, and to reduce the importance of the unrelated person who is rarely seen or has been mainly registered.

Figure 34A:
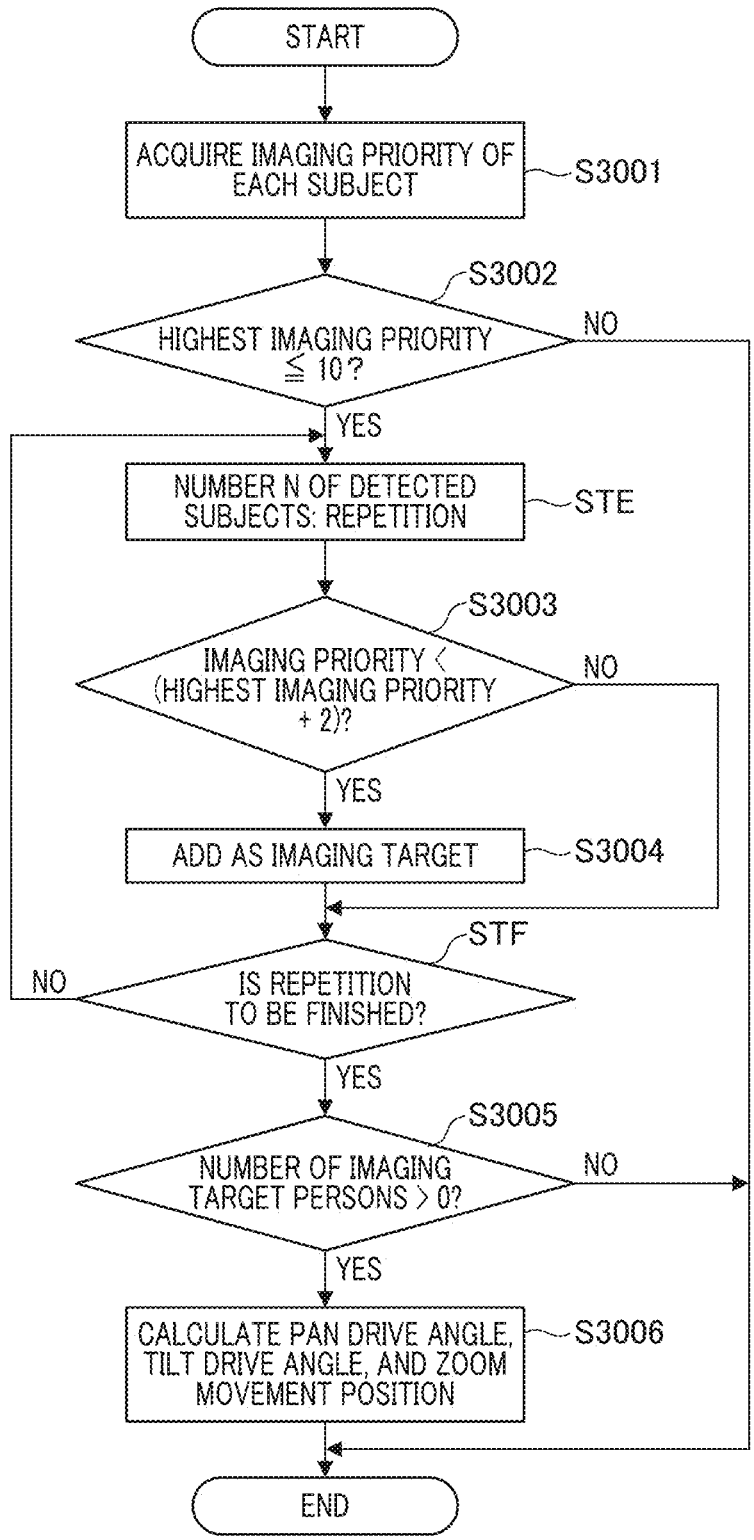

The imaging target determination process shown in S2808 in FIG. 32 will be described with reference to FIGS. 34A and 34B. FIG. 34A is a flowchart illustrating the process performed by the imaging target determination unit 1110. The present process is executed every cycle, and an imaging target person is determined from detected persons. FIG. 34B is a table (imaging priority table) illustrating an imaging priority of a person according to a registration state, an importance, and a priority setting of subject information. The imaging priority is represented by a numerical value from 1 to 13, where 1 indicates the highest imaging priority and 13 indicates the lowest imaging priority.

- A person with the imaging priority of 1 is a person whose registration state is "main registration" and priority setting is "presence".
- Persons with imaging priorities 2 to 11 are those whose registration state is "main registration" and priority setting is "absence", and the higher the importance, the higher the imaging priority.
- A person with the imaging priority of 12 is a person whose registration state is "temporary registration".
- A person with the imaging priority of 13 is an unregistered person.

When the subject information is acquired from the subject detection unit 1107, the imaging target determination unit 1110 executes the processes in S3001 to S3004 to determine an imaging target subject. On the basis of a determination result, the processes in S3005 and S3006 are performed to calculate a panning drive angle, a tilting drive angle, and a zoom movement position.

In S3001, the imaging target determination unit 1110 refers to the subject information and the imaging priority table illustrated in FIG. 34B, and acquires the imaging priority of each subject. In S3002, the imaging target determination unit 1110 determines whether or not the imaging priority of the subject having the highest imaging priority among all detected subjects is equal to or less than a threshold value of 10. If this condition is satisfied, the flow proceeds to the process in STE, and if the condition is not satisfied, it is determined that there is no imaging target and the process finished. Repetition processes corresponding to the number of detected subjects are started in STE. In S3003, the imaging target determination unit 1110 determines whether or not the imaging priority of each subject is less than a value obtained by adding 2 to the highest imaging priority of all of the subjects. If this condition is satisfied, the flow proceeds to the process in S3004, and if the condition is not satisfied, the flow proceeds to the process in STF. It is determined whether or not the repetition process is to be finished in STF, and if the process is continued, the flow returns to STE and proceeds to processing on the next detected subject.

In S3004, the imaging target determination unit 1110 adds the determined detected subject as an imaging target. For example, if the imaging priority of a subject having the highest imaging priority is "4", subjects having the imaging priority of "4", "5", or "6" are determined as being imaging targets. If the imaging priority of a subject having the highest imaging priority is "7", subjects having the imaging priority of "7", "8", or "9" are determined as being imaging targets. After S3004, the flow proceeds to the process in STF where it is determined whether or not the repetition process is to be finished, and if the process is continued, the flow returns to STE and proceeds to processing on the next detected subject. When the repetition process is finished, the flow proceeds to the process in S3005.

In S3005, the imaging target determination unit 1110 determines whether or not there is one or more imaging target persons. If this condition is satisfied, the flow proceeds to the process in S3006, and if the condition is not satisfied, the process is finished. In S3006, the imaging target determination unit 1110 calculates a panning drive angle, a tilting drive angle, and a zoom movement position such that the imaging target is included in an angle of view, and outputs the calculation results to the drive control unit 1111. After that, a series of processes is finished.

Through the above control, imaging can be performed such that an imaging target subject, that is, a subject determined to have a high imaging priority is included in an angle of view, and a subject that is not an imaging target, that is, a subject determined to have a low imaging priority is not included in the angle of view. If a person having a relatively high imaging priority is detected, a plurality of persons having a similar imaging priority are determined as being imaging targets, and a person having a different imaging priority is determined as not being an imaging target. It is possible to perform imaging in which a main person is set as an imaging target and a person with a low degree of relationship is excluded from an imaging target as much as possible.

MODIFICATION EXAMPLE

Hereinafter, a modification example of the above Example will be described. In the above Example, information related to features of the face of a person is used as subject information. In the modification example, feature information regarding a subject other than a person, such as an animal or an object may be used as subject information.

FIGS. 35A and 35B illustrate an example in which face information of an animal can be detected in addition to a person. FIG. 35A is a schematic diagram illustrating an example of image data input to the subject detection unit 1107. FIG. 35B is a table illustrating subject information corresponding to the image data in FIG. 35A. When an animal or an object is imaged, the temporary registration determination and the main registration determination are executed as processes separate from a person. Alternatively, if an animal or an object and a person are mixed, a process of determining an imaging target by weighting an importance according to the type of subject is executed.

The above Example is an example in which the lens barrel 102 including the imaging unit 1022 is rotated about both the X axis and the Y axis, and thus the panning drive and the tilting drive can be performed. The present invention is applicable as long as, even if the lens barrel 102 cannot be rotated about both the X axis and the Y axis, the lens barrel 102 can be rotated about any one of the axes. For example, in a case of a configuration that the lens barrel 102 can be rotated about the Y axis, panning drive is performed on the basis of an orientation of a subject.

In the above Example, the imaging device in which the lens barrel including the imaging optical system and the imaging element and the imaging control device controlling an imaging direction by using the lens barrel are integrated has been described. The present invention is not limited to this. For example, the imaging device may have a configuration in which a lens device is replaceable. There is a configuration in which the imaging device is attached to a platform provided with a rotation mechanism that is driven in the panning direction and the tilting direction. The imaging device may have an imaging function and other functions. For example, there is a configuration in which a platform capable of fixing a smartphone having an imaging function and the smartphone are combined. The lens barrel, the rotation mechanism (the tilt rotation unit and the pan rotation unit), and the control box do not need to be physically connected. For example, the rotation mechanism or the zoom function may be controlled through wireless communication such as Wi-Fi.

The Example in which the feature information of a person is acquired by the imaging device has been described. The present invention is not limited to this, and, for example, there may be a configuration in which a face image or feature information in person information is acquired from another imaging device for face registration or an external device such as a mobile terminal device and is registered or added. Although the preferred embodiments of the present invention have been described above, the present invention is not limited to these embodiments, and various modifications and changes can be made within the scope of the spirit thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-179882, filed Oct. 27, 2020, which is hereby incorporated by reference wherein in its entirety.

What is claimed is:

1. An imaging device capable of performing automatic imaging and automatic authentication registration, comprising:
   at least one processor; and
   at least one memory holding a program that makes the processor function as:
   an imaging unit configured to image a subject,
   a search unit configured to search for a subject detected in image data acquired by the imaging unit,
   an authentication registration unit configured to perform an automatic authentication registration when the detected subject is imaged, and
   a control unit configured to perform authentication registration determination of whether or not a first condition under which the authentication registration unit performs the automatic authentication registration is satisfied when the subject is imaged and imaging determination of whether or not a second condition for performing the automatic imaging is satisfied, and to control timings of the automatic imaging and the automatic authentication registration,
   wherein the control unit determines the timing of the automatic authentication registration when the subject is imaged by executing the authentication registration determination and the imaging determination related to the detected subject while controlling searching in the search unit, and
   wherein, if the first condition is satisfied, in the automatic authentication registration, the detected subject is automatically registered when the subject is imaged.

2. The imaging device according to claim 1, wherein the control unit prioritizes the authentication registration determination over the imaging determination.

3. The imaging device according to claim 2, wherein, if a result of the authentication registration determination and the imaging determination is that the first condition is satisfied, the authentication registration unit registers the detected subject, and if the first condition is not satisfied and the second condition is satisfied, the control unit controls the automatic imaging.

4. The imaging device according to claim 1, wherein the processor further functions as:
   a first changing unit configured to change an imaging direction; and
   a second changing unit configured to change an imaging angle of view,
   wherein the control unit controls a timing for the first or second changing unit to change the imaging direction or the imaging angle of view in the automatic imaging and the automatic authentication registration.

5. The imaging device according to claim 4, wherein the first changing unit includes a drive unit configured to rotationally move the imaging unit in a plurality of directions, and
   wherein the second changing unit changes an angle of view in the automatic imaging by driving a lens or performing image processing.

6. The imaging device according to claim 4, wherein, if it is determined that the first condition is satisfied, the control unit performs control such that the first changing unit disposes a face of the subject at a center of the imaging angle of view.

7. The imaging device according to claim 4, wherein, if it is determined that the first condition is satisfied, the control unit performs control such that the second changing unit changes a size of a face of the subject to a size set in advance.

8. The imaging device according to claim 4, wherein, if it is determined that the second condition is satisfied and the detected subject is a person, the control unit performs control such that the second changing unit changes the imaging angle of view to an imaging angle of view including the subject.

9. The imaging device according to claim 2, wherein the control unit sets a result of the authentication registration determination to be prioritized over a result of the imaging determination depending on the number of times of imaging or a time interval of imaging.

10. The imaging device according to claim 1, wherein, if it is determined that the first condition is satisfied and there is an imaging instruction from an external device, the control unit performs control for stopping a process of the automatic authentication registration.

11. The imaging device according to claim 1, wherein the first condition based on acquired face information of the subject is a reliability of face detection is more than a threshold value and a face of the subject is facing the front of the imaging device, or a state in which the reliability is more than the threshold value continues and a face of the subject is facing the front of the imaging device.

12. The imaging device according to claim 1, wherein the control unit acquires information regarding the detected subject and imaging history information, and computes a score of the imaging and calculates a determination threshold value, and wherein the second condition is a condition that the score exceeds the determination threshold value.

13. The imaging device according to claim 4, wherein, if it is determined that the first condition is satisfied, the control unit performs control such that the second changing unit adjusts the imaging angle of view before the automatic authentication registration.

14. The imaging device according to claim 1, wherein the processor further functions as an acquisition unit configured to acquire information calculated or changed through machine learning of the image data, and wherein the control unit performs registration determination on the subject or imaging determination based on the second condition by using the information acquired by the acquisition unit.

15. The imaging device according to claim 14, wherein the control unit performs determination of whether or not a condition for transition to a low power consumption state or a condition for canceling the low power consumption state is satisfied by using the information acquired by the acquisition unit, and controls the supply of power based on a result of the determination.

16. The imaging device according to claim 1, wherein, in the automatic imaging, the control unit acquires information regarding a distance of the subject and a detection frequency, determines a priority of imaging of each subject, and determines a subject of which the priority is within a preset range as an imaging target subject among a plurality of the detected subjects.

17. The imaging device according to claim 16, wherein the control unit determines, as imaging target subjects, a first subject of which the priority is a first priority and a second subject of which the priority is a second priority within a preset range from the first priority.

18. The imaging device according to claim 17, wherein the control unit performs control for the automatic imaging instead of setting a subject of which the priority is lower than the second priority as an imaging target.

19. The imaging device according to claim 17, wherein the control unit determines a priority of imaging of each subject by using information regarding distances to the first and second subjects from the imaging device.

20. The imaging device according to claim 16, wherein the control unit performs a process of storing and managing feature information of a subject in a storage unit, and determines whether or not feature information of the detected subject matches the feature information stored in the storage unit.

21. The imaging device according to claim 20, wherein the storage unit stores the feature information of the subject and the priority in association with each other.

22. The imaging device according to claim 21, wherein, if the subject corresponding to the feature information stored in the storage unit is detected, the control unit performs a process of updating the priority stored in the storage unit depending on the priority of the detected subject.

23. The imaging device according to claim 20, wherein, if the feature information of the detected subject is acquired, the control unit performs a process of storing feature information of a subject of which the priority is a preset value or within a preset range in the storage unit.

24. The imaging device according to claim 16, wherein the control unit determines the priority of the subject on the basis of an elapsed time from the last detection date and time of the detected subject.

25. The imaging device according to claim 16, wherein the processor further functions as a changing unit configured to change an imaging direction, and wherein the control unit controls imaging of the determined imaging target subject by controlling the changing unit.

26. The imaging device according to claim 16, wherein the processor further functions as a changing unit configured to change an imaging angle of view, and wherein the control unit controls imaging in a state in which the determined imaging target subject is included in the imaging angle of view by controlling the changing unit.

27. The imaging device according to claim 26, wherein the control unit determines the priority of the subject by using information regarding an orientation of a face of the subject or a reliability indicating certainty of the face.

28. The imaging device according to claim 27, wherein the control unit performs control for outputting image data of the face of the subject and the priority.

29. A control method executed in an imaging device capable of performing automatic imaging and automatic authentication registration, comprising:
searching for a subject detected in image data acquired by an imaging unit;
performing an automatic authentication registration when the detected subject is imaged; and performing authentication registration determination of whether or not a first condition under which the authentication registration unit performs the automatic authentication registration is satisfied when the subject is imaged and imaging determination of whether or not a second condition for performing the automatic imaging is satisfied, and controlling timings of the automatic imaging and the automatic authentication registration, wherein the controlling determines the timing of the automatic authentication registration when the subject is imaged by executing the authentication registration determination and the imaging determination related to the detected subject while controlling search for the subject, and wherein, when the first condition is satisfied, in the automatic authentication registration, the detected subject is automatically registered when the subject is imaged.

30. A non-transitory recording medium storing a control program of an imaging device capable of performing automatic imaging and automatic authentication registration, causing a computer to perform each step of a control method of the imaging device, the method comprising:

searching for a subject detected in image data acquired by an imaging unit;

performing an automatic authentication registration when the detected subject is imaged; and performing authentication registration determination of whether or not a first condition under which the authentication registration unit performs the automatic authentication registration is satisfied when the subject is imaged and imaging determination of whether or not a second condition for performing the automatic imaging is satisfied, and controlling timings of the automatic imaging and the automatic authentication registration, wherein the controlling determines the timing of the automatic authentication registration when the subject is imaged by executing the authentication registration determination and the imaging determination related to the detected subject while controlling search for the subject, and wherein, when the first condition is satisfied, in the automatic authentication registration, the detected subject is automatically registered when the subject is imaged.

31. The imaging device according to claim 1, wherein the control unit controls the timing of the automatic imaging and the automatic authentication registration when there is no manual imaging instruction.

* * * * *